United States Patent
Dong

(10) Patent No.: US 12,212,884 B2
(45) Date of Patent: Jan. 28, 2025

(54) METHOD FOR SHOOTING LONG-EXPOSURE IMAGE AND ELECTRONIC DEVICE

(71) Applicant: Huawei Technologies Co., Ltd., Shenzhen (CN)

(72) Inventor: Jiyang Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 17/297,201

(22) PCT Filed: Dec. 6, 2018

(86) PCT No.: PCT/CN2018/119634
§ 371 (c)(1),
(2) Date: May 26, 2021

(87) PCT Pub. No.: WO2020/113534
PCT Pub. Date: Jun. 11, 2020

(65) Prior Publication Data
US 2021/0409588 A1    Dec. 30, 2021

(51) Int. Cl.
H04N 5/272    (2006.01)
G06T 5/50     (2006.01)
H04N 23/63    (2023.01)
H04N 23/73    (2023.01)
H04N 23/741   (2023.01)

(52) U.S. Cl.
CPC ............ *H04N 5/272* (2013.01); *G06T 5/50* (2013.01); *H04N 23/631* (2023.01); *H04N 23/73* (2023.01); *H04N 23/741* (2023.01); *G06T 2207/20112* (2013.01)

(58) Field of Classification Search
None
See application file for complete search history.

(56) References Cited

U.S. PATENT DOCUMENTS

2007/0177048 A1* 8/2007 Van Dyke .............. H04N 23/73
                                                  348/E5.037
2010/0265357 A1   10/2010 Liu et al.
(Continued)

FOREIGN PATENT DOCUMENTS

CN    101431616 A    5/2009
CN    101656836 A    2/2010
(Continued)

OTHER PUBLICATIONS

ITU-T H.264, "Series H: Audiovisual and Multimedia Systems, Infrastructure of audiovisual services-Coding of moving video, Advanced video coding for generic audiovisual services," 812 pages.

*Primary Examiner* — Quan Pham
(74) *Attorney, Agent, or Firm* — Conley Rose, P.C.

(57) ABSTRACT

An image display method includes obtaining a plurality of frames of an image and displaying a first image including a first area and a second area. The first area includes a first object identified by an electronic device, and the first object is obtained from a first frame number of an image in the plurality of frames. An image of the second area is obtained from a second frame number of an image in the plurality of frames, and the first frame number is less than the second frame number.

21 Claims, 51 Drawing Sheets

(56) References Cited

U.S. PATENT DOCUMENTS

| | | | |
|---|---|---|---|
| 2011/0234817 A1 | 9/2011 | Sakamoto | |
| 2013/0121569 A1* | 5/2013 | Yadav | G06T 11/00 |
| | | | 382/284 |
| 2015/0054965 A1 | 2/2015 | Sudo et al. | |
| 2017/0003879 A1 | 1/2017 | Tamai et al. | |
| 2017/0019608 A1 | 1/2017 | Ono | |
| 2017/0085808 A1 | 3/2017 | Jiang et al. | |
| 2017/0140236 A1* | 5/2017 | Price | G06N 3/045 |
| 2017/0237904 A1 | 8/2017 | Takahasi et al. | |
| 2017/0257561 A1 | 9/2017 | Wei et al. | |
| 2017/0289462 A1 | 10/2017 | Eum et al. | |
| 2018/0160021 A1 | 6/2018 | Zhou et al. | |
| 2018/0338086 A1* | 11/2018 | Marineau-Mes | G06T 5/50 |
| 2019/0035062 A1* | 1/2019 | Sokeila | H04N 5/2621 |
| 2019/0080457 A1* | 3/2019 | Shukla | G06T 7/194 |

FOREIGN PATENT DOCUMENTS

| | | |
|---|---|---|
| CN | 101866092 A | 10/2010 |
| CN | 102222342 A | 10/2011 |
| CN | 102446352 A | 5/2012 |
| CN | 102903119 A | 1/2013 |
| CN | 103888683 A | 6/2014 |
| CN | 104079860 A | 10/2014 |
| CN | 104113701 A | 10/2014 |
| CN | 104202521 A | 12/2014 |
| CN | 104427224 A | 3/2015 |
| CN | 106165389 A | 11/2016 |
| CN | 106791380 A | 5/2017 |
| CN | 107395997 A | 11/2017 |
| CN | 108933898 A | 12/2018 |
| EP | 3226537 A1 | 10/2017 |
| IN | 106603931 A | 4/2017 |
| JP | 2009010472 A | 1/2009 |
| JP | 2011199750 A | 10/2011 |
| JP | 2013175922 A | 9/2013 |
| JP | 2016009991 A | 1/2016 |
| JP | 2016092430 A | 5/2016 |
| JP | 2016122990 A | 7/2016 |
| JP | 2017143492 A | 8/2017 |
| WO | 2017088678 A1 | 6/2017 |

* cited by examiner

METHOD FOR SHOOTING LONG-EXPOSURE IMAGE AND ELECTRONIC DEVICE

CROSS-REFERENCE TO RELATED APPLICATIONS

This application is a U.S. National Stage of International Patent Application No. PCT/CN2018/119634 filed on Dec. 6, 2018, which is hereby incorporated by reference in its entirety.

TECHNICAL FIELD

This application relates to the field of electronic technologies, and more specifically, to a method for shooting a long-exposure image and an electronic device.

BACKGROUND

Long-exposure photography (long-exposure photography) is a special photography technique, which is usually implemented by prolonging a shutter opening time, and is usually used in a scenario in which a lens includes both a fixed object and a moving object, for example, light trail photography, waterscape photography, and astronomical photography, to shoot photos with special effects. Because the long-exposure photography can produce a unique shooting effect, the long-exposure photography is well adored by most photography enthusiasts. With continuous development of mobile terminal devices such as a mobile phone and a tablet computer, currently, all mainstream models in the market support the long-exposure photography. When shooting is performed by using the long-exposure photography of these mainstream mobile phones in the market, a corresponding effect can be usually achieved.

However, currently, when a long-exposure image needs to be shot, if a person or another object that is not completely static is to be shot, a finally shot image is blurry.

SUMMARY

This application provides a method for shooting a long-exposure image. Long-exposure processing is not performed on a to-be-shot person or another object that is not completely static, but the long-exposure processing is performed on another area, to obtain an image of a clear person or a clear object with a long-exposure background, and a visual effect of a user is relatively good.

To achieve the foregoing objective, the following technical solutions are used in the embodiments of this application.

According to a first aspect, a method for shooting a long-exposure image is provided, applied to an electronic device, where the method includes: displaying a first interface, where the first interface is a camera interface of the electronic device; detecting a first operation of a user on the first interface, obtaining a plurality of frames of image in response to the first operation; detecting a second operation of the user on the first interface; and displaying a first image in response to the second operation, where the first image includes a first area and a second area, the first area includes a first object identified by the electronic device, the first object is obtained from a first frame number of image in the plurality of frames of image, the first area of the first frame number of image includes the first object, an image of the second area is obtained from a second frame number of image in the plurality of frames of image, and the first frame number is less than the second frame number.

That the first object is obtained from the first frame number of image in the plurality of frames of image may also be understood as that the first object is extracted from one frame of image in the plurality of frames of image, or is extracted from images obtained by processing several frames of image in the plurality of frames of image.

In some possible implementations, the first image further includes a third area. For example, the third area is an area in which a watermark is located.

In some possible implementations, the second frame number of image is the plurality of frames of image.

In some possible implementations, the first area in which the first object is located is obtained from the first frame of image in the plurality of frames of image.

In some possible implementations, the electronic device may select a most beautiful frame of image of the first object from the plurality of frames of image based on artificial intelligence (artificial intelligence, AI), and extract, from the image, the first area in which the first object is located.

In some possible implementations, the first object may be obtained by processing several frames of image in the plurality of frames of image. The electronic device may first select several frames of image for processing to obtain one processed frame of image, and then extract, from the frame of image, the first area in which the first object is located.

In this embodiment of this application, the first object is obtained from the first frame number of image in the plurality of frames of image. This process may also be understood as that the electronic device first determines the first frame number of image from the plurality of frames of image obtained through shooting, and then determines the first object by using the first frame number of image.

According to the method for shooting a long-exposure image in this embodiment of this application, differential processing is performed on images of different areas in the plurality of frames of image, and images of the first area and the second area are obtained by processing images of different frame numbers, so that an image of the first area in a finally obtained image is clear, and a visual effect of the user is relatively good.

With reference to the first aspect, in some possible implementations of the first aspect, the image of the second area is obtained by performing long-exposure processing on the second frame number of image.

In some possible implementations, the image of the second area is obtained by performing long-exposure processing on the plurality of frames of image.

According to the method for shooting a long-exposure image in this embodiment of this application, the long-exposure processing is performed on the image of the second area, so that in a finally generated image, the first area is clear and the second area is long exposed, and a visual effect of the user is relatively good.

With reference to the first aspect, in some possible implementations of the first aspect, the first frame number of image includes a second image, and the second image includes the first object.

In some possible implementations, the second image is a most beautiful frame of image of the first object in the plurality of frames of image.

In some possible implementations, the second image is the first frame of image in the plurality of frames of image.

According to the method for shooting a long-exposure image in this embodiment of this application, the image of the first area is extracted from the second image in the plurality of shot frames of image, so that the first object in the first area in a finally obtained first image is clear.

With reference to the first aspect, in some possible implementations of the first aspect, before the detecting a first operation of a user on the first interface, the method further includes: detecting a third operation of the user on the first interface; and entering a first processing mode of the first interface in response to the third operation, where the first processing mode is one of a plurality of long-exposure processing modes.

With reference to the first aspect, in some possible implementations of the first aspect, the first interface includes a control of the first processing mode, and the third operation is an operation that the user taps the control.

In this solution, the user can conveniently enter the first processing mode by tapping the control on the first interface.

In some possible implementations, a control 1 is displayed on the first interface of the electronic device, and the detecting a third operation of the user on the first interface includes; detecting that the user taps the control 1, displaying a function list, where the function list includes a control 2 used to indicate the first processing mode, and detecting an operation that the user taps the control 2.

In some possible implementations, the detecting a third operation of the user on the first interface includes: detecting, by the electronic device, a preset gesture of the user on the first interface, for example, a gesture operation of drawing a circle track.

In this solution, the user may indicate, through the preset gesture on the first interface, the electronic device to enter the first processing mode.

With reference to the first aspect, in some possible implementations of the first aspect, the obtaining a plurality of frames of image in response to the first operation includes: starting shooting in response to the first operation; detecting, on the first interface, a fourth operation performed by the user to indicate to stop shooting; and obtaining the plurality of frames of image in response to the fourth operation.

In some possible implementations, the obtaining a plurality of frames of image in response to the first operation includes: starting shooting in response to the first operation; detecting, on the first interface, a fourth operation that the user provides a voice prompt to stop shooting; and obtaining the plurality of frames of image in response to the fourth operation.

In this solution, the user may select, based on a requirement of the user, time at which exposure needs to be performed. This improves user experience.

With reference to the first aspect, in some possible implementations of the first aspect, before the displaying a first interface, the method further includes: detecting, on a home screen of the electronic device, a fifth operation performed by the user to indicate to open a camera application.

In some possible implementations, before the displaying a first interface, the method further includes: detecting, on a lock screen interface of the electronic device, an operation of sliding by the user on a touchscreen.

With reference to the first aspect, in some possible implementations of the first aspect, the first object is a preset target object.

In some possible implementations, the first object is a target object automatically determined by the electronic device based on a to-be-shot subject.

In some possible implementations, the first object is an object with a largest area in the to-be-shot subject, or the first object is an object in a middle position in the to-be-shot subject.

In this solution, the electronic device may preset the target object. When the user needs to shot a long-exposure image including a preset object, the electronic device may automatically determine the first object.

With reference to the first aspect, in some possible implementations of the first aspect, the first object includes a person or an animal.

According to a second aspect, this technical solution provides an image display apparatus. The apparatus is included in an electronic device, and the apparatus has a function of implementing behavior of the electronic device in the foregoing aspect and the possible implementations of the foregoing aspect. The function may be implemented by hardware, or may be implemented by hardware by executing corresponding software. The hardware or the software includes one or more modules or units corresponding to the foregoing function, for example, a display module or unit, or an obtaining module or unit.

According to a third aspect, this technical solution provides an electronic device, including a touchscreen. The touchscreen includes a touch-sensitive surface, a display, a camera, one or more processors, a memory, a plurality of applications, and one or more computer programs. The one or more computer programs are stored in the memory, and the one or more computer programs include an instruction. When the instruction is executed by the electronic device, the electronic device is enabled to perform the method for shooting a long-exposure image in any possible implementation of any one of the foregoing aspects.

According to a fourth aspect, this technical solution provides an electronic device, including one or more processors and one or more memories. The one or more memories are coupled to the one or more processors. The one or more memories are configured to store computer program code, and the computer program code includes a computer instruction. When the one or more processors execute the computer instruction, the electronic device is enabled to perform the method for shooting a long-exposure image according to any possible implementation of any one of the foregoing aspects.

According to a fifth aspect, this technical solution provides a computer storage medium, including a computer instruction. When the computer instruction runs on an electronic device, the electronic device is enabled to perform the method for shooting a long-exposure image in any possible implementation of any one of the foregoing aspects.

According to a sixth aspect, this technical solution provides a computer program product. When the computer program product runs on an electronic device, the electronic device is enabled to perform the method for shooting a long-exposure image in any possible design of any one of the foregoing aspects.

DESCRIPTION OF EMBODIMENTS

Figure 1:
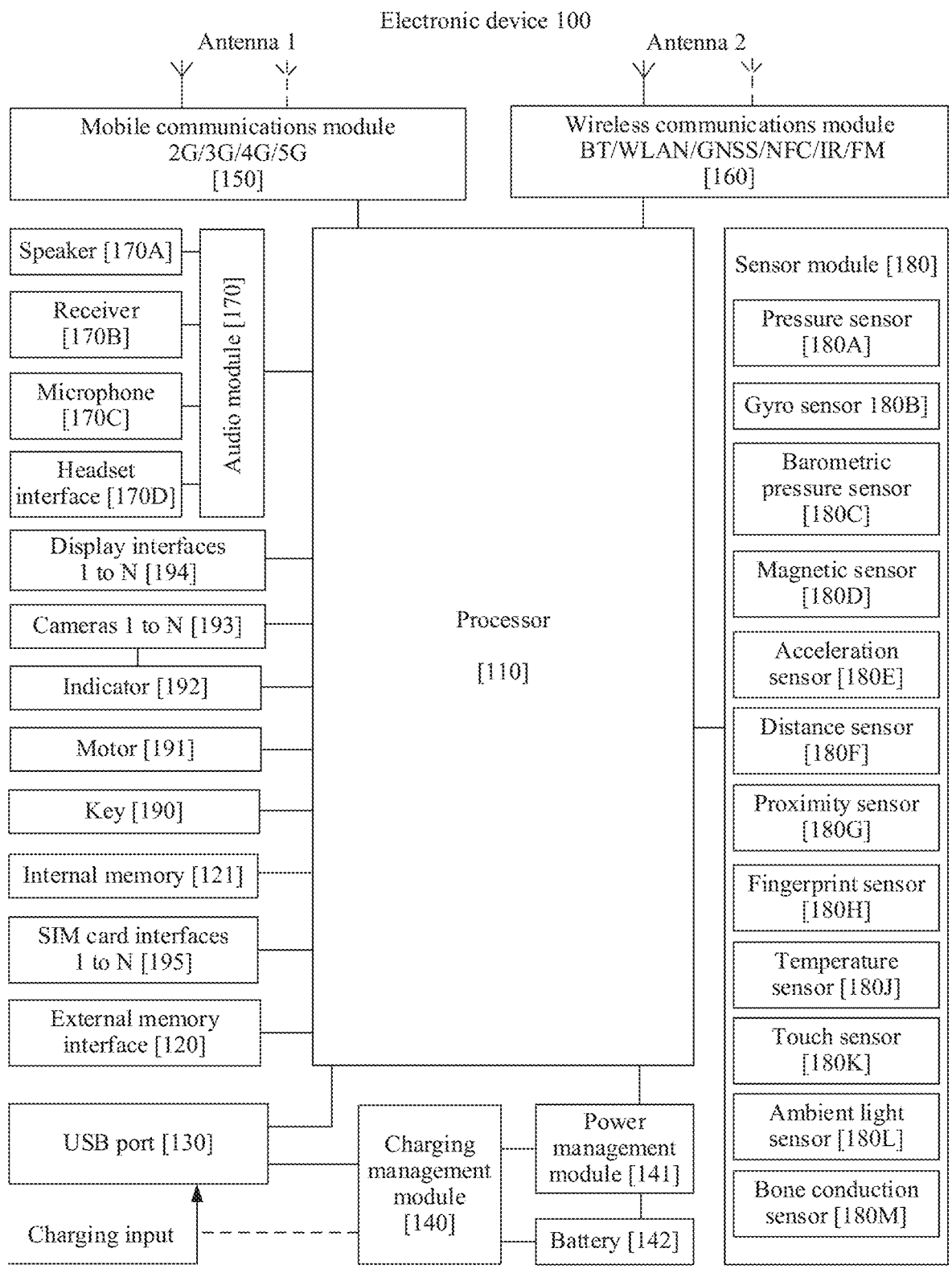
FIG. 1 is a schematic diagram of a hardware structure of an electronic device according to an embodiment of this application.

The following describes the technical solutions in the embodiments of this application with reference to the accompanying drawings in the embodiments of this application. In descriptions of the embodiments of this application, "/" means "or" unless otherwise specified. For example, A/B may represent A or B. In this specification. "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments, unless otherwise stated, "a plurality of" means two or more than two.

Currently, when all mobile phones perform long-exposure shooting, indiscriminate long-exposure processing is performed on a scene in a lens. In other words, when a user wants to shoot a long-exposure photo, existing devices and technologies can already implement this requirement of the user. However, when the user expects to shoot a portrait or another object that is not completely static on a basis of a long-exposure photo, quality of a shot photo deteriorates. This is mainly because in a shooting process, a person or an object used as a foreground needs to be completely static, otherwise a final image is blurred.

The embodiments of this application provide a method for shooting a long-exposure image, which may be applied to an electronic device. When a user expects to shoot a person, an animal, or another foreground target that is not completely static on a basis of the long-exposure image, a foreground and a background in the image may be segmented, and long-exposure processing is performed on the background, but the long-exposure processing is not performed on a foreground photo, to obtain an image with a clear foreground and a long-exposure background. This improves an image processing effect and user visual experience. However, as in the prior art, indiscriminate long-exposure processing is performed on the foreground and the background, and when a person or another foreground target that is not completely static exists in the foreground, the foreground target in a shot long-exposure image is blurred.

An image segmentation method may be used to segment the foreground and the background in the image. Image segmentation may be also referred to as semantic segmentation, and is a technology and a process of segmenting an image into several particular areas having special properties, and specifying a target attracting an interest. There may be a plurality of image segmentation methods, for example, a convolutional neural network (convolutional neural network, CNN)-based segmentation method, a threshold-based segmentation method, an area-based segmentation method, an edge-based segmentation method, and a particular theory-based segmentation method.

The method for shooting a long-exposure image provided in the embodiments of this application may be applied to an electronic device such as a mobile phone, a tablet computer, a wearable device, a vehicle-mounted device, an augmented reality (augmented reality. AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

For example, FIG. 1 is a schematic diagram of a structure of an electronic device 100. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a key 1X), a motor 191, an indicator 192, a camera 193, a display interface 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit. GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data just used or cyclically used by the processor 110. If the processor 110 needs to use the instruction or the data again, the processor 110 may directly invoke the instruction or the data from the memory. This avoids repeated access and reduces waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 through the PCM bus interface. In some embodiments, the audio module 170 may also transmit an audio signal to the wireless communications module 160 through the PCM interface, to implement the function of answering a call by using a Bluetooth headset. Both the I2S interface and the PCM interface may be used for the audio communication.

The UART interface is a universal serial data bus used for asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to peripheral devices such as the display interface 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 100. The processor 110 communicates with the display interface 194 through the DSI interface, to implement a display function of the electronic device 100.

The GPIO interface may be configured through software. The GPIO interface may be configured as a control signal, or may be configured as a data signal. In some embodiments, the GPIO interface may be configured to connect the processor 110 to the camera 193, the display interface 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type C interface, or the like. The USB interface 130 may be configured to connect to a charger to charge the electronic device 100, may be configured to transmit data between the electronic device 100 and a peripheral device, or may be configured to connect to a headset to play audio by using the headset. Alternatively, the interface may be configured to connect to another electronic device, for example, an AR device or the like.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive charging input from a charger. The charger may be a wireless charger, or may be a wired charger. In some embodiments of wired charging, the charging management module 140 may receive charging input from the wired charger through the USB interface 130. In some embodiments of wireless charging, the charging management module 140 may receive wireless charging input by using a wireless charging coil of the electronic device 100. When the charging management module 140 charges the battery 142, the power management module 141 may further supply power to the electronic device.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display interface 194, the camera 193, the wireless communications module 160, and the like. The power management module 141 may be further configured to monitor parameters such as a battery capacity, a quantity of battery cycles, and a battery health status (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution that is applied to the electronic device 100 and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into an intermediate-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (not limited to the speaker 170A, the receiver 170B, and the like), or displays an image or a video by using the display interface 194. In some embodiments, the modem processor may be an independent device. In some other embodiments, the modem processor may be independent of the processor 110, and is disposed in a same device with the mobile communications module 150 or another functional module.

The wireless communications module 160 may provide a wireless communication solution that includes a wireless local area network (wireless local area networks. WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system. QZSS), and/or satellite based augmentation systems (satellite based augmentation systems, SBAS).

The electronic device 100 implements a display function by using the GPU, the display interface 194, the application processor, and the like. The GPU is a microprocessor for image processing, and is connected to the display interface 194 and the application processor. The GPU is configured to perform mathematical and geometric calculation, and is used for graphics rendering. The processor 110 may include one or more GPUs that execute a program instruction to generate or change display information.

The display interface 194 is configured to display an image, a video, and the like. The display interface 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a miniled, a microLed, a micro-oLed, quantum dot light emitting diodes (quantum dot light emitting diodes, QLED), or the like. In some embodiments, the electronic device 100 may include one or N display interfaces 194, where N is a positive integer greater than 1.

The electronic device 100 may implement a shooting function by using the ISP, the camera 193, the video codec, the GPU, the display interface 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a static image or a video. An optical image is generated for an object by using the lens, and the optical image is projected to the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 can play or record videos in a plurality of encoding formats, for example, a moving picture experts group (moving picture experts group, MPEG)1, an MPEG2, an MPEG3, an MPEG4, and the like.

The NPU is a neural-network (neural-network. NN) computing processor, quickly processes input information by referring to a structure of a biological neural network, for example, by referring to a transfer mode between human brain neurons, and may further continuously perform self-learning. The NPU may implement applications such as intelligent cognition of the electronic device 100, for example, image recognition, facial recognition, speech recognition, text comprehension, and the like.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code, where the executable program code includes an instruction. The processor 110 performs various functional applications and data processing of the electronic device 100 by running the instruction stored in the internal memory 121. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, or may include a non-volatile memory, for example, at least one magnetic disk storage device, a flash storage device, a universal flash storage (universal flash storage, UFS), or the like.

The electronic device 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When the electronic device 100 is configured to answer a call or listen to voice information, the receiver 170B may be placed close to a human ear to listen to a voice.

The microphone 170C, also referred to as a "mike" or a "mic", is configured to convert a sound signal into an electrical signal. When making a call or sending voice information, a user may move a mouth close to the microphone 170C and make a sound, to input a sound signal into the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal and reduce noise. The microphones may further identify a sound source, implement a directional recording function, and the like.

The headset interface 170D is configured to connect to a wired headset. The headset interface 170D may be the USB interface 130, or may be a 3.5 mm open mobile terminal platform (open mobile terminal platform. OMTP) standard interface, or a cellular telecommunications industry association of the USA (cellular telecommunications industry association of the USA. CTIA) standard interface.

The pressure sensor 180A is configured to sense a pressure signal, and may convert the pressure signal into an electrical signal. In some embodiments, the pressure sensor 180A may be disposed in the display interface 194. There are a plurality of types of pressure sensors 180A, for example, a resistive pressure sensor, an inductive pressure sensor, a capacitive pressure sensor, and the like. The capacitive pressure sensor may include at least two parallel plates that have conductive materials. When force is exerted on the pressure sensor 180A, capacitance between electrodes changes. The electronic device 100 determines pressure strength based on a change of the capacitance. When a touch operation is performed on the display interface 194, the electronic device 100 detects strength of the touch operation by using the pressure sensor 180A. The electronic device 100 may also calculate a touch position based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of an SMS application, an instruction for viewing an SMS message is executed. When a touch operation whose touch operation strength is greater than or equal to the first pressure threshold is performed on an icon of the SMS application, an instruction for creating an SMS message is executed.

The gyro sensor 180B may be configured to determine a motion posture of the electronic device 100. In some embodiments, an angular velocity of the electronic device 100 around three axes (that is, an x-axis, a y-axis, and a z-axis) may be determined by using the gyro sensor 180B. The gyro sensor 180B may be configured to perform image stabilization during shooting. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement the image stabilization. The gyro sensor 180B may be further configured for navigation and motion sensing game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening/closing of a clamshell leather case by using the magnetic sensor 180D. In some embodiments, when the electronic device 100 is a clamshell phone, the electronic device 100 may detect opening/closing of a clamshell by using the magnetic sensor 180D. Further, a feature, for example, automatic unlocking of a flip cover is set based on a detected opening or closing state of the leather case or a detected opening or closing state of the flip cover.

The acceleration sensor 180E may detect a magnitude of an acceleration of the electronic device 100 in each direction (usually, three axes). When the electronic device 100 is static, a magnitude and a direction of gravity may be detected. The acceleration sensor 180E may be further configured to identify a posture of the electronic device, and is applied to applications such as landscape/portrait mode switching and a pedometer.

The distance sensor 180F is configured to measure a distance. The electronic device 100 may measure a distance through infrared or laser. In some embodiments, in a shooting scenario, the electronic device 100 may measure a distance by using the distance sensor 180F, to implement fast focusing.

For example, the optical proximity sensor 180G may include a light emitting diode (LED) and an optical detector, for example, a photodiode. The light emitting diode may be an infrared light emitting diode. The electronic device 100 emits infrared light by using the light emitting diode. The electronic device 100 detects, by using the photodiode, infrared reflected light that comes from a nearby object. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that a user holds the electronic device 100 close to an ear for a call, to automatically turn off a screen to save power. The optical proximity sensor 180G may also be configured for automatic screen locking or unlocking in a leather case mode or a pocket mode.

The ambient light sensor 180L is configured to sense luminance of ambient light. The electronic device 100 may adaptively adjust luminance of the display interface 194 based on the sensed luminance of the ambient light. The ambient light sensor 180L may also be configured to automatically adjust white balance during photographing. The ambient light sensor 180L may further cooperate with the optical proximity sensor 180G to detect whether the electronic device 100 is in a pocket, to prevent a false touch.

The fingerprint sensor 180H is configured to collect a fingerprint. The electronic device 100 may use a feature of the collected fingerprint to implement fingerprint-based unlocking, unlocking for application access, fingerprint-based photographing, fingerprint-based call answering, and the like.

The temperature sensor 180J is configured to detect temperature. In some embodiments, the electronic device 100 executes a temperature processing policy based on the temperature detected by the temperature sensor 180J. For example, when temperature reported by the temperature sensor 180J exceeds a threshold, the electronic device 100 degrades performance of a processor near the temperature sensor 180J, to reduce power consumption and implement thermal protection. In some other embodiments, when temperature is lower than another threshold, the electronic device 100 heats up the battery 142, to avoid abnormal shutdown of the electronic device 100 due to low temperature. In some other embodiments, when temperature is lower than still another threshold, the electronic device 100) boosts an output voltage of the battery 142 to avoid abnormal shutdown due to low temperature.

The touch sensor 180K is also referred to as a "touch panel". The touch sensor 180K may be disposed in the display interface 194, and the touch sensor 180K and the display interface 194 form a touchscreen, which is also referred to as a "touch control screen". The touch sensor 180K is configured to detect a touch operation acting on or near the touch sensor 180K. The touch sensor may transmit the detected touch operation to the application processor, to determine a type of a touch event. Visual output related to the touch operation may be provided by using the display interface 194. In some other embodiments, the touch sensor 180K may be alternatively disposed on a surface of the electronic device 100, and is at a position different from that of the display interface 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may be alternatively disposed in a headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The button 190 may be a mechanical button, or may be a touch button. The electronic device 100 may receive key input, and generate key signal input related to user settings and function control of the electronic device 100.

The motor 191 may generate a vibration prompt. The motor 191 may be configured to produce a vibration prompt for an incoming call, or may be configured to produce a touch vibration feedback. For example, touch operations performed on different applications (for example, photographing and audio playing) may correspond to different vibration feedback effects. The motor 191 may also correspond to different vibration feedback effects for touch operations performed on different areas of the display interface 194. Different application scenarios (for example, a time reminder, information receiving, an alarm clock, a game, and the like) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted in a same SIM card interface 195. The plurality of cards may be of a same type, or may be of different types. The SIM card interface 195 may also be compatible with different types of SIM cards. The SIM card interface 195 may also be compatible with an external storage card. The electronic device 100 interacts with a network by using the SIM card, to implement functions such as calling and data communication. In some embodiments, the electronic device 100 uses an eSIM, namely, an embedded SIM card. The eSIM card may be embedded in the electronic device 100, and cannot be separated from the electronic device 1X).

In this embodiment of this application, in a shooting scenario, the camera 193 may capture a plurality of photos or videos, the ISP processes data fed back by the camera 193, and the processor 110 may determine, from the plurality of photos or videos, one frame of photo of a to-be-extracted foreground target. The NPU in the processor 110 may perform image segmentation on the frame of photo, to determine areas in which different objects and different object types are respectively located in an image. The processor 110 may determine an object or an area as a foreground target, and another object or another area as a background. When generating a long-exposure image, the processor 110 performs long-exposure processing on the background, and retains a clear foreground target, to obtain an image with a clear foreground and a long-exposure background.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
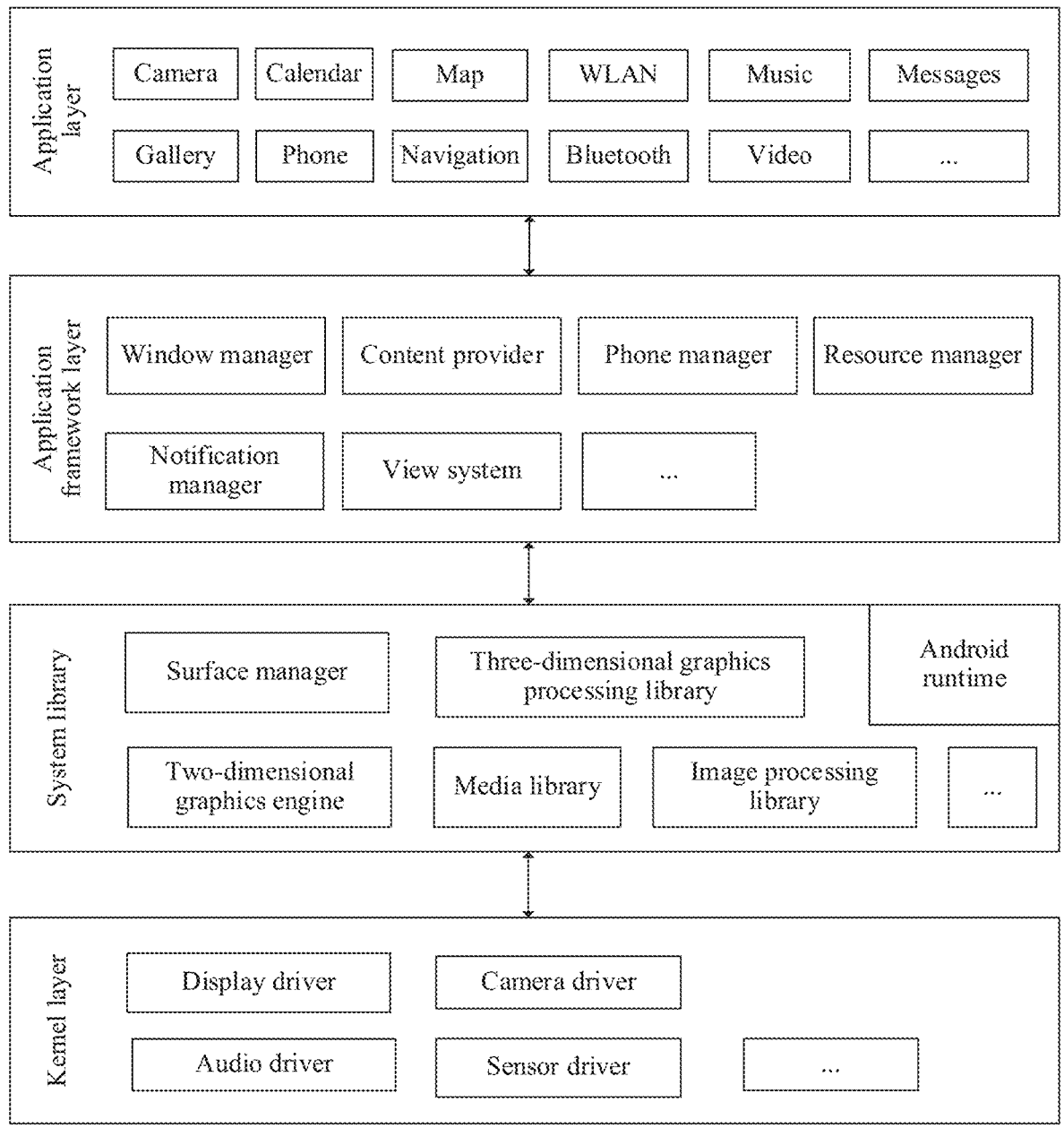
FIG. 2 is a schematic diagram of a software structure of an electronic device according to an embodiment of this application.

FIG. 2 is a block diagram of the software structure of the electronic device 100 according to this embodiment of this application. In the layered architecture, software is divided into several layers, and each layer has a clear role and task. The layers communicate with each other through software interfaces. In some embodiments, the Android system is divided into four layers, namely, an application layer, an application framework layer, an Android runtime (Android runtime) and system library, and a kernel layer from top to bottom. The application layer may include a series of application packages.

As shown in FIG. 2 the application package may include applications such as "camera", "gallery", "calendar", "calls". "maps", "navigation", "WLAN", "Bluetooth", "music". "videos", and "messages".

The application framework layer provides an application programming interface (application programing interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display interface, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system can be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources for an application, such as a localized string, an icon, an image, a layout file, and a video file.

The notification manager enables an application to display notification information in a status bar, and may be configured to convey a notification message. The notification manager may automatically disappear after a short pause without requiring user interaction. For example, the notification manager is configured to notify download completion, provide a message notification, and the like. The notification manager may alternatively be a notification that appears in a top status bar of the system in a form of a graph or a scroll bar text, for example, a notification of an application running on a background or a notification that appears on a screen in a form of a dialog box. For example, text information is prompted in the status bar, an alert sound is produced, the electronic device vibrates, or an indicator light blinks.

The Android runtime includes a core library and a virtual machine. The Android runtime is responsible for scheduling and management of the Android system.

The core library includes two parts: a function that needs to be invoked in java language and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording in a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this application, referring to FIG. 2, the system library may further include an image processing library. After a camera application is started, the camera application may obtain an image captured by the electronic device. After areas of objects are obtained, the image processing library may determine, from a current image, an area in which one or more objects are located as a foreground target, and another area other than the foreground target is used as a background, to retain a clear foreground target in a finally generated long-exposure image.

For ease of understanding, in the following embodiments of this application, a mobile phone having the structures shown in FIG. 1 and FIG. 2 is used as an example to specifically describe, with reference to the accompanying drawings, the method for shooting a long-exposure image in the shooting scenario provided in the embodiments of this application.

FIG. 3(*a*) to FIG. 3(*h*) show a group of graphical user interfaces (graphical user interface, GUI) of the mobile phone. FIG. 3(*a*) to FIG. 3(*h*) show a process from starting a camera application to obtaining a long-exposure image with background light painting and a clear foreground.

In this embodiment of this application, the background light painting may be understood as performing long-exposure processing on an area in which a background of a to-be-shot object is located. For example, when the background is a moving object (for example, a vehicle or a water flow), a plurality of frames of image of the moving object may be synthesized to obtain an overlapping display effect. That the foreground is clear may be understood as that the long-exposure processing is not performed on an area in which the foreground of the to-be-shot object is located, to avoid foreground blur caused by foreground movement. For example, when the foreground is a person, a moving object, or another object that is not completely static, the clear foreground in one frame of image may be extracted, or after a plurality of frames of image are synthesized into one frame of image, the clear foreground may be extracted from the synthesized image. Finally, the long-exposure image with the background light painting and the clear foreground is obtained by combining the background obtained after the long-exposure processing and the clear foreground.

Referring to FIG. 3(*a*), the GUI is a home screen 301 of the mobile phone. When detecting an operation that a user taps an icon 302 of a camera application (application, APP) on the home screen 301, the mobile phone may start the camera application, and display a GUI shown in FIG. 3(*b*). The GUI may be referred to as a shooting interface 303. The shooting interface 303 may include a viewfinder frame 304. In a preview state, a preview image may be displayed in the viewfinder frame 304 in real time. After detecting that the user taps a shooting control 306, the mobile phone performs a shooting operation and saves a shot photo. After detecting that the user taps an album icon 307, the mobile phone can display a photo or video that has been shot on a touchscreen.

It may be understood that, after the mobile phone detects an operation that the user taps the icon 302, after the mobile phone opens the camera application, the mobile phone is in a shooting mode by default. The GUI interface further includes a video recording mode, a professional mode, and more modes. After detecting that the user taps an icon 305 of the more modes, the mobile phone displays a GUI shown in FIG. 3(*c*).

Referring to FIG. 3(*c*), a plurality of shooting modes may be displayed on the GUI. After detecting an operation that the user taps a light painting icon 308, the mobile phone may enter a light painting mode, and display another GUI shown in FIG. 3(*d*).

Referring to FIG. 3(*d*), the GUI may be referred to as a light painting shooting interface. To meet shooting requirements of the user in different shooting scenarios, the light painting mode is further divided into five modes. The five modes are: tail light trails, light graffiti, silky water, star track, and background light painting. Table 1 describes application scenarios of the five modes.

TABLE 1

Application scenarios of the five modes

| Light painting mode | Application scenario |
| --- | --- |
| Tail light trails | Shooting moving tracks of headlights on an overbridge at night |
| Light graffiti | Shooting a moving track of a moving low-light light source |
| Silky water | Shooting moving water by a waterfall or a river in summer |
| Star track | Shooting moving tracks of stars in deep starry sky at night |
| Background light painting | Shooting an image with a clear foreground and a long-exposure background of a moving object included in the foreground |

Figure 3A:
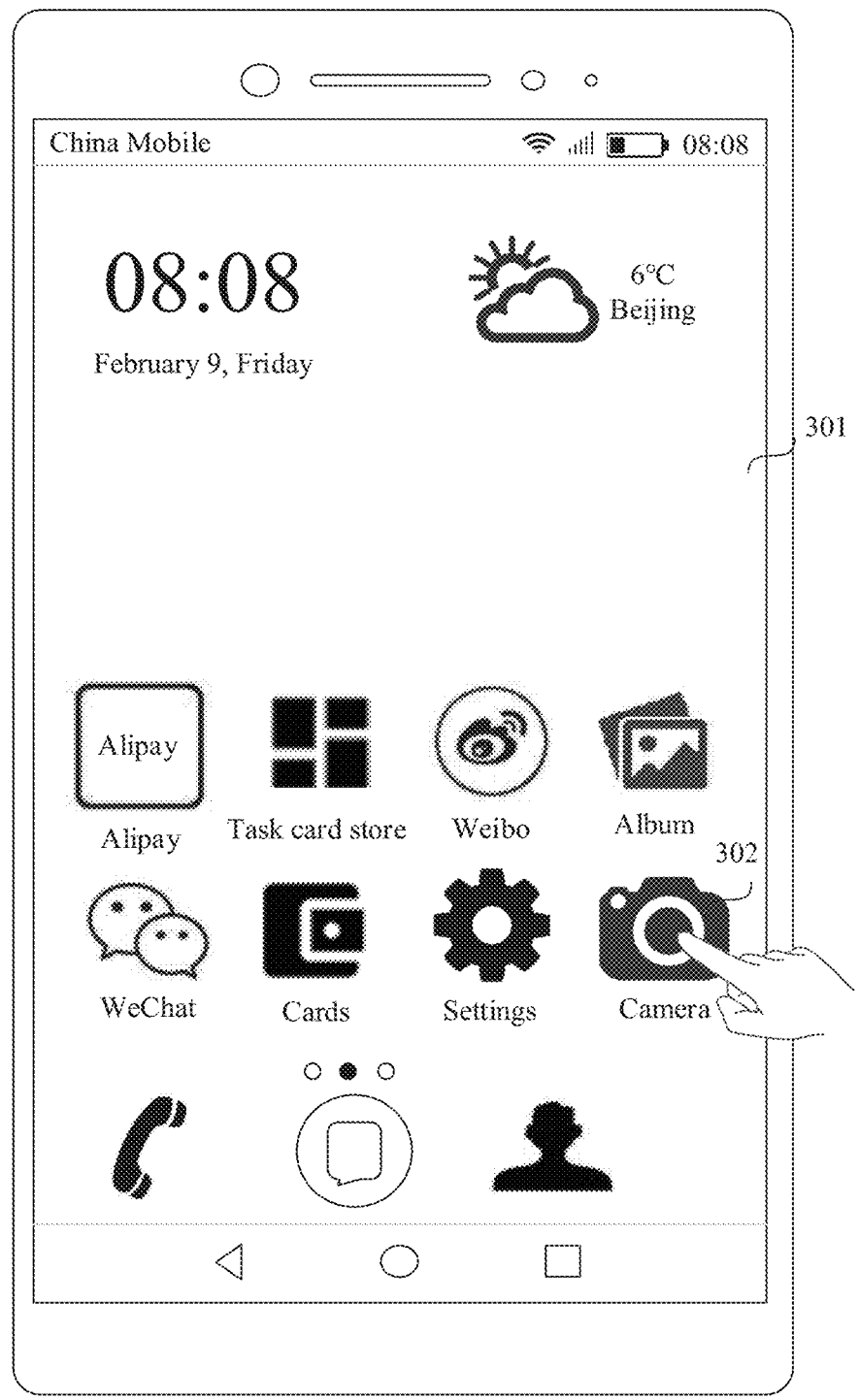
FIG. 3(a) to FIG. 3(h) are schematic diagrams of a group of display interfaces according to an embodiment of this application.
Figure 3B:
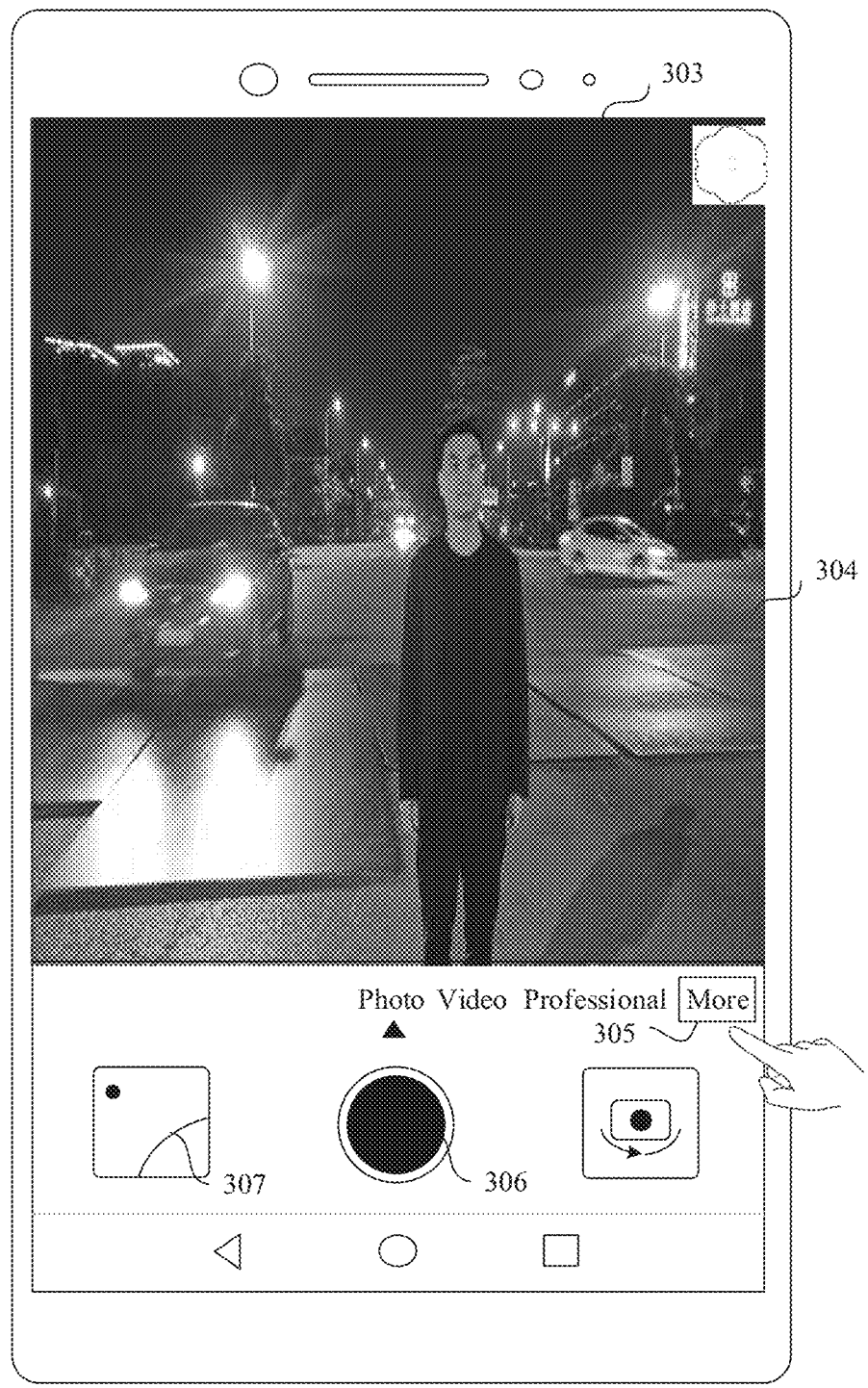
Figure 3C:
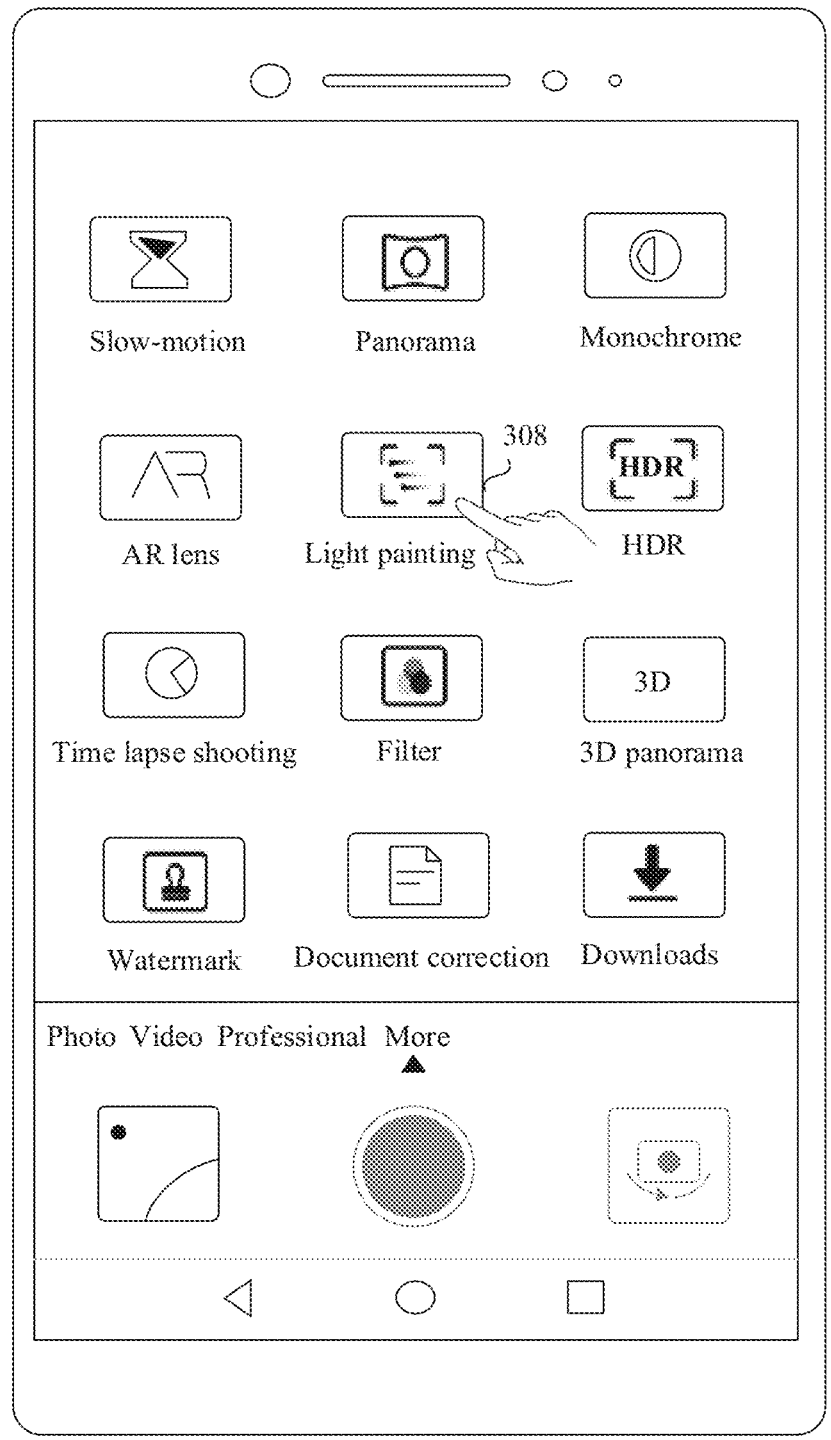
Figure 3D:
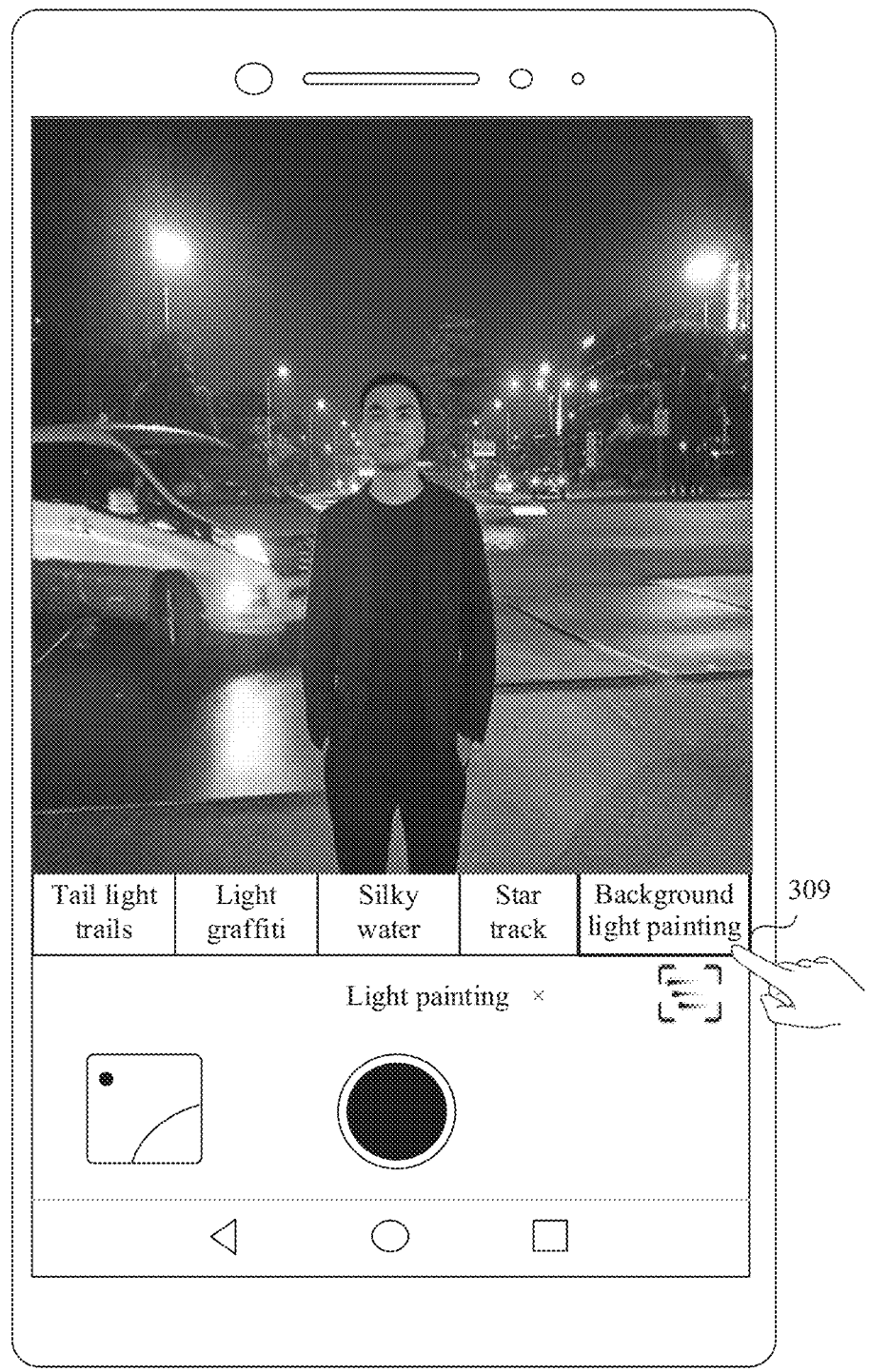
Figure 3E:
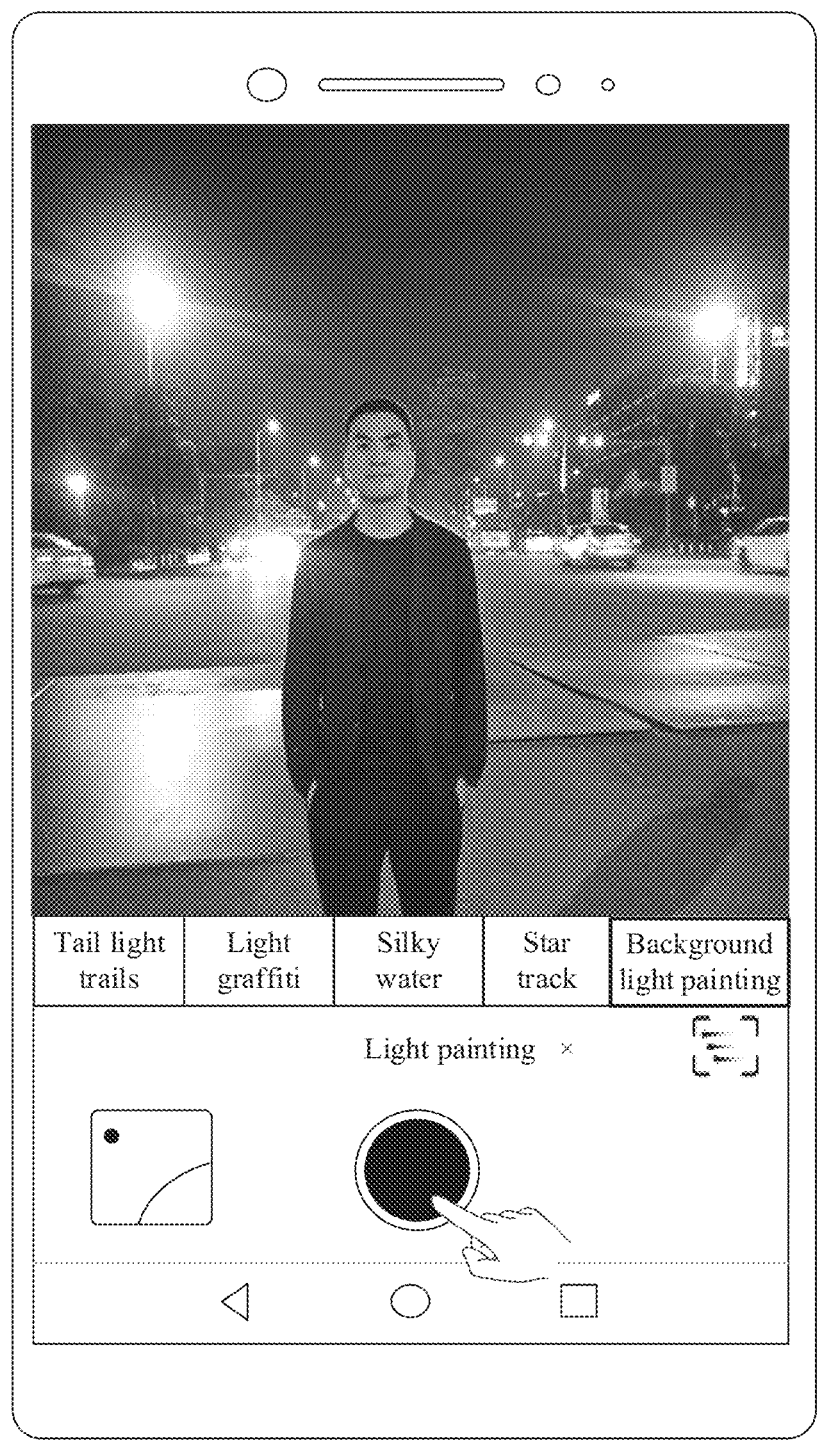

Referring to FIG. 3(d), after detecting that the user taps a background light painting icon 309, the mobile phone displays another GUI shown in FIG. 3(e).

Figure 3F:
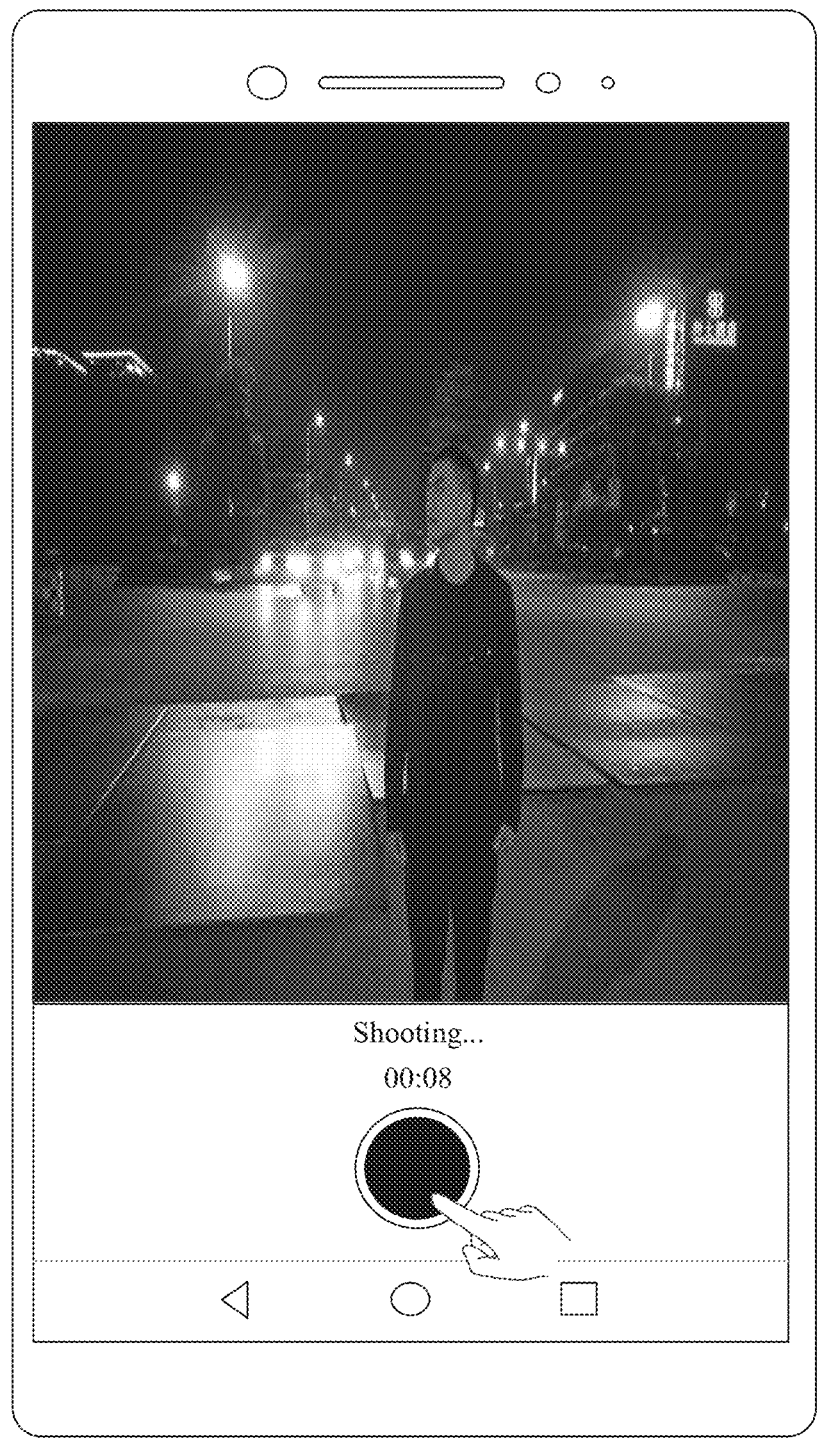

Referring to FIG. 3(e), in the GUI, the user may shot an image with a clear foreground and a long-exposure background. After detecting an operation that the user taps the control 306, the mobile phone starts to shot a background light painting image, and displays a GUI shown in FIG. 3(f). Referring to FIG. 3(f), after detecting an operation that the user taps the control 306 again, the mobile phone stops shooting, generates a long-exposure image, and stores the long-exposure image in an album.

Figure 3G:
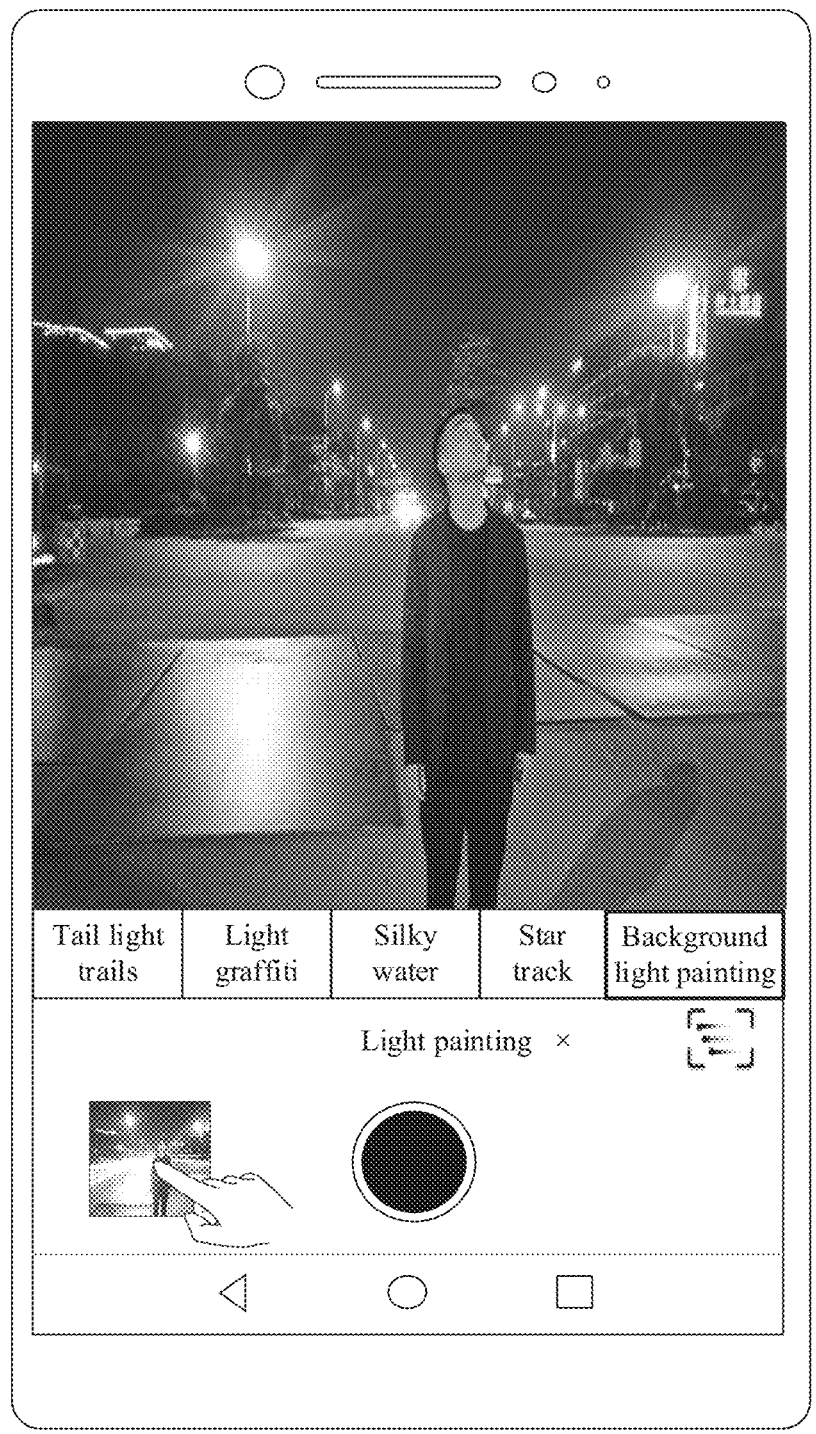
Figure 3H:
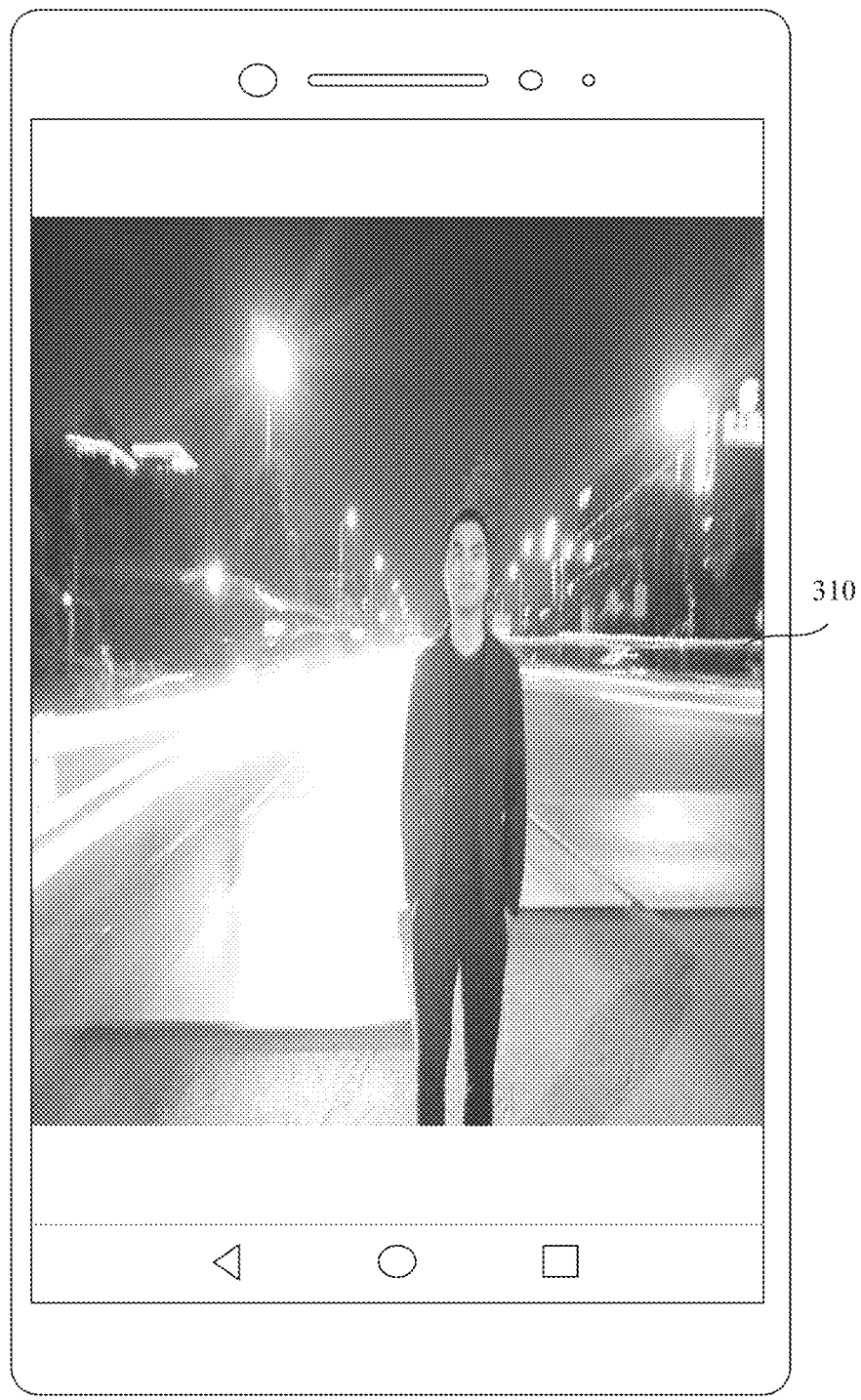

Referring to a GUI shown in FIG. 3(g), after detecting an operation that the user taps the icon 307 of the album, the mobile phone displays a GUI shown in FIG. 3(h).

Referring to FIG. 3(h), a background light painting image is presented to the user on the GUI.

In a possible implementation, a classification of an object in a current viewfinder frame may be further displayed on a GUI shown in FIG. 3(e). For example, a classification of an object category in the current viewfinder frame may be displayed (for example, the classification of the object category may be a person, a vehicle, a construction, or the like), or a classification of an individual object in the current viewfinder frame may be displayed (for example, the classification of the individual object may be a boy, a vehicle, a high-rise building on the right, a tree, or the like). The mobile phone may prompt, in a text prompt (or a voice prompt) manner, the user to select a clear target. The clear target is used as a clear object in a finally generated long-exposure image. For example, when detecting that the user taps the boy in the classification of the individual object, the mobile phone may determine that the user expects the boy as the foreground. After detecting an operation that the user taps the shooting control 306, the mobile phone performs operations from FIG. 3(f) to FIG. 3(h).

The foregoing describes, with reference to FIG. 3(a) to FIG. 3(h), a group of GUIs for shooting a long-exposure image according to an embodiment of this application. As shown in FIG. 3(a) to FIG. 3(h), the mobile phone may generate, in the background light painting mode, an image with a clear foreground and a long-exposure background.

Optionally, when selecting the foreground, the mobile phone may randomly select, or select, according to a specific algorithm, an area in which an object in one frame of image within a shooting duration or in an image synthesized from a plurality of frames of image is located as the foreground, and perform a long-exposure operation on an area other than the foreground as the background.

The foregoing describes, with reference to the GUIs in FIG. 3(a) to FIG. 3(h), the process of shooting a long-exposure image in this embodiment of this application. In this embodiment, the mobile phone may randomly select one frame of image from a shot video (or a plurality of frames of image), or select a foreground target in an image generated after multi-frame processing as a foreground target in the finally generated long-exposure image, and perform the long-exposure processing on an area other than the foreground.

In a possible implementation, the mobile phone may select a most beautiful frame of image from the shot video (or the plurality of frames of image). For this process, refer to U.S. Ser. No. 16/131,681. For brevity, details are not described herein again.

In another possible implementation, the mobile phone may select, by default, a first frame of image or a fixed foreground target in a frame of image from the shot video (or the plurality of frames of image) as the foreground target in the finally generated long-exposure image.

In another possible implementation, the mobile phone may select, based on an operation of the user, a front-facing camera or a rear-facing camera to perform shooting, to generate the image with a clear foreground and a long-exposure background.

It should be understood that the "foreground" in this embodiment of this application may also be understood as a clear object. To be specific, the mobile phone may select a clear object in a first area from one frame of image or an image synthesized from a plurality of frames of image, perform the long-exposure processing on an object in a second area in the shot video (or the plurality of frames of image), and finally splice an image of the clear object in the first area and a long-exposure image in the second area, to finally generate the image with a clear foreground and a long-exposure background.

It should be further understood that, in addition to the first area and the second area, there may be another area in the image with a clear foreground and a long-exposure background. For example, the long-exposure image further includes a third area, and the third area is an area in which a watermark is located.

It should be further understood that, in this embodiment of this application, as shown in FIG. 3(f), after detecting an operation that the user taps the shooting control 306 again, the mobile phone may generate a final long-exposure image and store the final long-exposure image in the album. Alternatively, the mobile phone may store both the generated long-exposure image and a video captured when the long-exposure image is shot in the album.

Optionally, after detecting a first operation of the user, the mobile phone may select one or more frames of image as an image for extracting the foreground target.

Figure 4A:
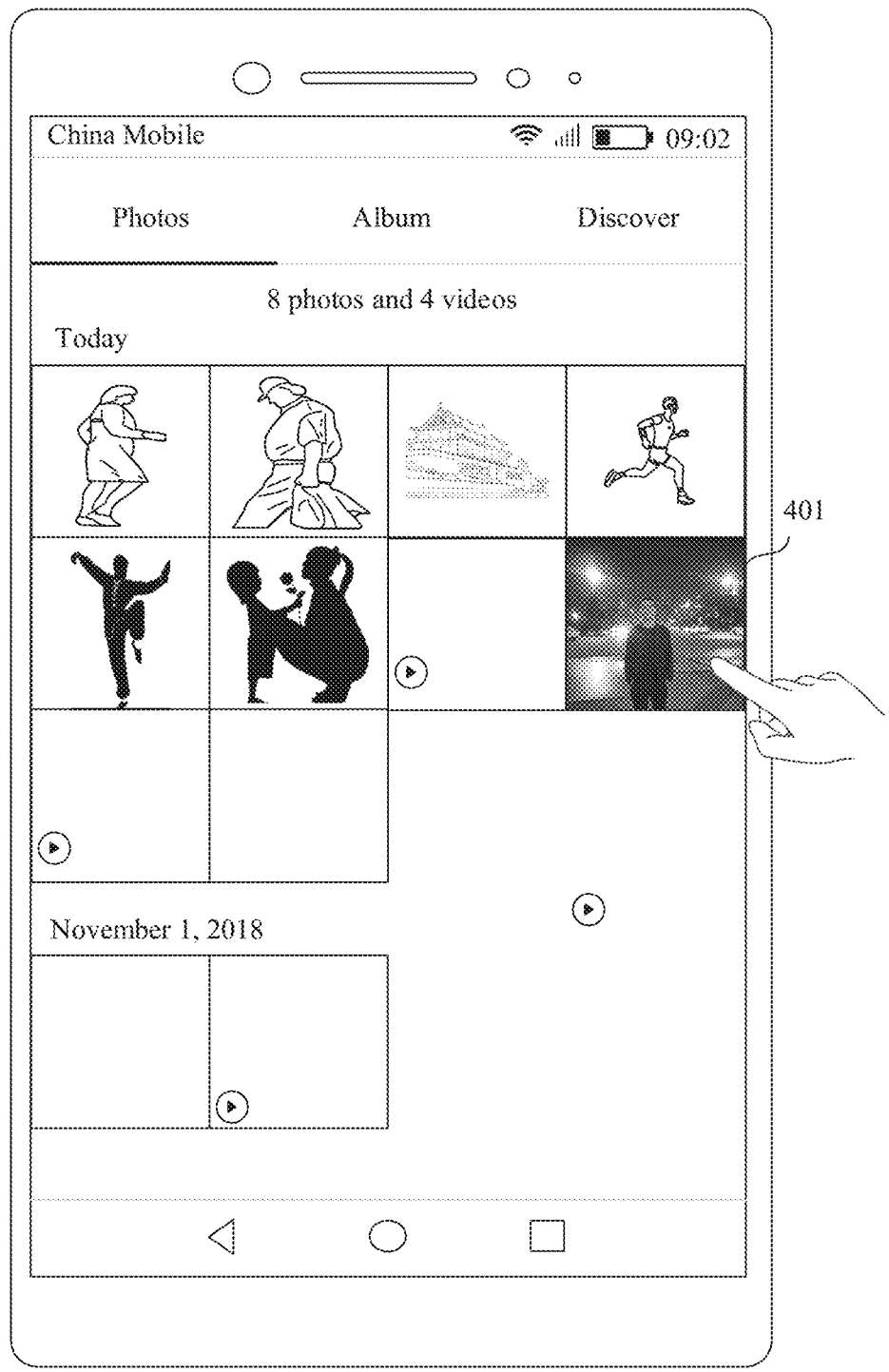
FIG. 4(a) to FIG. 4(e) are schematic diagrams of another group of display interfaces according to an embodiment of this application.

For example, as shown in FIG. 4(a), after starting the album, the mobile phone may display, on the touchscreen, that eight photos and four videos are stored in the current album. After detecting a preset gesture of the user on a video 401, the mobile phone displays a GUI shown in FIG. 4(b). The mobile phone reminds the user in a text prompt (or a voice prompt) manner that "Please select a processing mode".

Figure 4B:
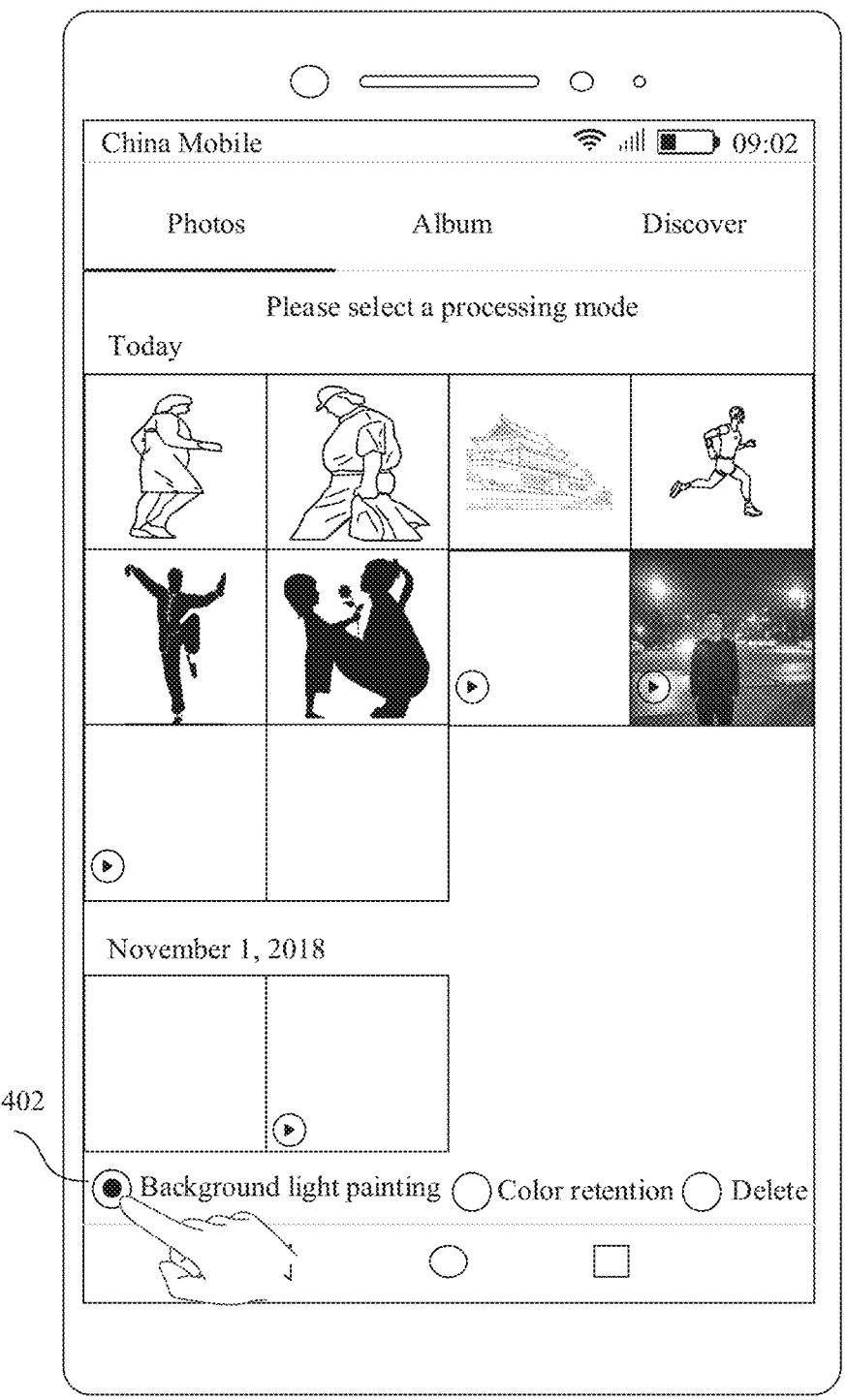
Figure 4C:
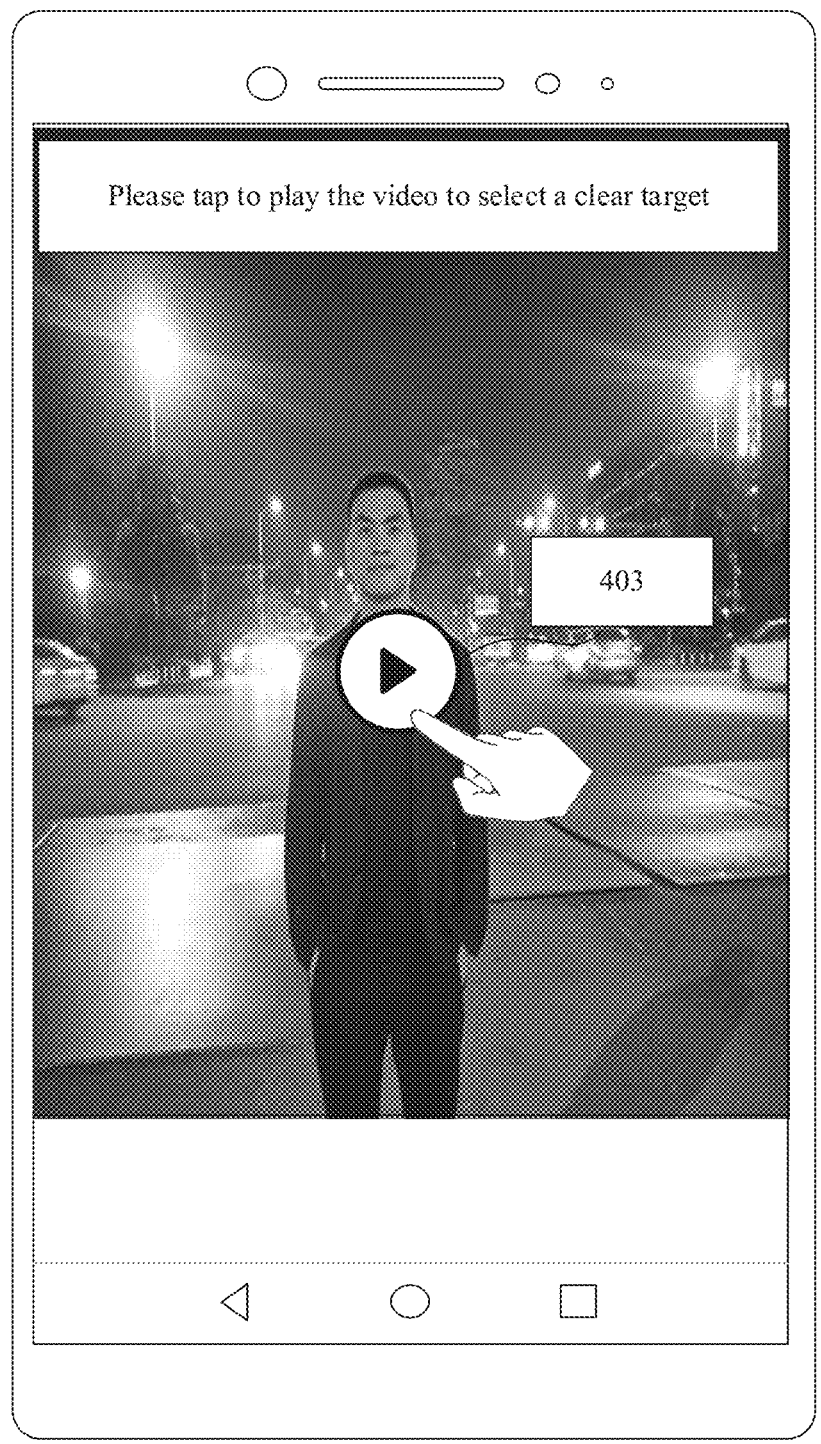
Figure 4D:
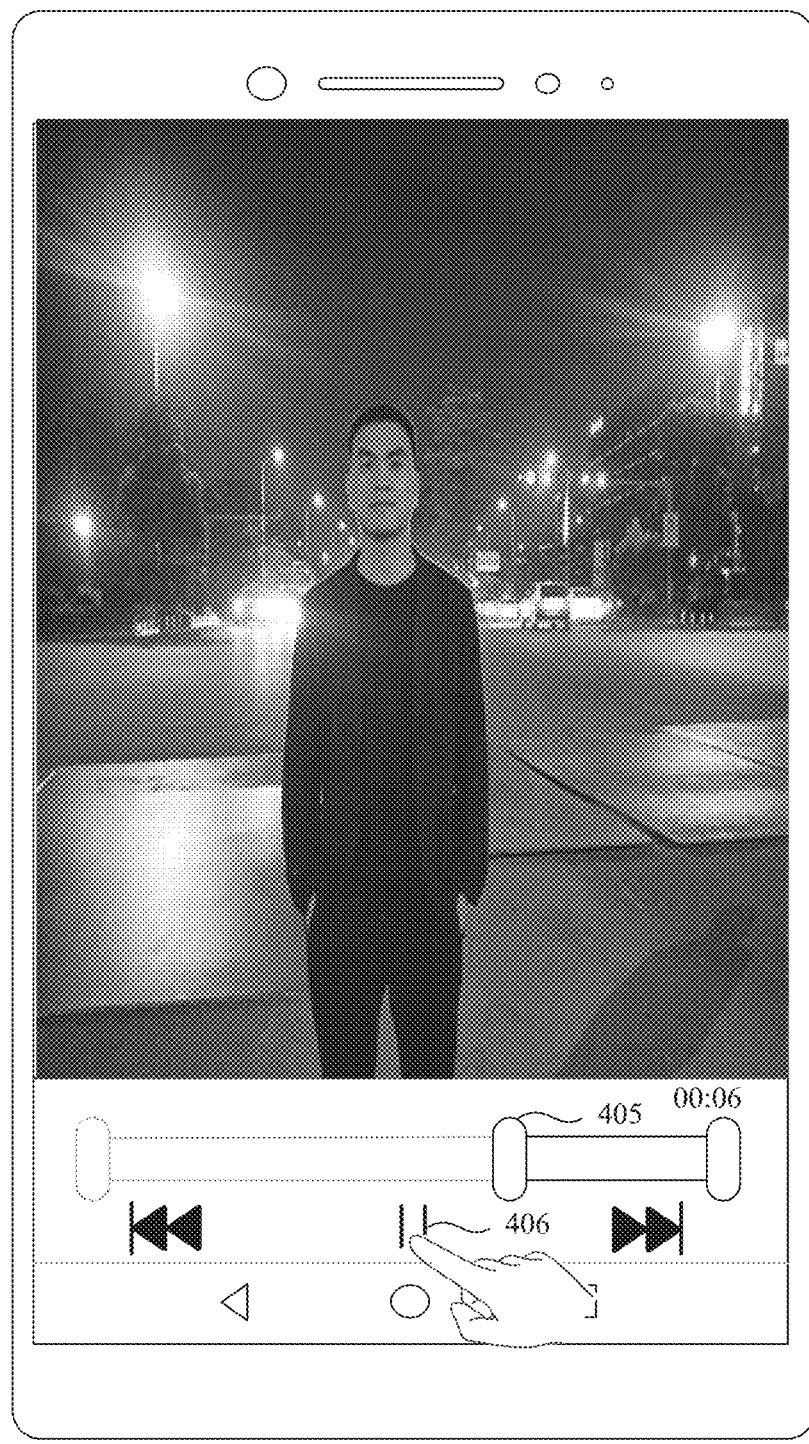
Figure 4E:
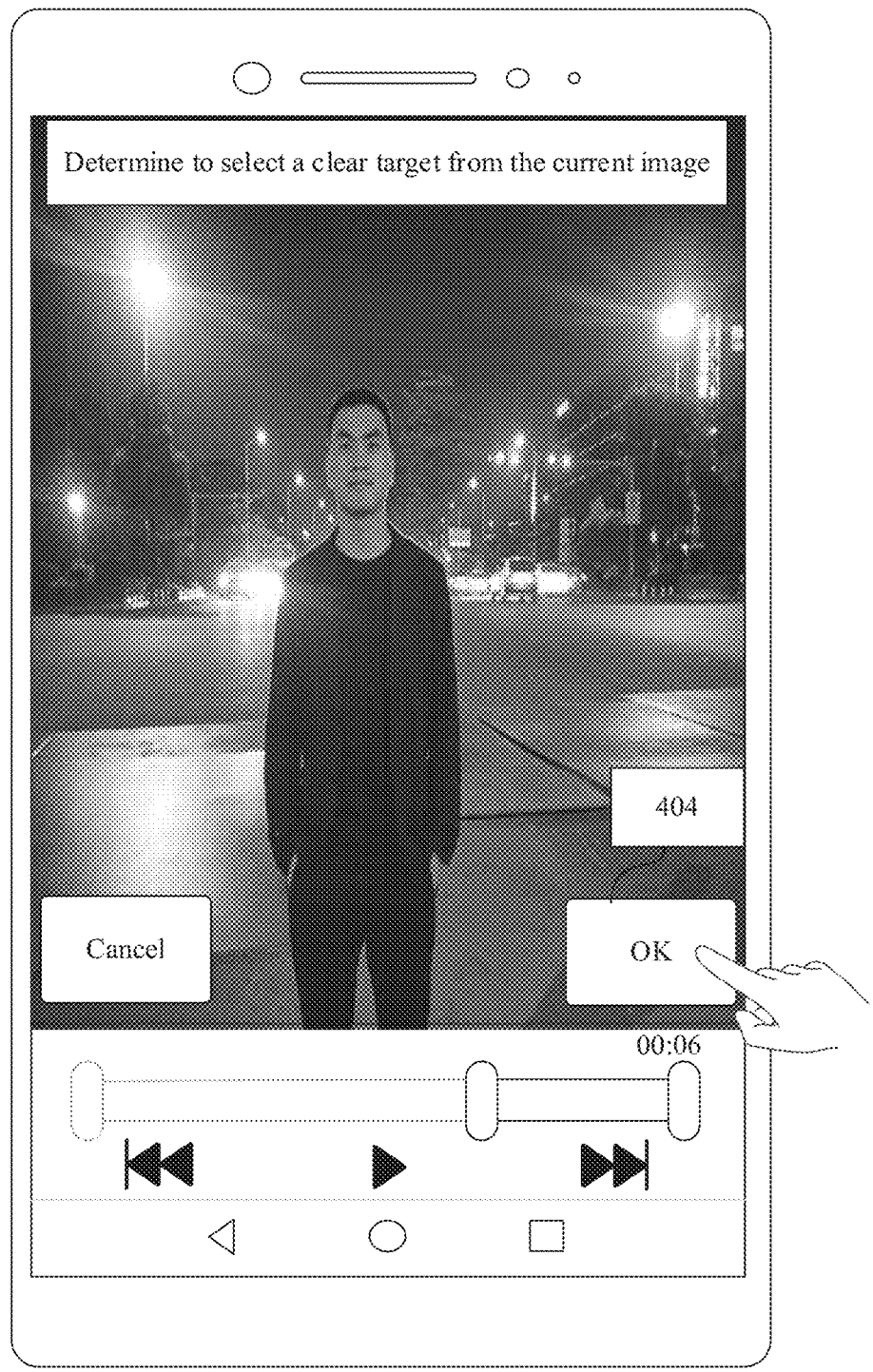
Figure 5A:
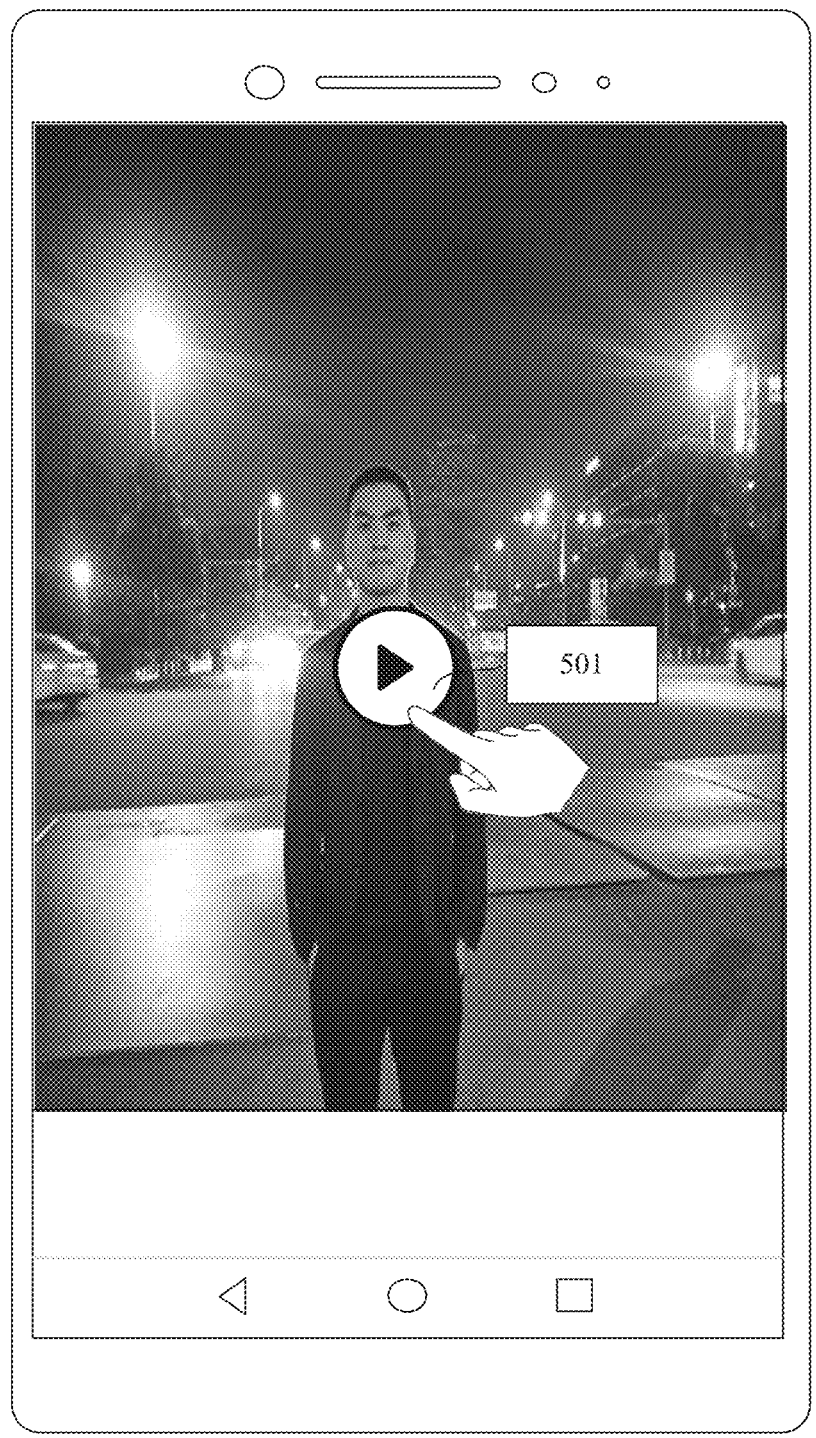
FIG. 5(a) to FIG. 5(d) are schematic diagrams of another group of display interfaces according to an embodiment of this application.
Figure 5B:
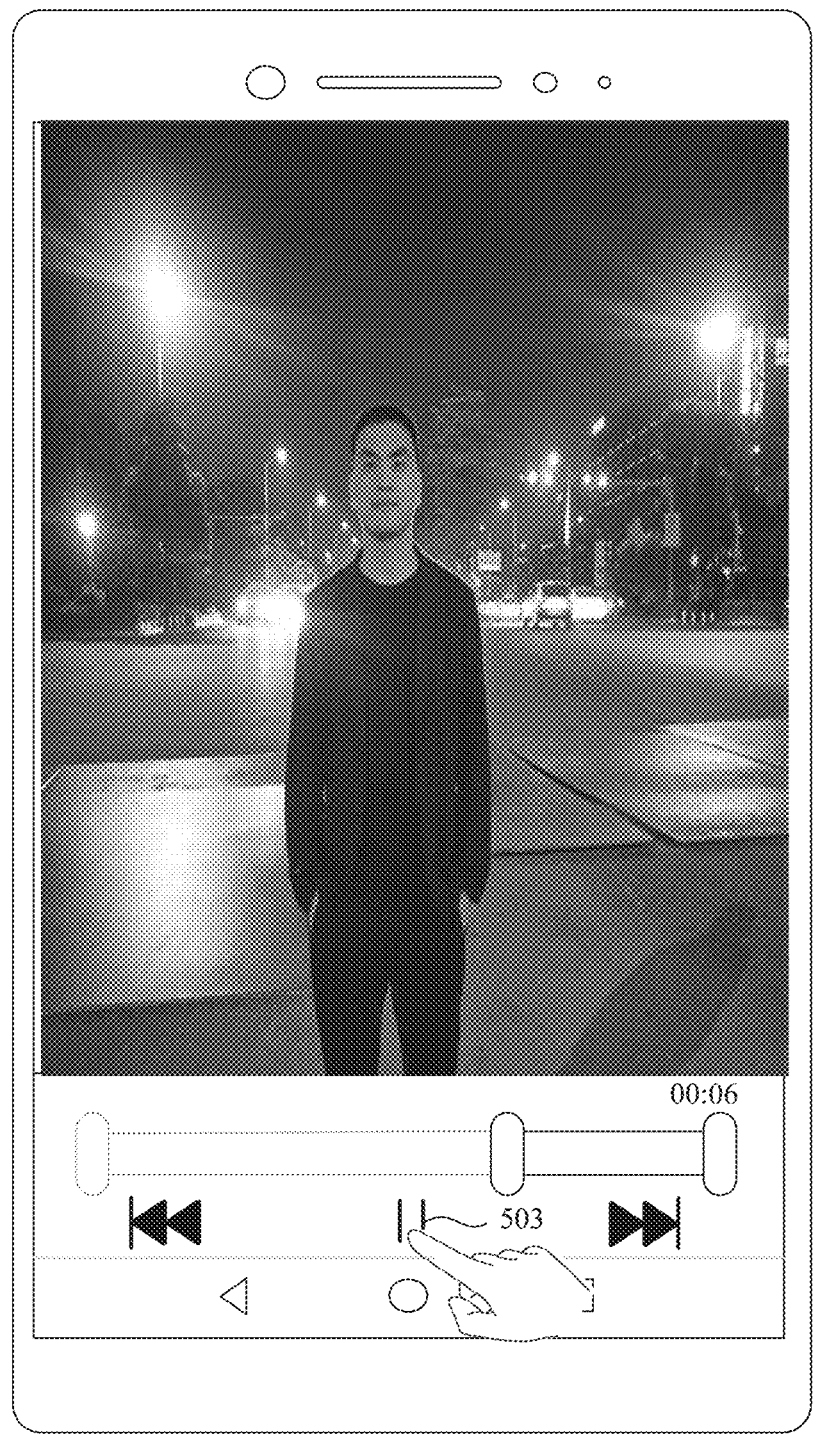
Figure 5C:
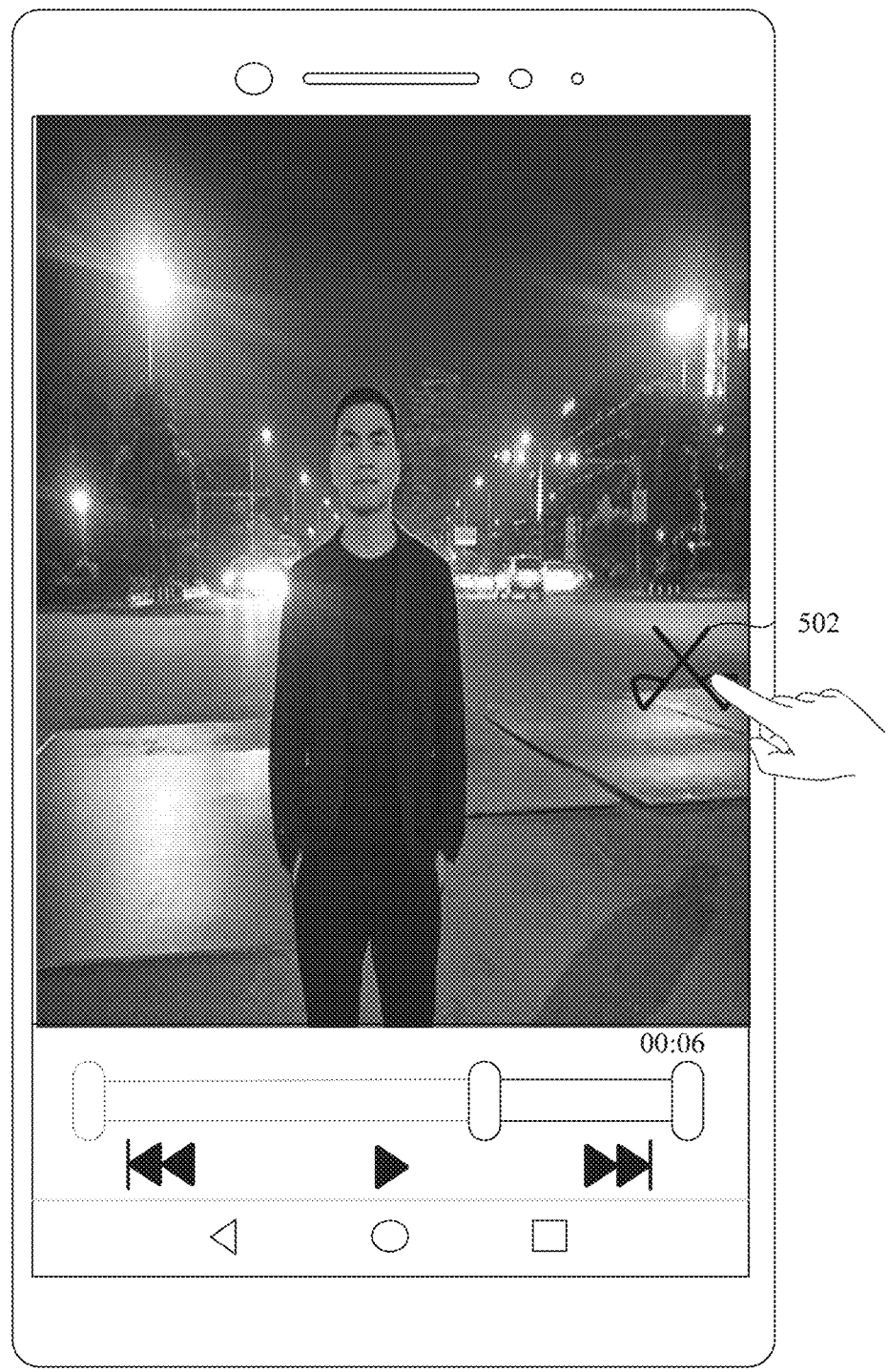
Figure 5D:
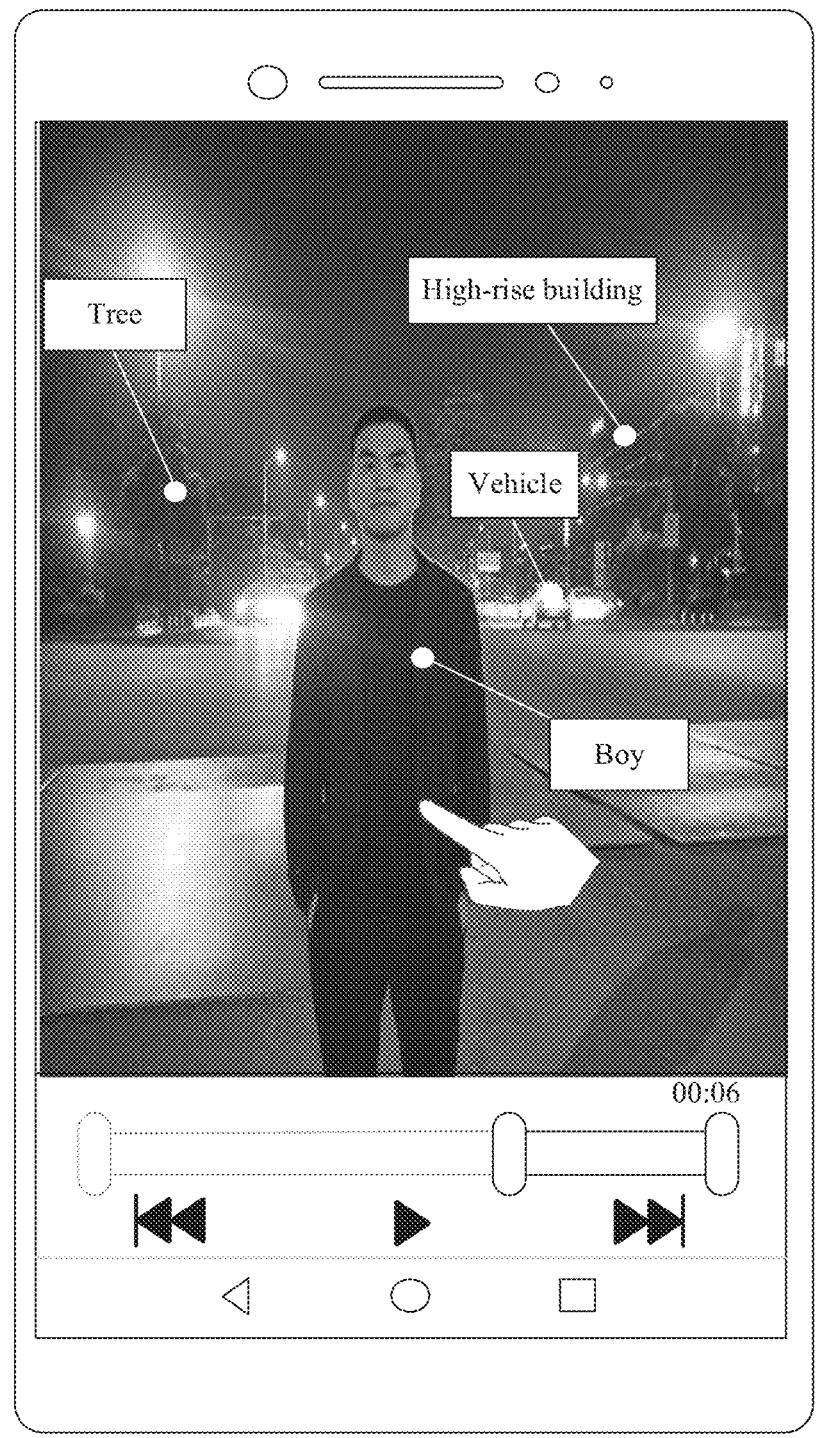

For example, after detecting a touch and hold operation performed by the user on the video 401 on an album interface, the mobile phone enters a GUI shown in FIG. 4(b).

For another example, after detecting a press operation (for example, press force is greater than or equal to a preset value) performed by the user on the video 401 on the album interface, the mobile phone enters a GUI shown in FIG. 4(b).

For another example, after detecting a tap operation performed by the user on the video 401 on the album interface, the mobile phone enters a GUI shown in FIG. 4(*b*).

For another example, after detecting a double-tap operation performed by the user on the video 401 on the album interface, the mobile phone enters a GUI shown in FIG. 4(*b*).

For another example, after detecting a gesture operation that the user draws a circle track on the video 401 on the album interface, the mobile phone enters a GUI shown in FIG. 4(*b*). For another example, after detecting a gesture operation that the user drags the video 401 on the album interface, the mobile phone enters a GUI shown in FIG. 4(*b*).

Referring to the GUI shown in FIG. 4(*b*), the processing mode on the album interface includes a control 402 used to indicate to enter a background light painting mode, a control used to enter a color retention mode, and a control used to delete. After detecting an operation that the user taps the control 402, the mobile phone displays a GUI shown in FIG. 4(*c*).

Referring to FIG. 4(*c*), the mobile phone enters the background light painting mode, and may prompt, in a text prompt (or a voice prompt) manner, the user that "Please tap to play the video to select a clear target". After detecting that the user taps a play start control 403, the mobile phone starts to play the video 401, and displays a GUI shown in FIG. 4(*d*).

Referring to FIG. 4(*d*), in a process of playing the video, a progress bar 405 keeps moving rightwards. After detecting that the user taps a play pause control 406, the mobile phone stops playing the video 401, and displays an image of the video 401 at the sixth second on the touchscreen.

Referring to FIG. 4(*e*), after detecting an operation that the user taps a control 404, the mobile phone may determine that the image of the video 401 at the sixth second is an image 1 for extracting the foreground target.

For another example, after pausing playing of the video 401, the mobile phone may change an image on the touchscreen in real time after detecting an operation that the user drags the progress bar 405. After detecting an operation that the user taps the control 404, the mobile phone determines an image corresponding to a current position of the progress bar as the image 1 for extracting the foreground target.

For example, after detecting the preset gesture of the user on the video 401, the mobile phone displays a GUI shown in FIG. 5(*a*).

Referring to FIG. 5(*a*), the GUI includes an icon 502 for capturing an image from a video. After detecting that the user taps the play start control 403, the mobile phone starts to play the video 401, and displays a GUI shown in FIG. 5(*b*).

Referring to FIG. 5(*b*), after detecting that the user taps the play pause control 503, the mobile phone stops playing the video 401.

Referring to FIG. 5(*c*), after detecting an operation that the user taps an icon 502, the mobile phone may determine that the image is the image 1 for extracting the foreground target.

Referring to FIG. 5(*d*), after extracting the image 1 of the foreground target, the mobile phone may display classification information of objects in the image 1 on the touchscreen. As shown in FIG. 5(*d*), the mobile phone may automatically identify, based on AI, that the objects in the image 1 include a boy, a vehicle, a tree, and a high-rise building. After detecting an operation that the user taps the boy, the mobile phone may determine that the boy in the image 1 is the foreground target.

It should be understood that, as shown in FIG. 4(*e*), after detecting an operation that the user taps the control 404, the mobile phone may determine to extract the image 1 of the foreground target, and the mobile phone may also display the classification information of the objects in the image 1 on the touchscreen, as shown in the GUI in FIG. 5(*d*).

Optionally, the image 1 may be one frame of image in the video 401, or the image 1 may be an image into which a plurality of frames of image in the video 401 are synthesized. For example, the image 1 may be an image into which the plurality of images in the video 401 are synthesized in an HDR manner.

For example, after determining that the image 1 is an image for extracting the foreground target, the mobile phone may perform HDR synthesis on the image 1 and two frames of image before and after the image 1 to obtain a processed image, and extract the foreground target from the image.

Optionally, after detecting a second operation of the user, the mobile phone may extract the foreground target from the image 1, or may extract the foreground target from the image synthesized from the plurality of frames of image.

FIG. 5(*d*) shows that the mobile phone automatically classifies the objects in the image 1 after determining the image 1. The following describes some other processes of determining the foreground target in the image 1 with reference to GUIs shown in FIG. 6(*a*) to FIG. 7(*b*).

In an embodiment, the foreground target may be a target object preset by the mobile phone. For example, the foreground target is an object type "person" preset by the mobile phone, or the foreground target is another object type preset by the mobile phone. In this embodiment, when selecting the foreground target from the image, the mobile phone may process the image 1 based on the preset target object to obtain the foreground target, and prompt, in a text prompt (or a voice prompt) manner, the user to determine the foreground target.

For example, the preset target object is the object type "person". The mobile phone may prompt, by using text information, the user that "The background light painting mode is selected, and the person is selected as the foreground target by default", and display an image 2 shown in FIG. 6(*a*). In the image 2, because the boy is of the "person" type, an area 602 (filled with slashes in the figure) in which the boy is located may be used as an area in which the foreground target is located, and an area other than the area 602 may be used as an area in which the background is located.

In another embodiment, the foreground target may be a target object that is automatically determined by the mobile phone based on an object on an original image captured by a camera lens, a position of the object, a size of the object, or the like. In this embodiment, when selecting the foreground target in the image 1, the mobile phone may display the image 2 based on the foreground target that is automatically determined.

For example, a priority sequence of object types corresponding to a plurality of foreground targets is set on the mobile phone: a person is higher than an animal, the animal is higher than another non-static object, and the another non-static object is higher than a static object. For example, if the extracted image of the foreground target includes a person, an animal, and a construction, the person of the object type with a highest priority is the foreground target, or the person and the animal of the two object types with the highest priority are the foreground target. For another example, if the extracted image of the foreground target does not include a person, but includes an animal and another object, the animal with the highest priority included in the image of the foreground target is extracted as the foreground target.

For another example, the mobile phone may automatically determine a to-be-shot subject on the image of the foreground target. The to-be-shot subject is the foreground target, or an object type to which the to-be-shot subject belongs is the foreground target. For example, the mobile phone determines to extract an object at a middle position in the image of the foreground target as the to-be-shot subject and the foreground target. For another example, the mobile phone determines that an object with a largest size on the image of the foreground target is the to-be-shot subject and the foreground target. For another example, the mobile phone determines that an object that is close to a middle position and whose size is the largest is the to-be-shot subject, and an object type to which the object that is close to the middle position and whose size is the largest belongs is the foreground target.

In another embodiment, the mobile phone may determine the foreground target in the image 1 after detecting a gesture preset by the user.

Figure 6A:
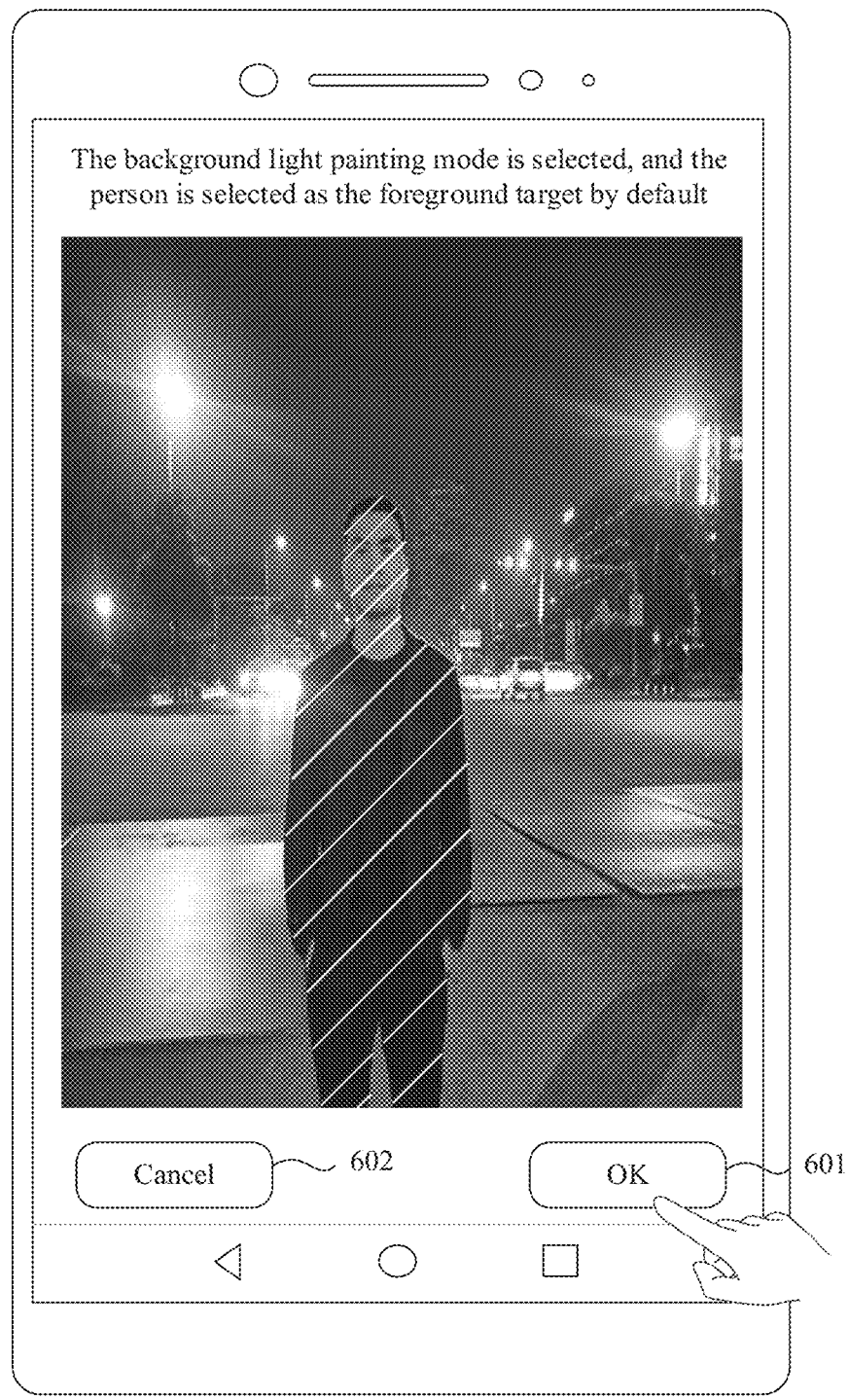
FIG. 6(a) to FIG. 6(d) are schematic diagrams of another group of display interfaces according to an embodiment of this application.
Figure 6B:
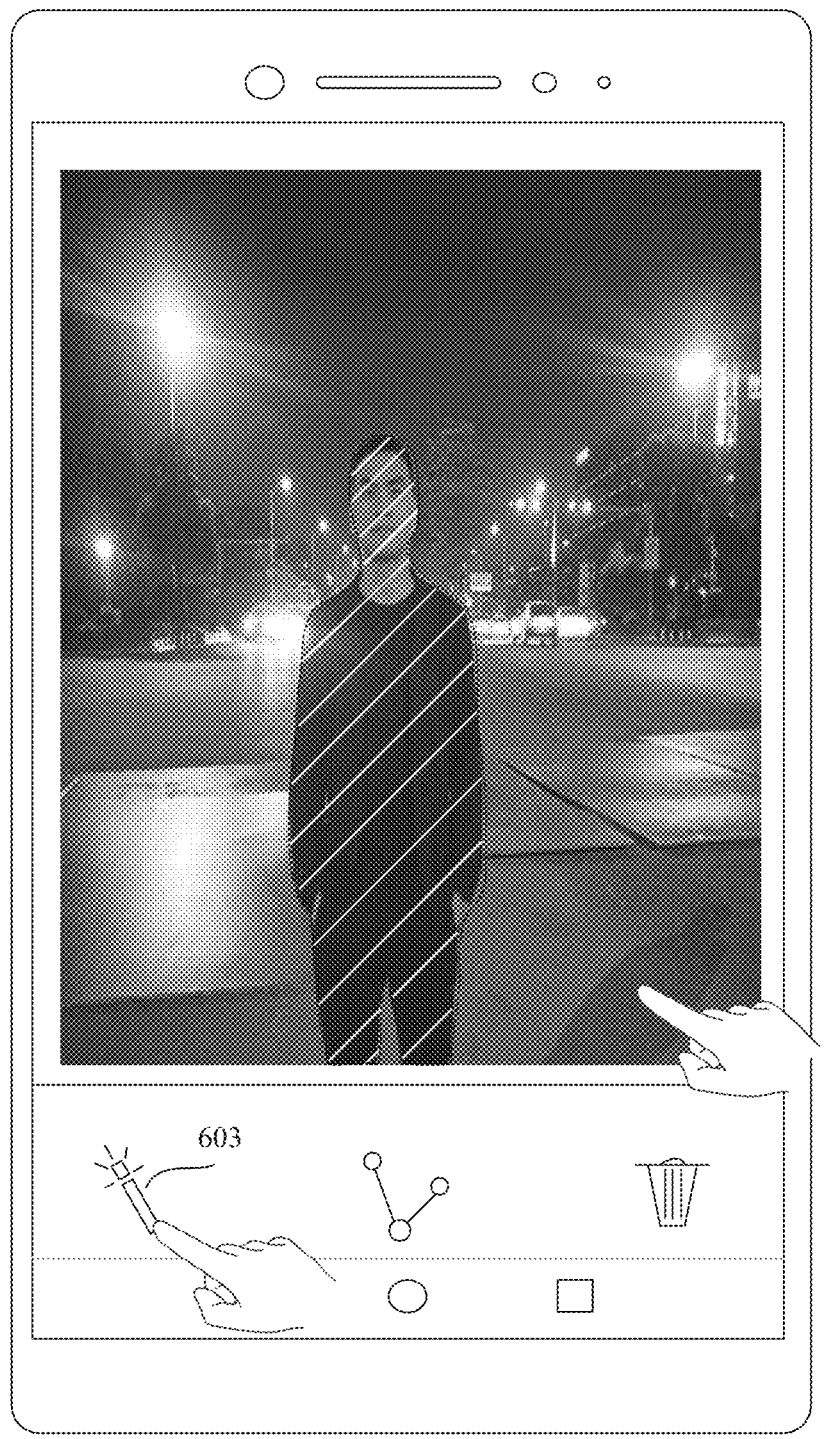

For example, referring to a GUI shown in FIG. 6(b), after detecting an operation that the user taps a magic wand control 603, the mobile phone may continue to detect an area 604 outlined by the user on the image 1 displayed in the viewfinder frame, and determine the area 604 as the area in which the foreground target is located.

Figure 6C:
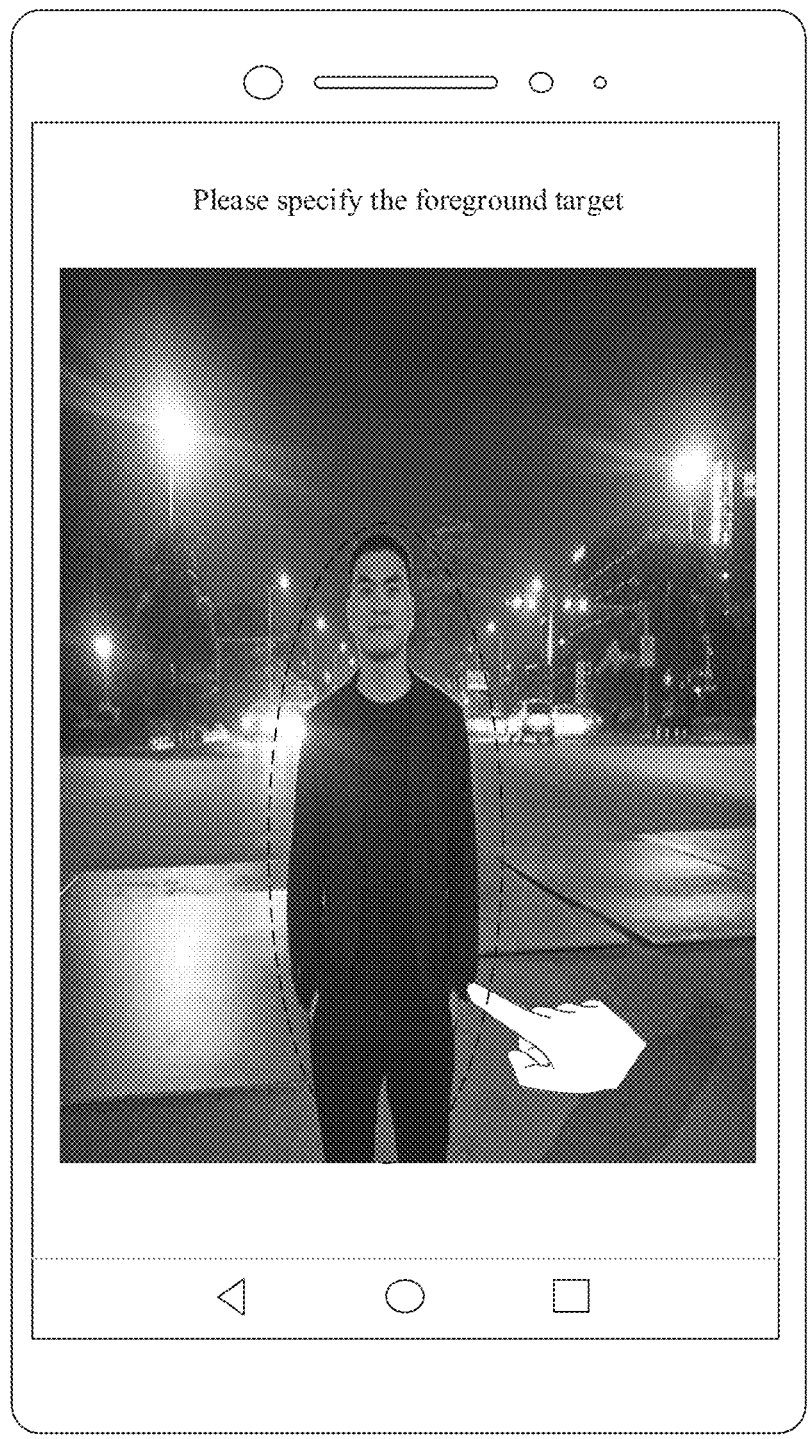

For another example, referring to a GUI shown in FIG. 6(c), after detecting a gesture operation that the user draws a circle track on the image 1 displayed in the viewfinder frame, the mobile phone may determine that an area in the circle track is used as the area in which the foreground target is located.

Figure 6D:
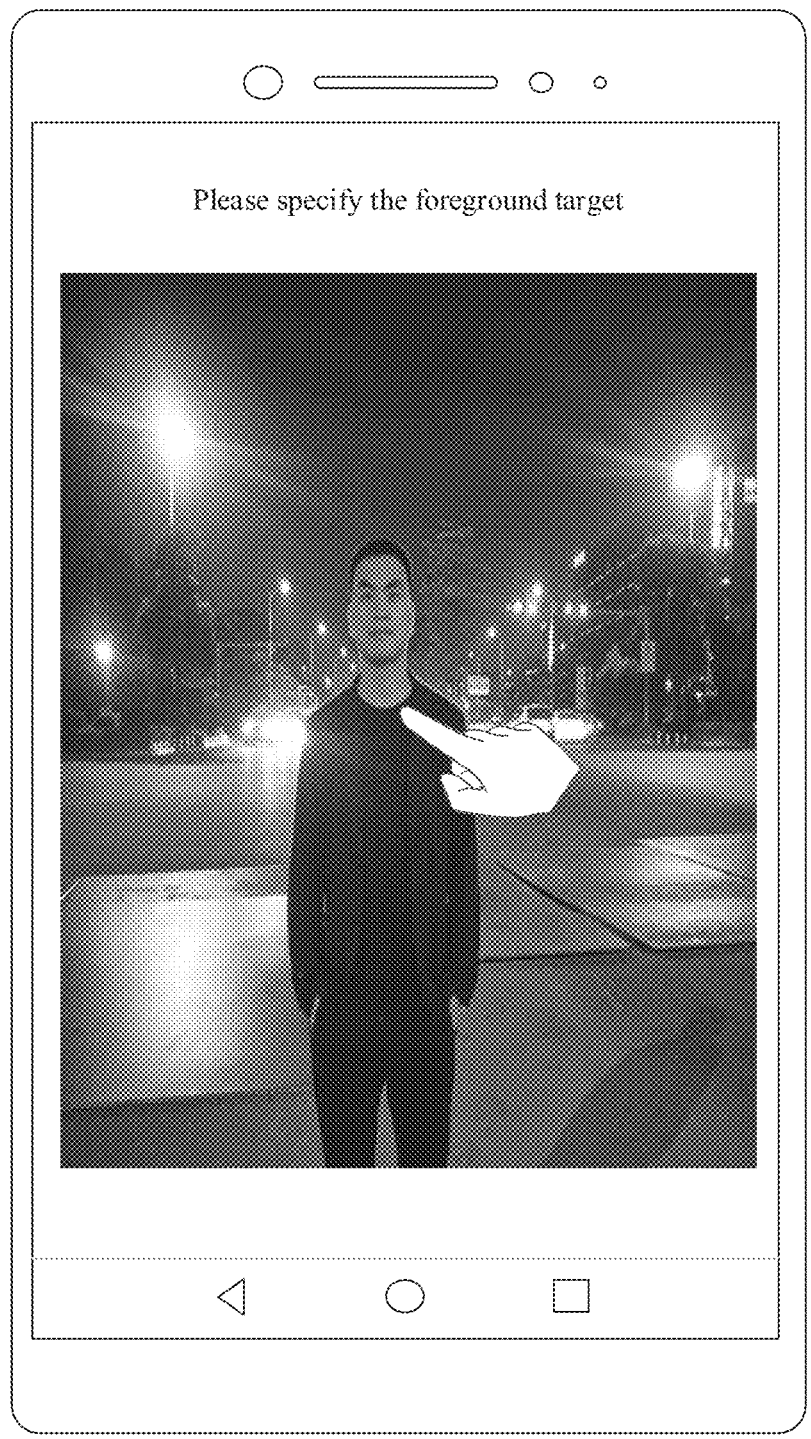

For another example, referring to a GUI shown in FIG. 6(d), the mobile phone detects that the user taps an object on the image 1 displayed in the viewfinder frame, and may determine to use the object as the foreground target.

For another example, after the mobile phone detects that the user taps a plurality of objects (for example, the boy and the tree) on the image displayed in the viewfinder frame, the plurality of objects (the boy and the tree) are the foreground target. The plurality of objects may belong to a same object type, or may belong to different object types.

Optionally, the mobile phone may classify the objects in the image 1 by using an object category or an individual object, and prompt the user with classification information through a text. After detecting an operation that the user taps an object category or an individual object, the mobile phone may determine the object category or the individual object as the foreground target.

Figure 7A:
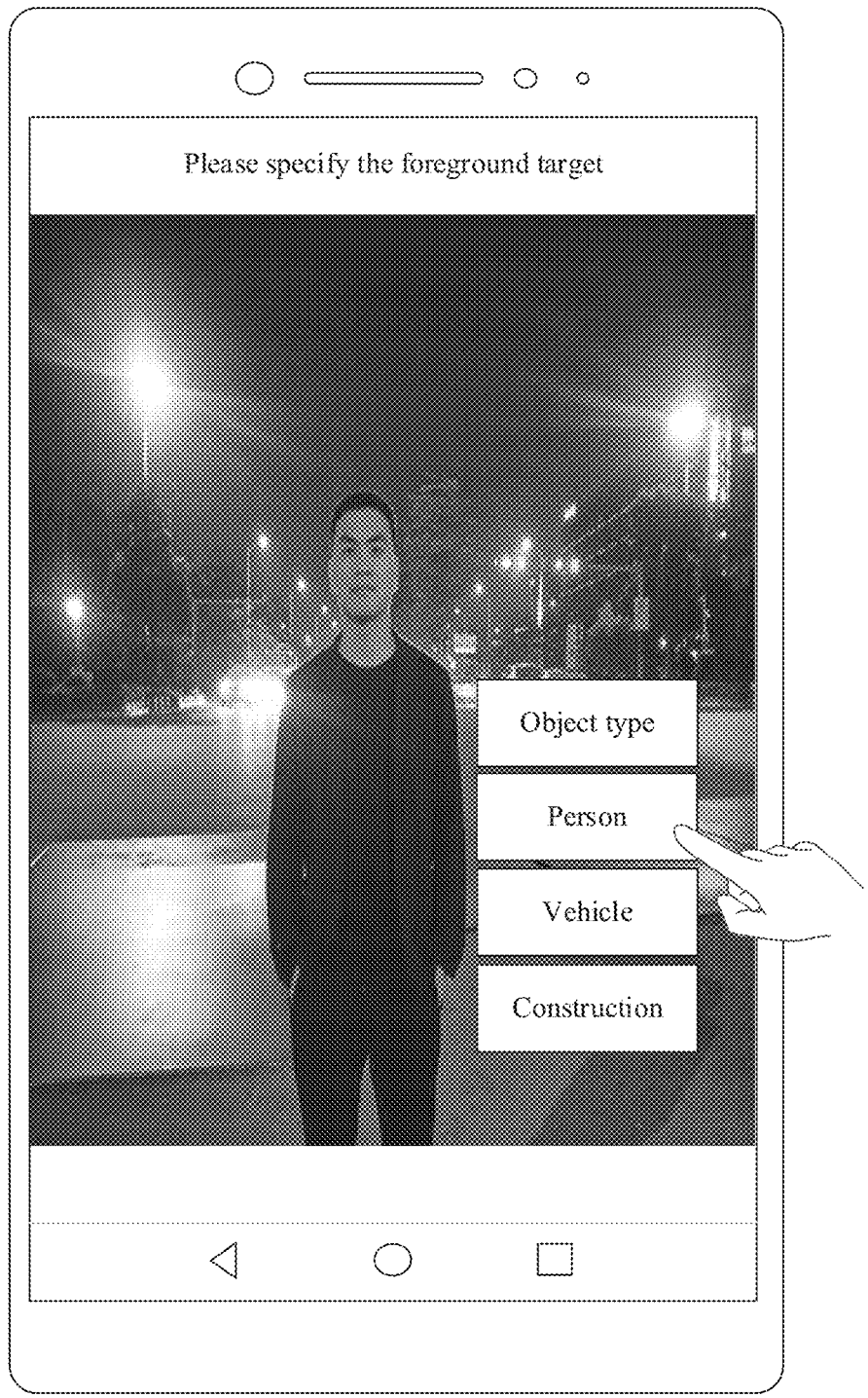
FIG. 7(a) and FIG. 7(b) are schematic diagrams of another group of display interfaces according to an embodiment of this application.

For example, referring to FIG. 7(a), the mobile phone displays an object type list on a shooting interface, and the object type list may include a plurality of object types (for example, may include object types included in an image currently displayed in the viewfinder frame). When the mobile phone detects an operation that the user taps to select an object type (for example, a person), the object type is the foreground target.

Figure 7B:
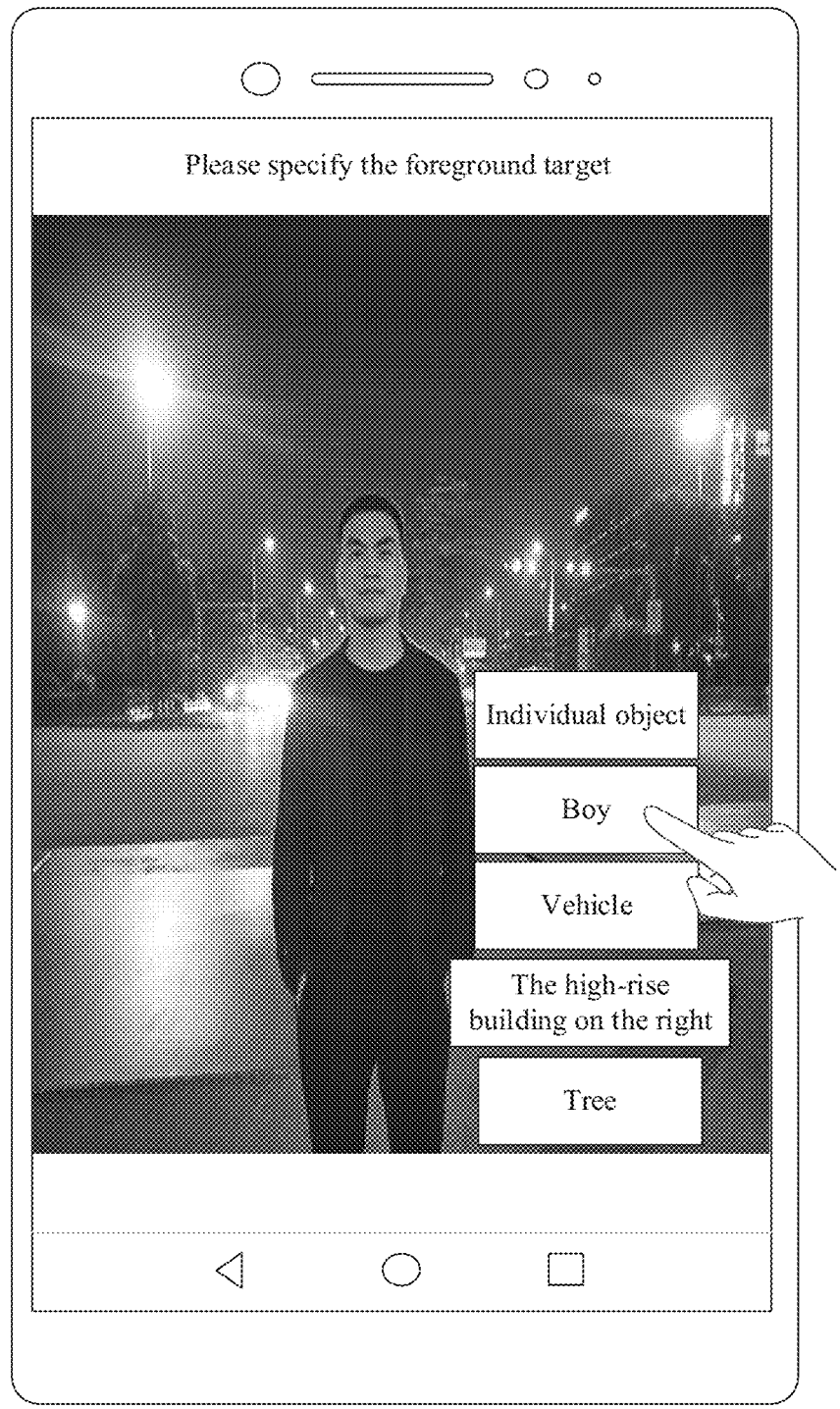

For another example, referring to FIG. 7(b), the mobile phone displays an object list on a shooting interface. When the mobile phone detects an operation that the user taps to select an object (or several objects), the object selected by the user is the foreground target.

For another example, the mobile phone displays an object type list and an object list on the shooting interface. When the mobile phone detects an operation that the user selects an object type or an object, the object type or the object selected by the user is the foreground target.

For another example, each object on an image displayed in the viewfinder frame of the mobile phone has a number. When the mobile phone detects an operation that the user taps a number of an object, the object is the foreground target.

In an embodiment, after determining the foreground target on the image 1, the mobile phone may further process the foreground target.

Figure 8:
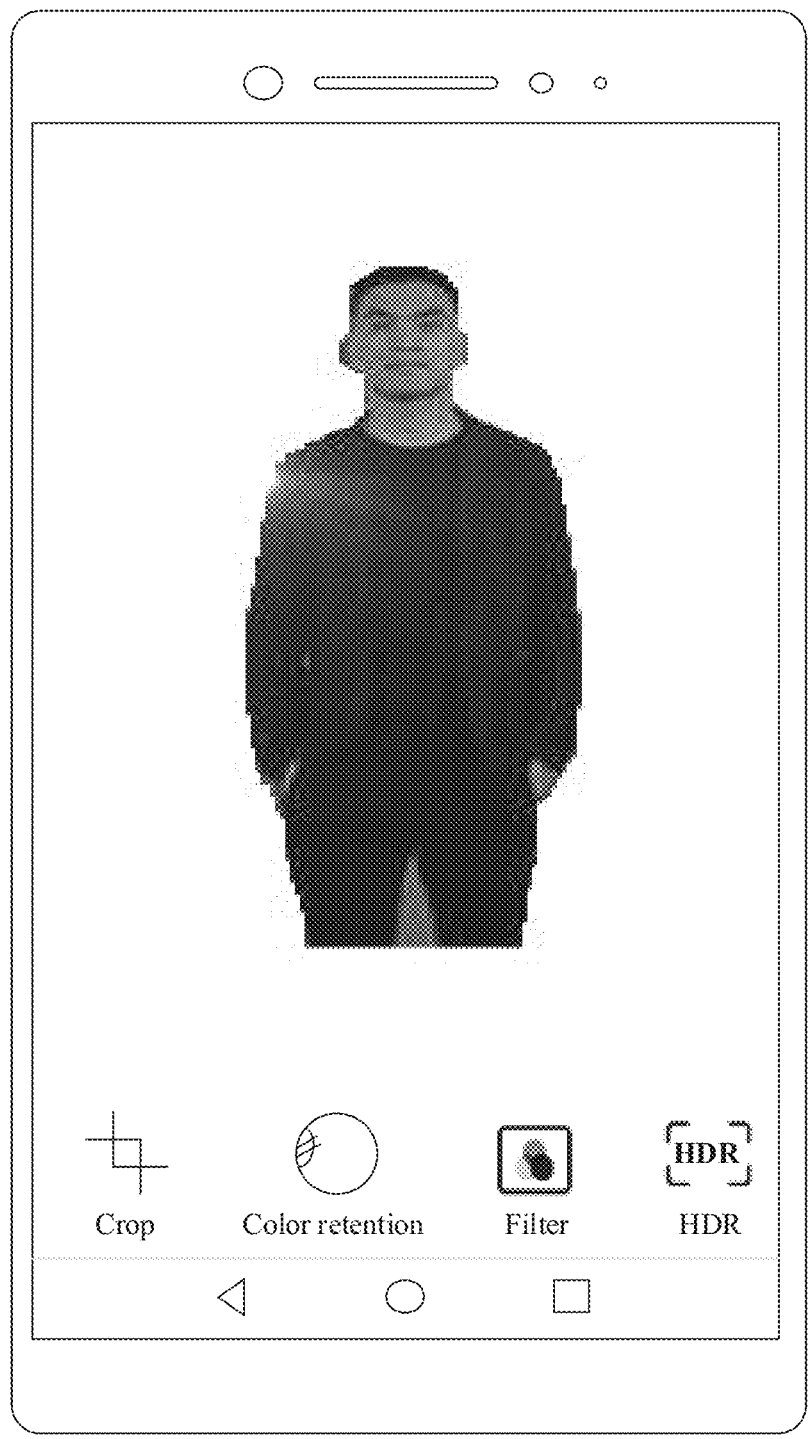
FIG. 8 is a schematic diagram of another group of display interfaces according to an embodiment of this application.

For example, in a GUI shown in FIG. 8, the GUI may be referred to as a foreground target processing interface, and the screen includes a plurality of processing modes for the foreground target: cropping, color retention, a filter, a high dynamic range (high dynamic range, HDR) image, and the like. After detecting an operation that the user taps an icon of a processing mode, the mobile phone may perform a corresponding processing operation on the foreground target.

For example, HDR is used as an example. When the user selects to perform HDR processing, the mobile phone may select a current image and two frames of image before and after the current image to perform the HDR processing. For example, the current image is the $151^{st}$ frame of image in the video 401 (it is assumed that the video includes 240 frames of image). In this case, the mobile phone may select the $150^{th}$ frame of image, the $151^{st}$ frame of image, and the $152^{nd}$ frame of image in the video 401 to perform HDR synthesis, and select the foreground target from a finally synthesized HDR image.

Compared with a common image, an HDR image can provide more dynamic ranges and image details. Based on low dynamic range (low dynamic range, LDR) images with different exposure time, an LDR image with best details corresponding to each exposure time is used to synthesize the final HDR image. This can better reflect a visual effect in a real environment.

Optionally, after the foreground target is selected from the image 1 or processing on the foreground target is completed, the mobile phone starts to generate the long-exposure image. The mobile phone retains the foreground target or the processed foreground target, and performs the long-exposure processing on objects in another area other than the foreground target, to finally obtain the image with a clear foreground and a long-exposure background.

Figure 9A:
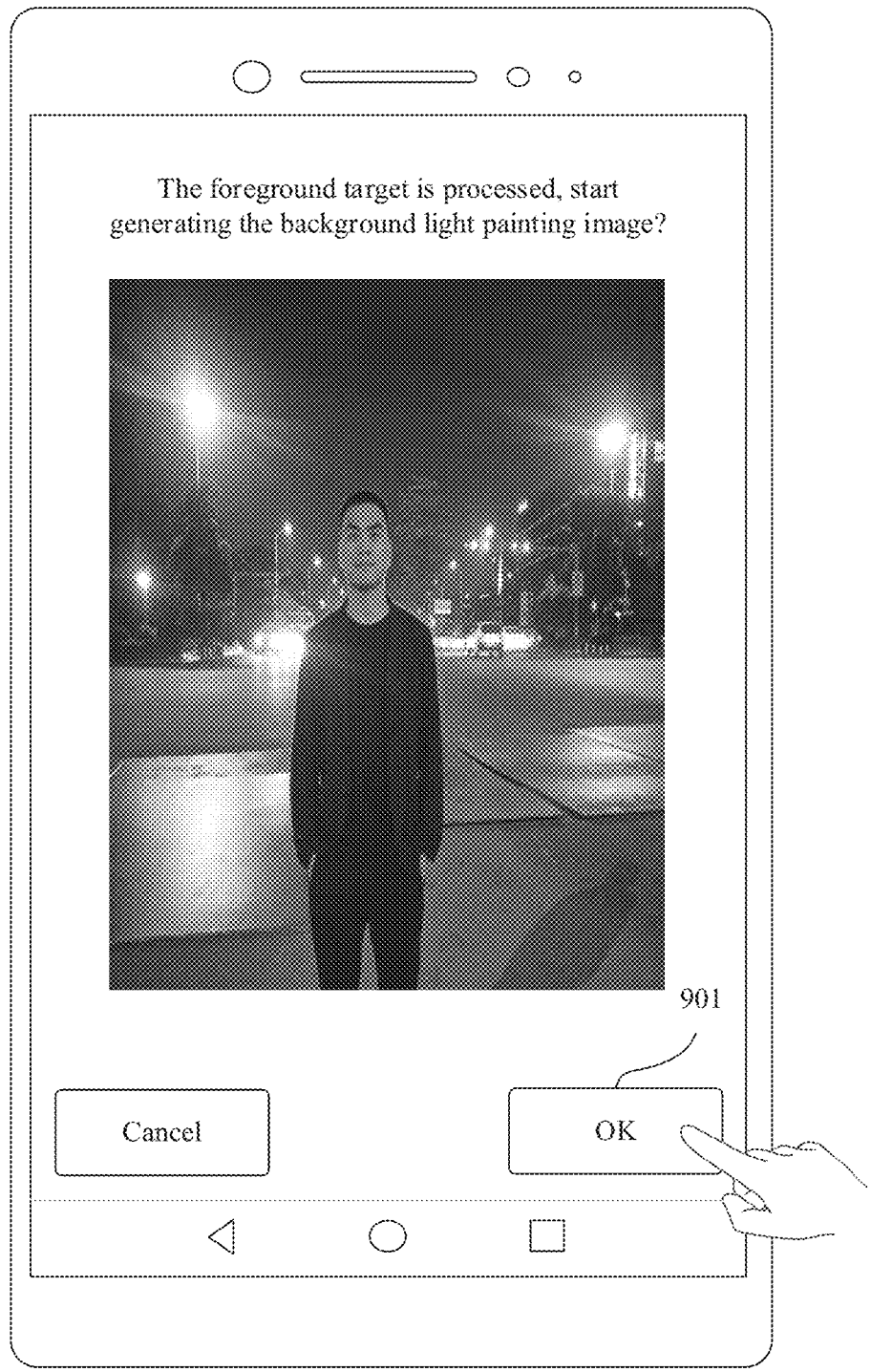
FIG. 9(a) and FIG. 9(b) are schematic diagrams of another group of display interfaces according to an embodiment of this application.

For example, referring to a GUI shown in FIG. 9(a), the mobile phone may prompt, in a text prompt manner, the user that "The foreground target is processed, start generating the background light painting image?".

Figure 9B:
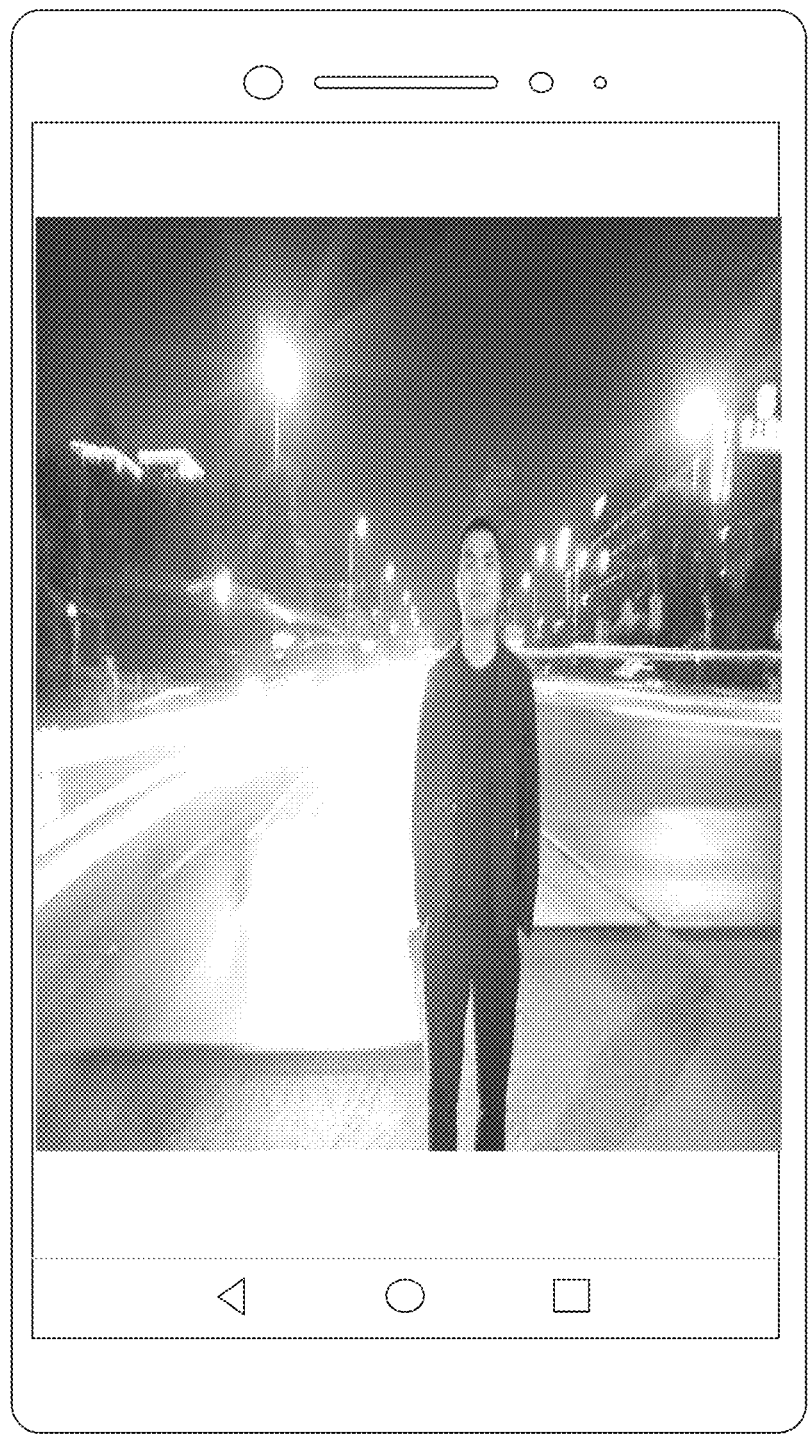

After the mobile phone detects an operation that the user taps a control 901, the mobile phone starts to generate the long-exposure image, and displays a GUI shown in FIG. 9(b). The GUI includes a finally generated long-exposure image, namely, an image 3.

In an embodiment, the mobile phone may further generate, by using the professional mode in the camera application, the long-exposure image with a clear foreground and background light painting.

When the user wants to shoot a long-exposure image, in addition to selecting the foregoing five modes in the light painting, the user may also shoot the long-exposure image in the professional mode. The following briefly describes several parameters for shooting a long-exposure photo in the professional mode. Table 2 shows parameters related to shooting a long-exposure image and functions of the parameters.

TABLE 2

Parameters related to a long-exposure
image and functions of the parameters

| Parameter | Parameter function |
| --- | --- |
| Light sensitivity (ISO) | Used to set light sensitivity of a camera, where higher ISO light sensitivity indicates shorter exposure time and more image noise. |
| Shutter (S) | Used to set an exposure time, where a device needs to be kept static before the exposure time ends, and otherwise image blur occurs. |
| Exposure compensation (EV) | Used to change a recommended exposure value to make a photo brighter or darker. |
| Focus mode (AF) | Used to support single-shot autofocus (AF-S), continuous autofocus (AF-C), and manual focus (MF), where the continuous autofocus is used to perform autofocus again when a framed picture greatly changes. |
| White balance (AWB) | Ensuring that an imaging color is not affected by a color of a light source, where a corresponding white balance can be selected or the white balance can be customized based on a light source type. |

The user can adjust the parameter values in the foregoing table based on different scenarios to shoot the long-exposure image. For example, when light is sufficient, a relatively low ISO may be used for shooting. When light is dim, the user can use a high ISO for shooting.

Figure 10A:
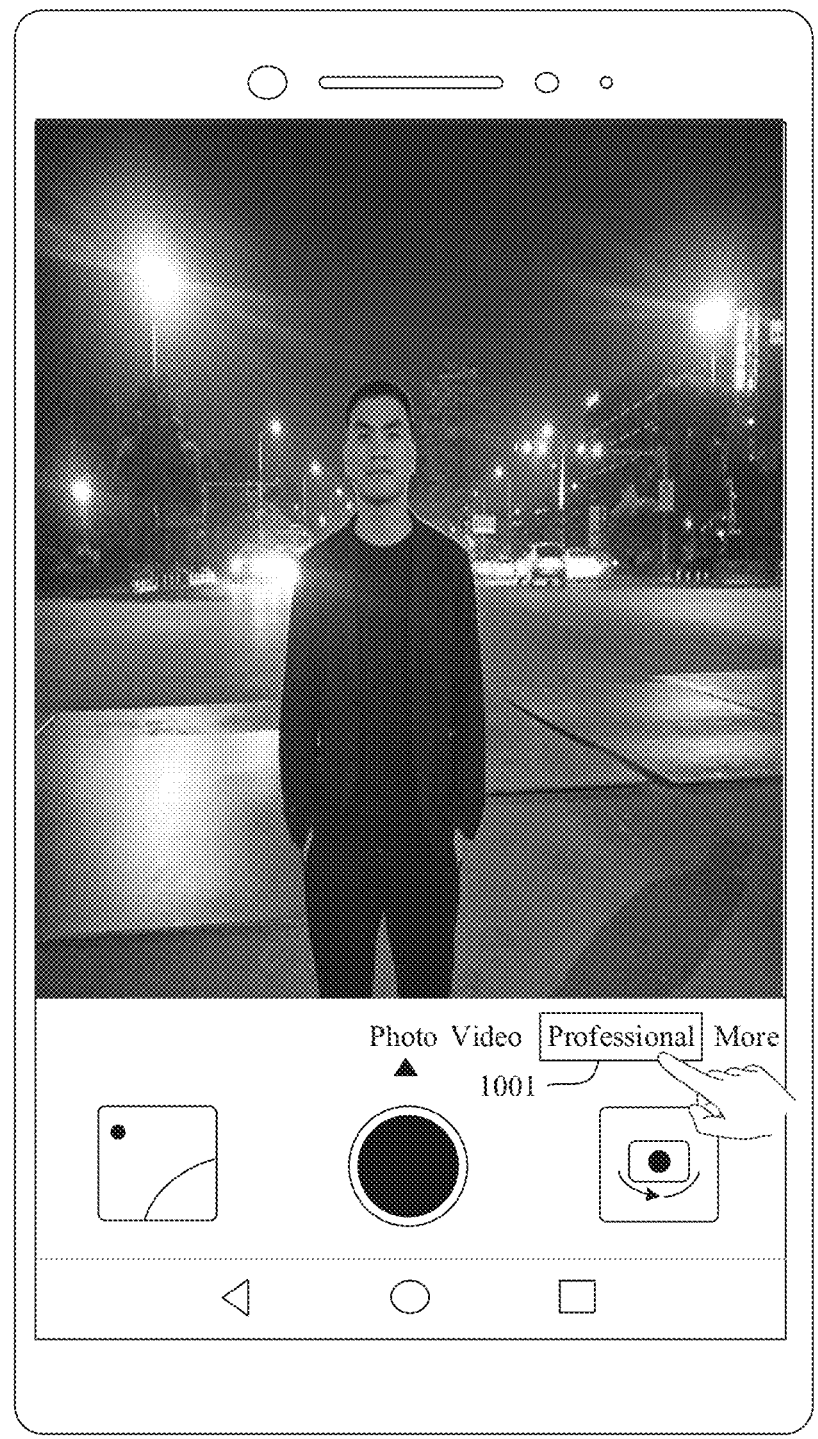
FIG. 10(a) to FIG. 10(c) are schematic diagrams of another group of display interfaces according to an embodiment of this application.

For example, in a GUI shown in FIG. 10(a), after the mobile phone detects that the user taps an icon 1001 of the professional mode, the mobile phone enters the professional mode.

In the professional mode, after the mobile phone detects an operation performed by the user to indicate the background light painting mode, the mobile phone enters the background light painting mode. In the professional mode, there may be a plurality of manners in which the user indicates the background light painting mode.

In an embodiment, the shooting interface includes a first control used to indicate the background light painting mode. When detecting an operation that the user taps the first control, the mobile phone enters the background light painting mode. For example, the first control may be a control 1002 shown in FIG. 10(b), or a control 1003 shown in FIG. 5(c).

Figure 11A:
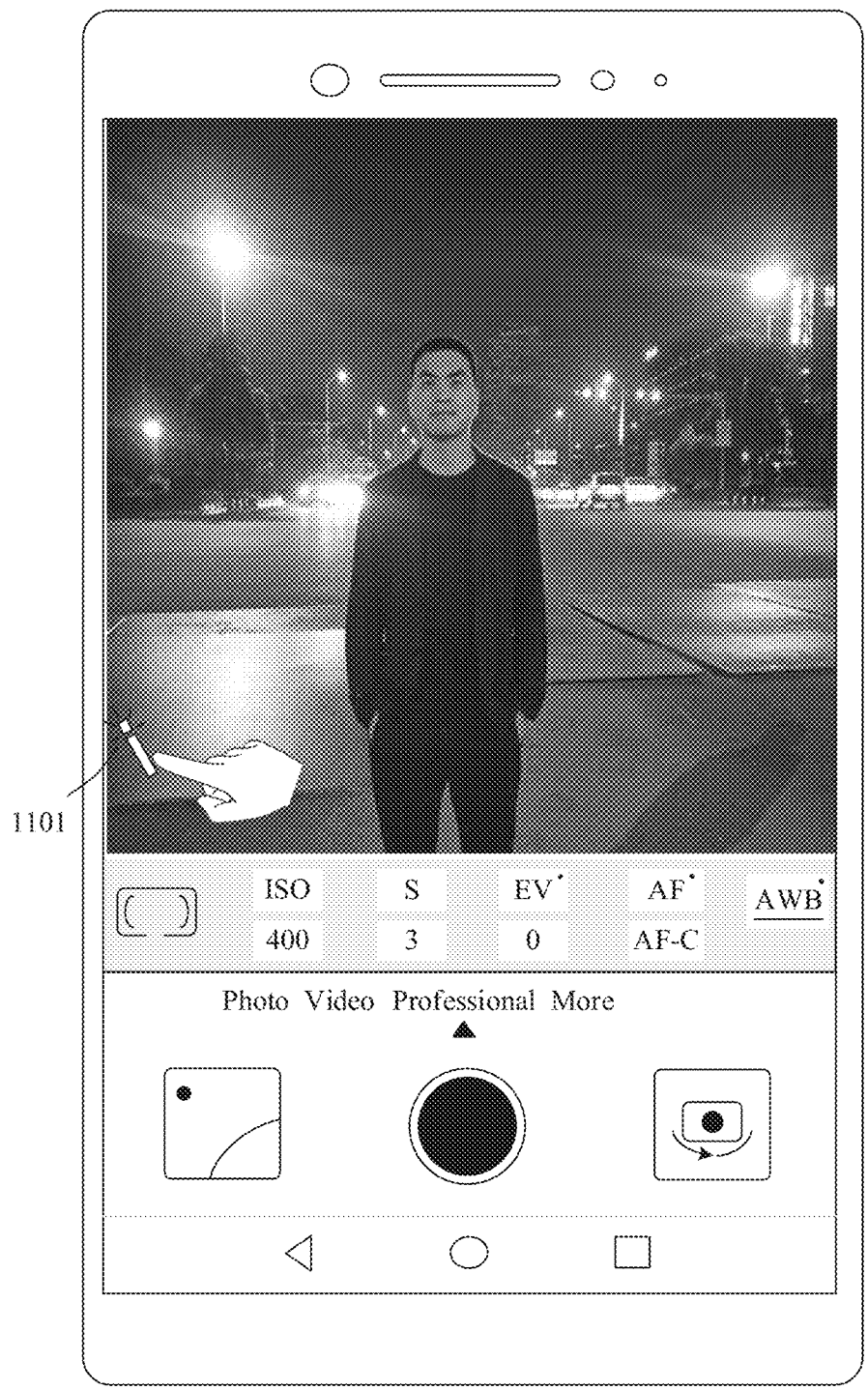
FIG. 11(a) and FIG. 11(b) are schematic diagrams of another group of display interfaces according to an embodiment of this application.

In another embodiment, referring to FIG. 11(a), the shooting interface includes a magic wand control 1101. After detecting an operation that the user taps the control 1101, referring to FIG. 11(b), the mobile phone displays a function list 1102. The function list 1102 includes a control 1103 used to indicate the background light painting mode, a control used to indicate a filter, another control, and the like. After detecting an operation that the user taps the control 1103, the mobile phone enters the background light painting mode.

Figure 12A:
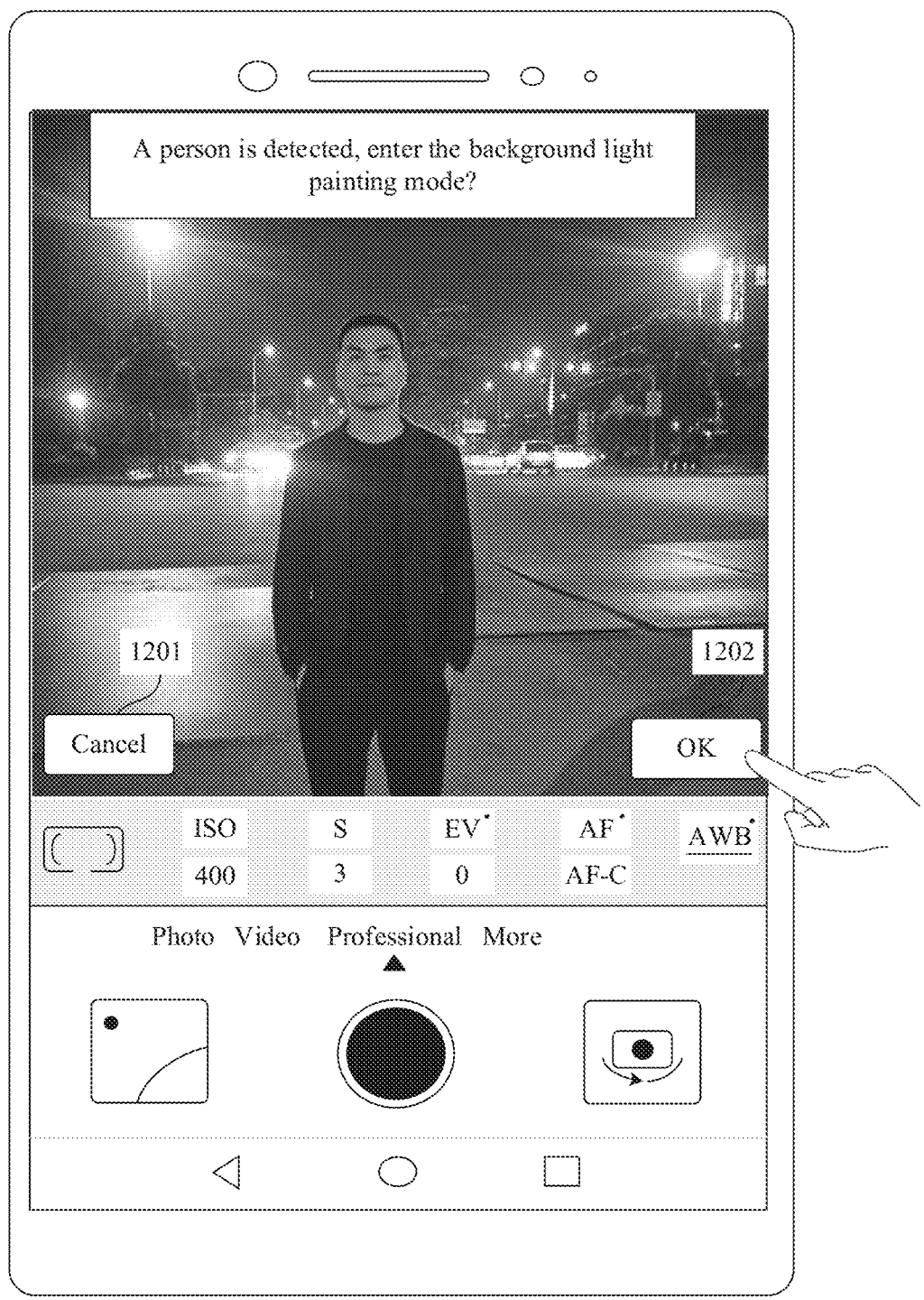
FIG. 12(a) to FIG. 12(d) are schematic diagrams of another group of display interfaces according to an embodiment of this application.

In another embodiment, referring to FIG. 12(a), when detecting that a current image captured by the camera includes a person, an animal, or another object that is not completely static, the mobile phone may prompt, in a text prompt manner, the user whether to enter a shooting mode of background light painting. The mobile phone can prompt, in a text prompt (or a voice prompt) manner on the shooting interface, the user that "A person is detected, enter the background light painting mode?". After detecting that the user taps a control 1202, the mobile phone enters the background light painting mode.

For example, the user may further prompt, in a text prompt (or a voice prompt) manner, the user that a current image captured by the camera includes a person, an animal, or another object that is not completely static. If the user does not expect that there is a person, an animal, or another object that is not completely static in a shot image at this time, the user may tap the control 1201. After detecting an operation that the user taps the control 1201, the mobile phone cancels entering the background light painting mode, and performs normal long-exposure processing, in other words, performs long-exposure processing on all objects in the image.

For example, when detecting that an object at a middle position in the image captured by the camera is a person, an animal, or another object that is not completely static, the mobile phone prompts, in a text prompt (or a voice prompt) manner, the user whether to enter the background light painting mode.

For another example, when detecting that a size of a person, an animal, or another object that is not completely static in an image captured by the camera is greater than a preset size threshold, the mobile phone prompts, in a text prompt (or a voice prompt) manner, the user whether to enter the background light painting mode.

In another embodiment, after detecting a preset gesture of the user on the shooting interface, the mobile phone enters the background light painting mode. For example, referring to FIG. 12(b), after detecting a gesture operation that the user draws a circle track on the shooting interface, the mobile phone enters the background light painting mode.

For another example, after detecting a touch and hold operation performed by the user in the viewfinder frame on the shooting interface, the mobile phone enters the background light painting mode.

For another example, after detecting a press operation (press force is greater than or equal to a preset value) performed by the user in the viewfinder frame on the shooting interface, the mobile phone enters the background light painting mode.

Figure 12B:
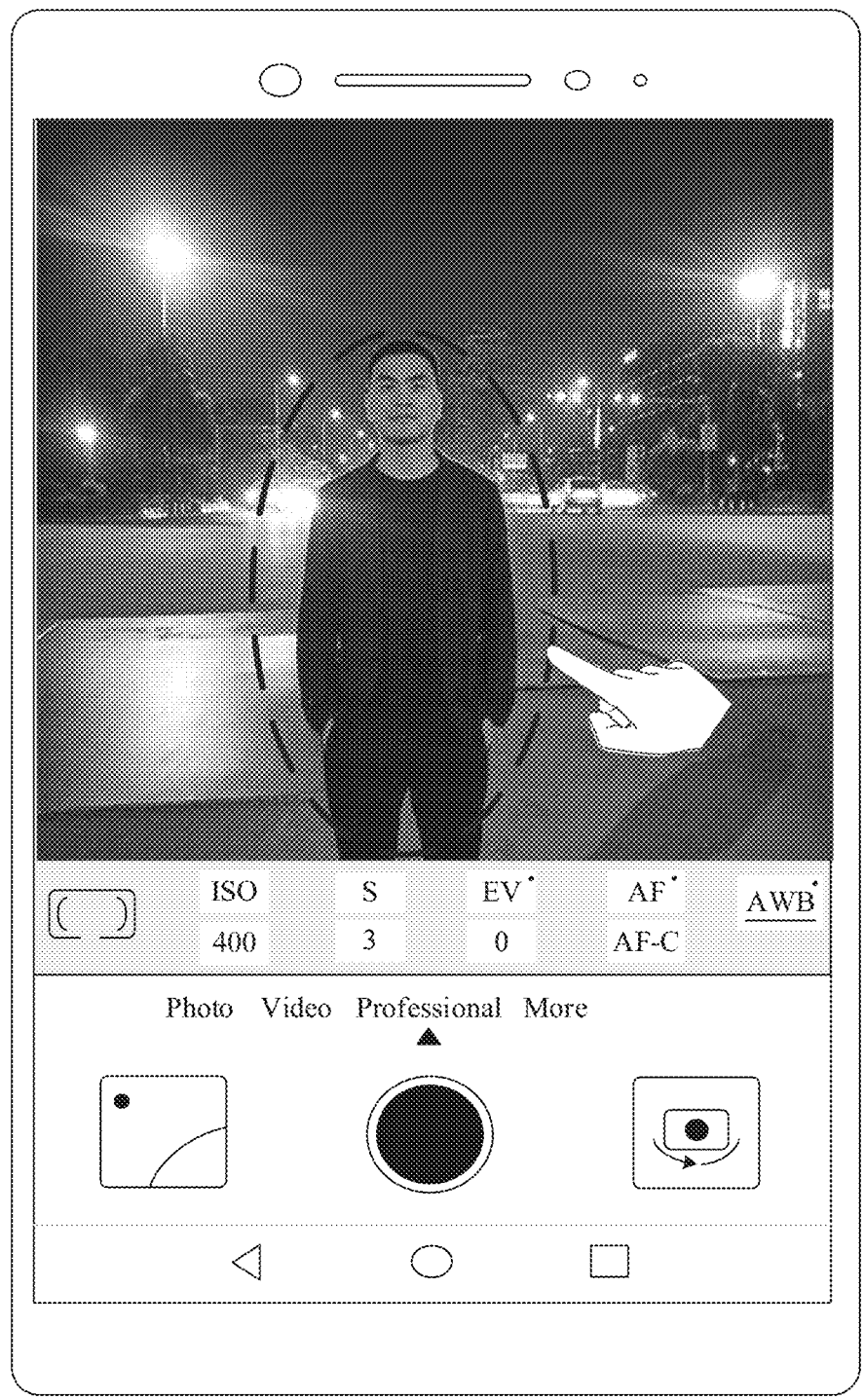
Figure 12C:
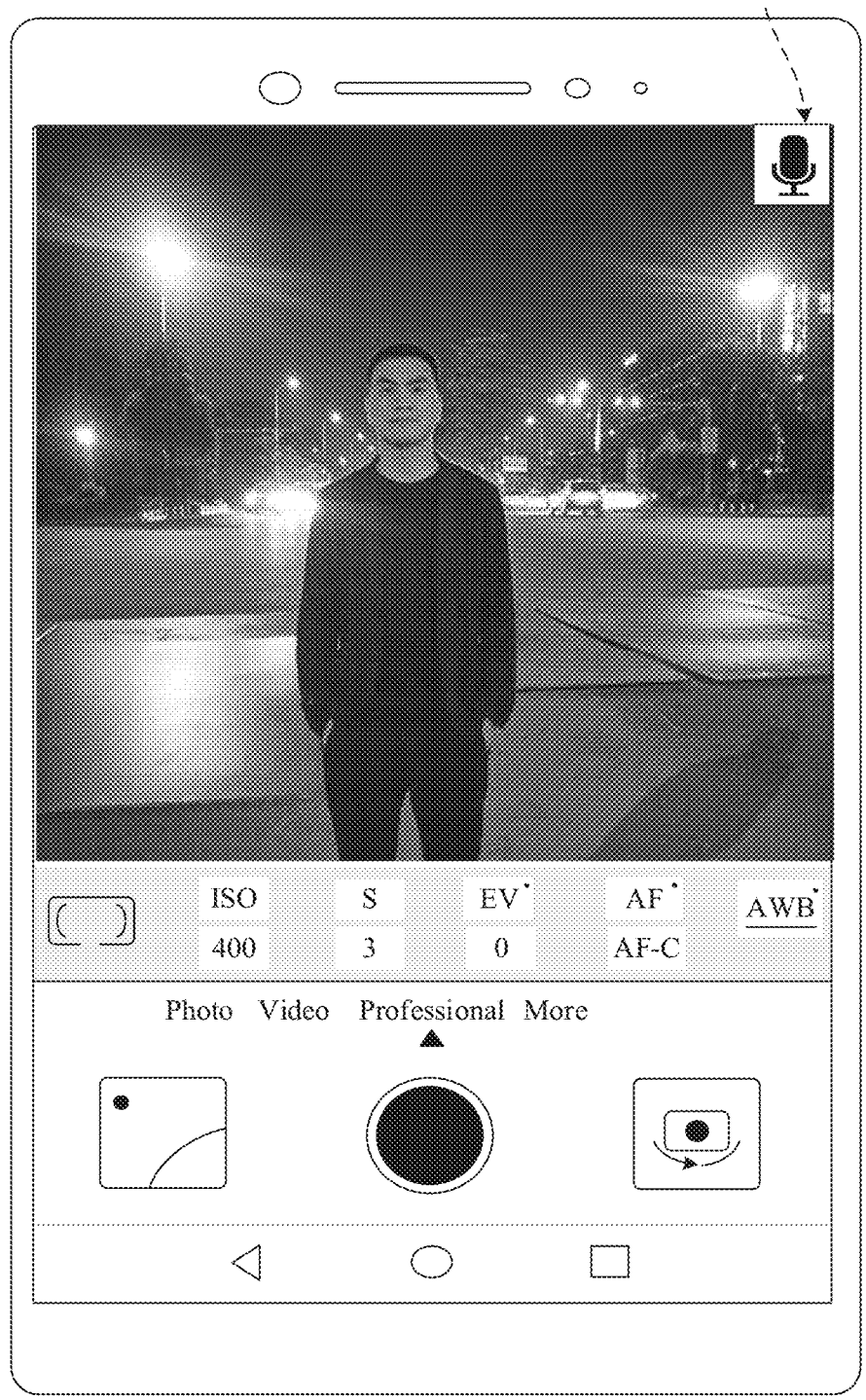

In another embodiment, after the mobile phone displays the shooting interface, referring to FIG. 12(c), if detecting an operation that the user indicates, by using a voice, to enter the background light painting mode or use a background light painting function, the mobile phone enters the background light painting mode.

After entering the background light painting mode for the first time or each time, the mobile phone may provide a prompt to the user by displaying on the touchscreen or by using a sound, to notify the user of a function and an effect of the background light painting mode.

For example, the mobile phone may prompt, by displaying text information, the user that "in this mode, you can reserve a clear foreground target, and perform long-exposure processing on another area".

Figure 12D:
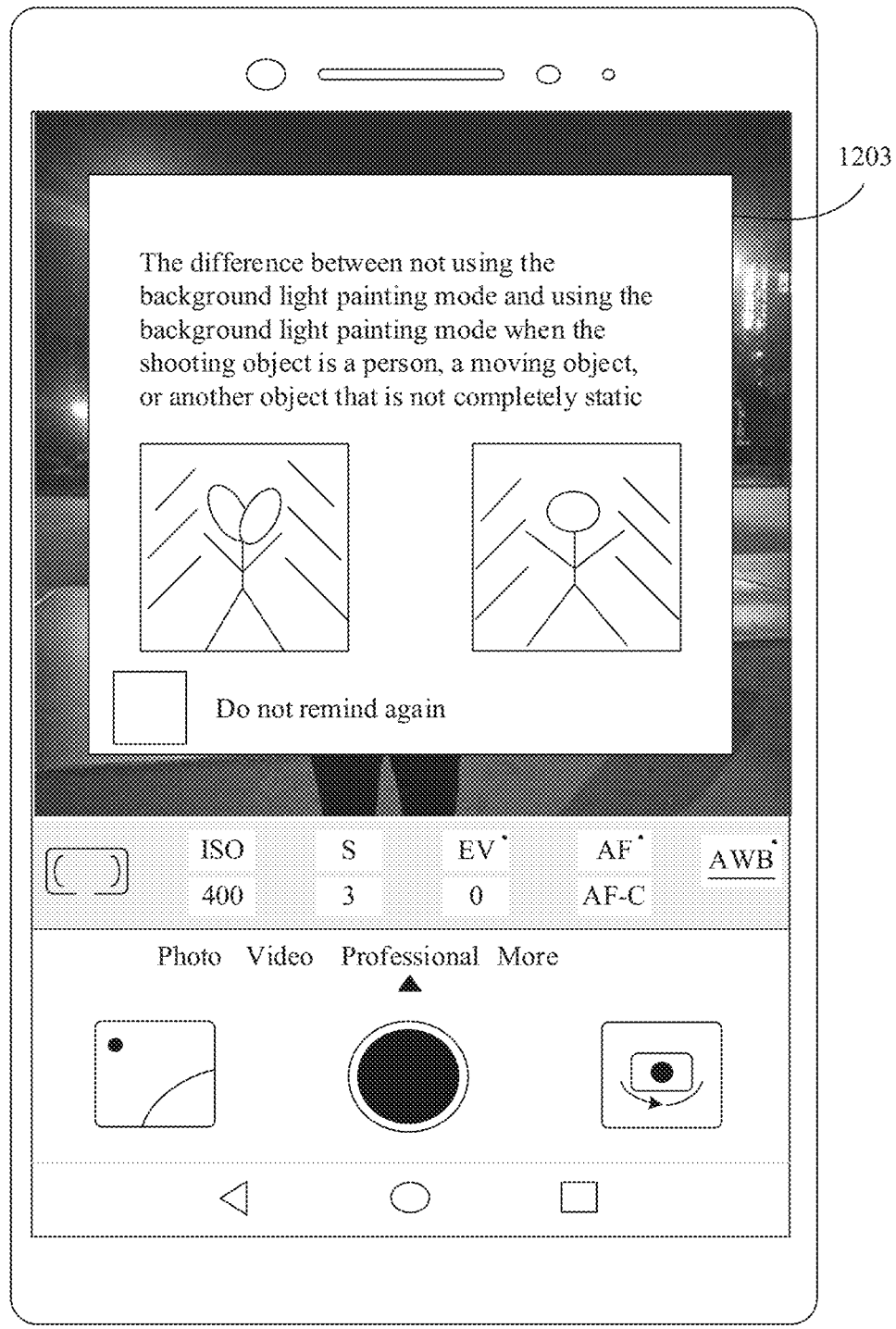

For another example, referring to FIG. 12(d), the mobile phone may prompt the user by using a window 1203. When an image captured by the camera includes a person, an animal, or another object that is not completely static, the mobile phone may display the window 1203 on the shooting interface. In the window 1203, the mobile phone notifies, in a text prompt manner, the user of "The difference between not using the background light painting mode and using the background light painting mode when the shooting object is a person, an animal, or another object that is not completely static".

Figure 13A:
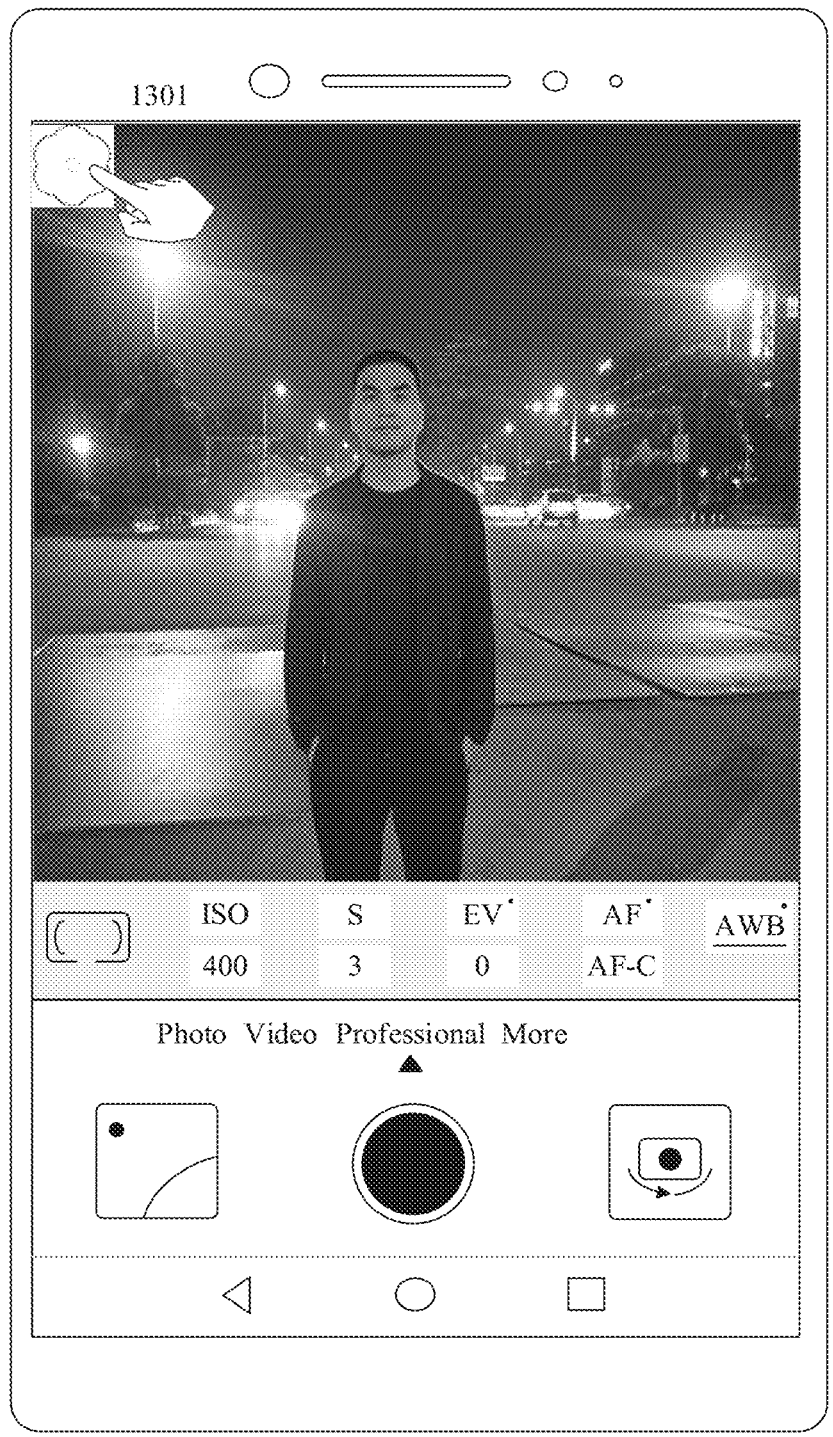
FIG. 13(a) to FIG. 13(d) are schematic diagrams of another group of display interfaces according to an embodiment of this application.

In another embodiment, referring to FIG. 13(a), when detecting an operation that the user taps an icon 1301, the mobile phone may display a window 1302 on the shooting interface, so that the user sets a long-exposure parameter (for example, light sensitivity "ISO" and exposure time "S").

Figure 13B:
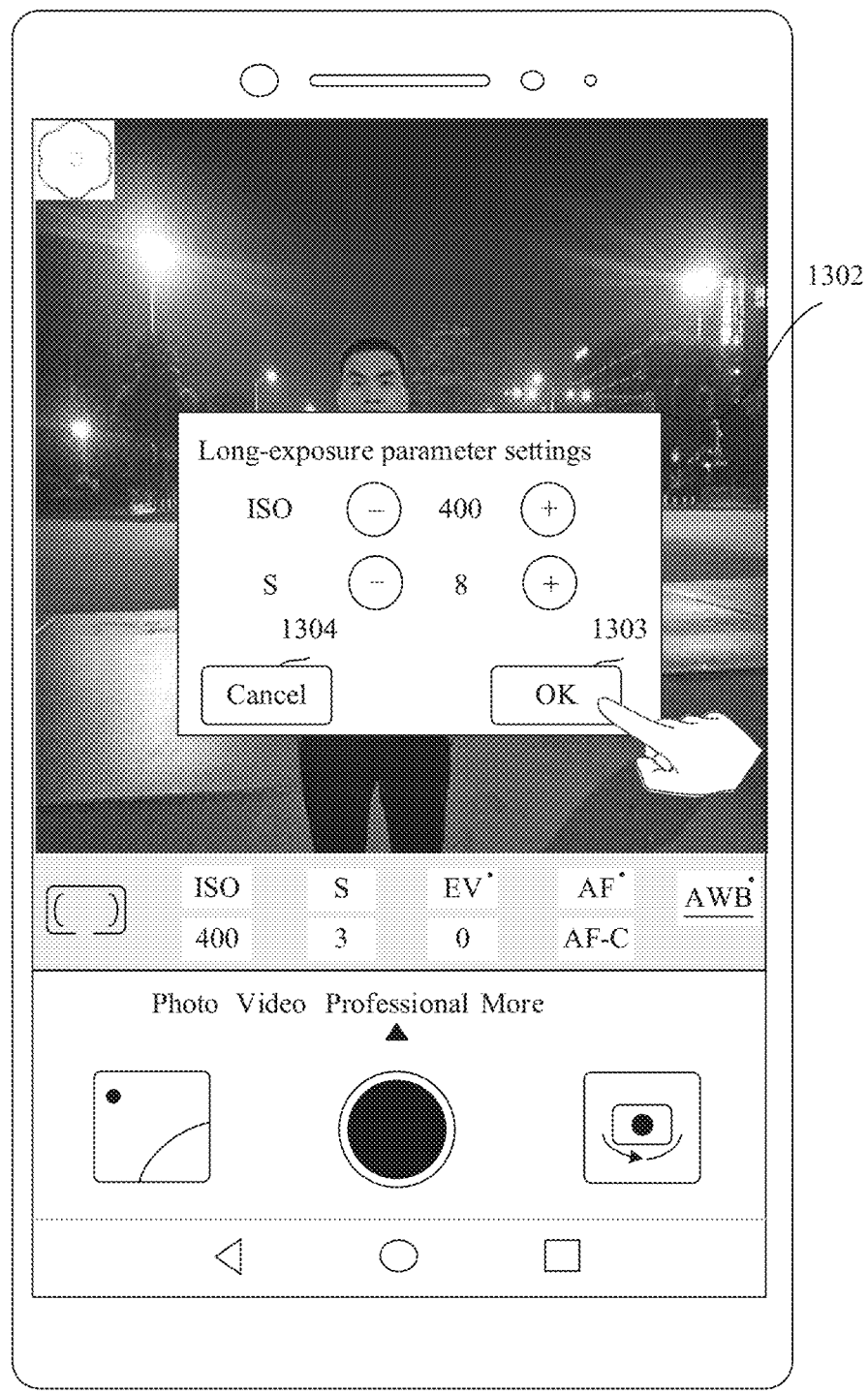

Referring to FIG. 13(b), after detecting an operation that the user taps a control 1303, the mobile phone may determine that the light sensitivity selected by the user is 400, and the exposure time is 8 s.

It may be understood that, in this embodiment of this application, the mobile phone may automatically set an appropriate long-exposure parameter based on an image detected by the camera. If the user wants to modify a current long-exposure parameter that is automatically set, the user can tap the icon 1301. When detecting an operation that the user taps the icon 1301 and modifies the parameter in the window 1302, the mobile phone may display, on the shooting interface, a modified long-exposure parameter set by the user.

Figure 13C:
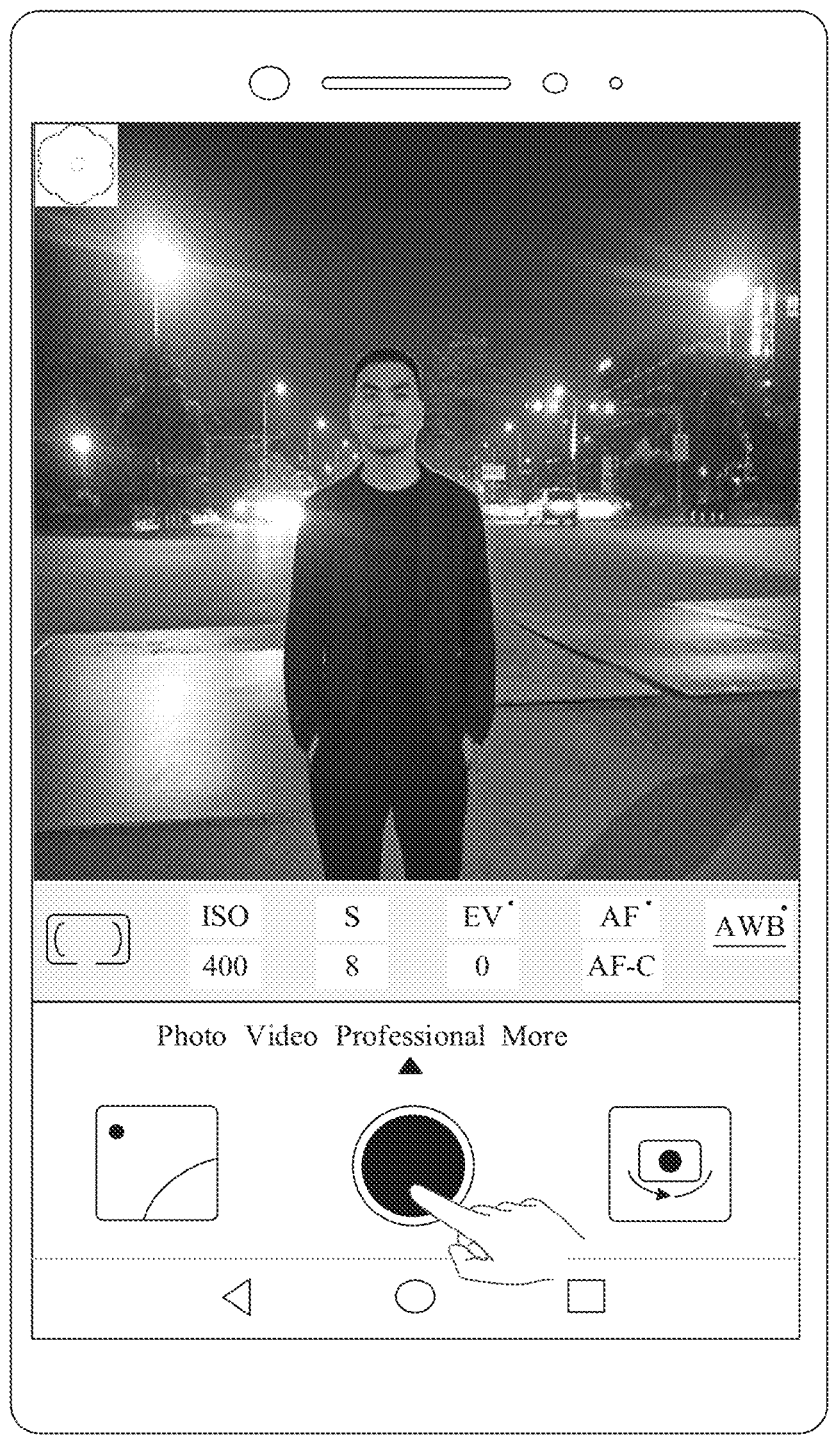
Figure 13D:
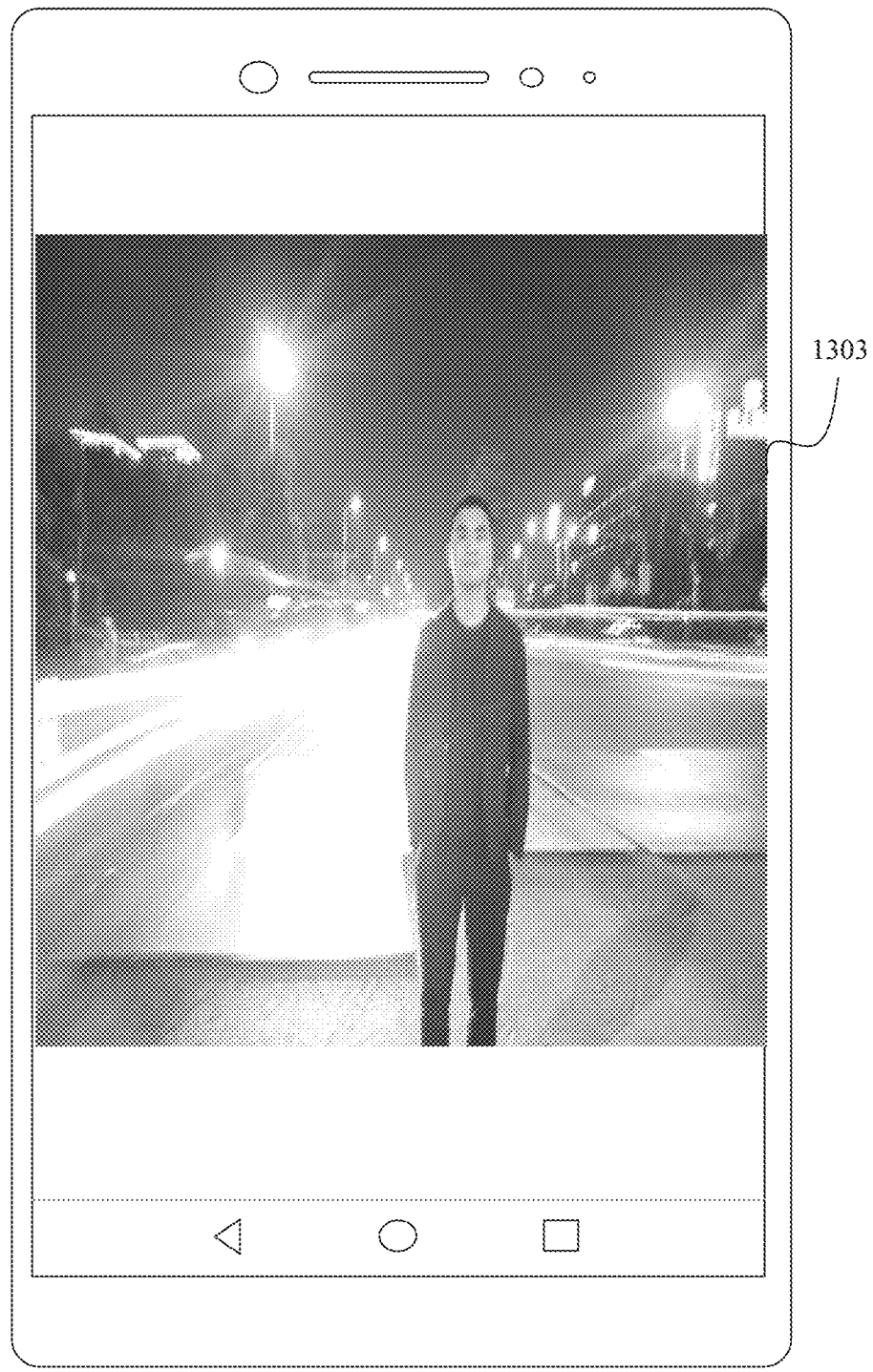

Referring to FIG. 13(c), after detecting an operation that the user taps the shooting control, the mobile phone starts to generate a long-exposure image in the background light painting mode, where the long-exposure time is 8 s, and displays a GUI shown in FIG. 13(d).

Referring to FIG. 13(d), the GUI includes the finally generated image 3 with a clear foreground and a long-exposure background.

In an embodiment, the mobile phone may further perform the long-exposure processing on a plurality of photos to generate an image with a clear foreground and a long-exposure background.

Figure 14A:
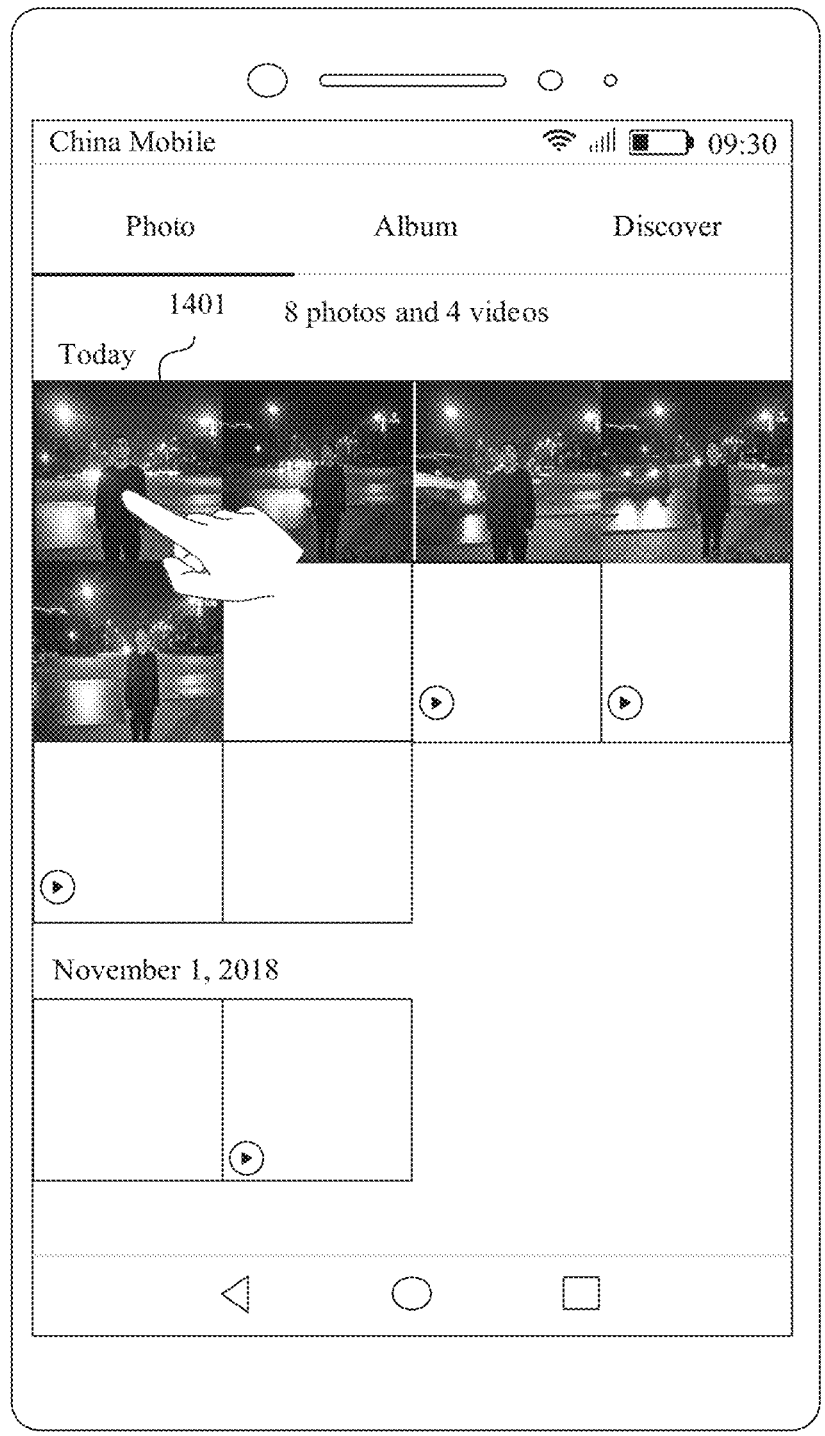
FIG. 14(a) to FIG. 14(e) are schematic diagrams of another group of display interfaces according to an embodiment of this application.

For example, referring to FIG. 14(a), after starting the album, the mobile phone may display, on the touchscreen, that "eight photos and four videos" are currently stored in the album. After detecting a preset gesture of the user for a photo 1401, the mobile phone displays a GUI shown in FIG. 14(b).

Figure 14B:
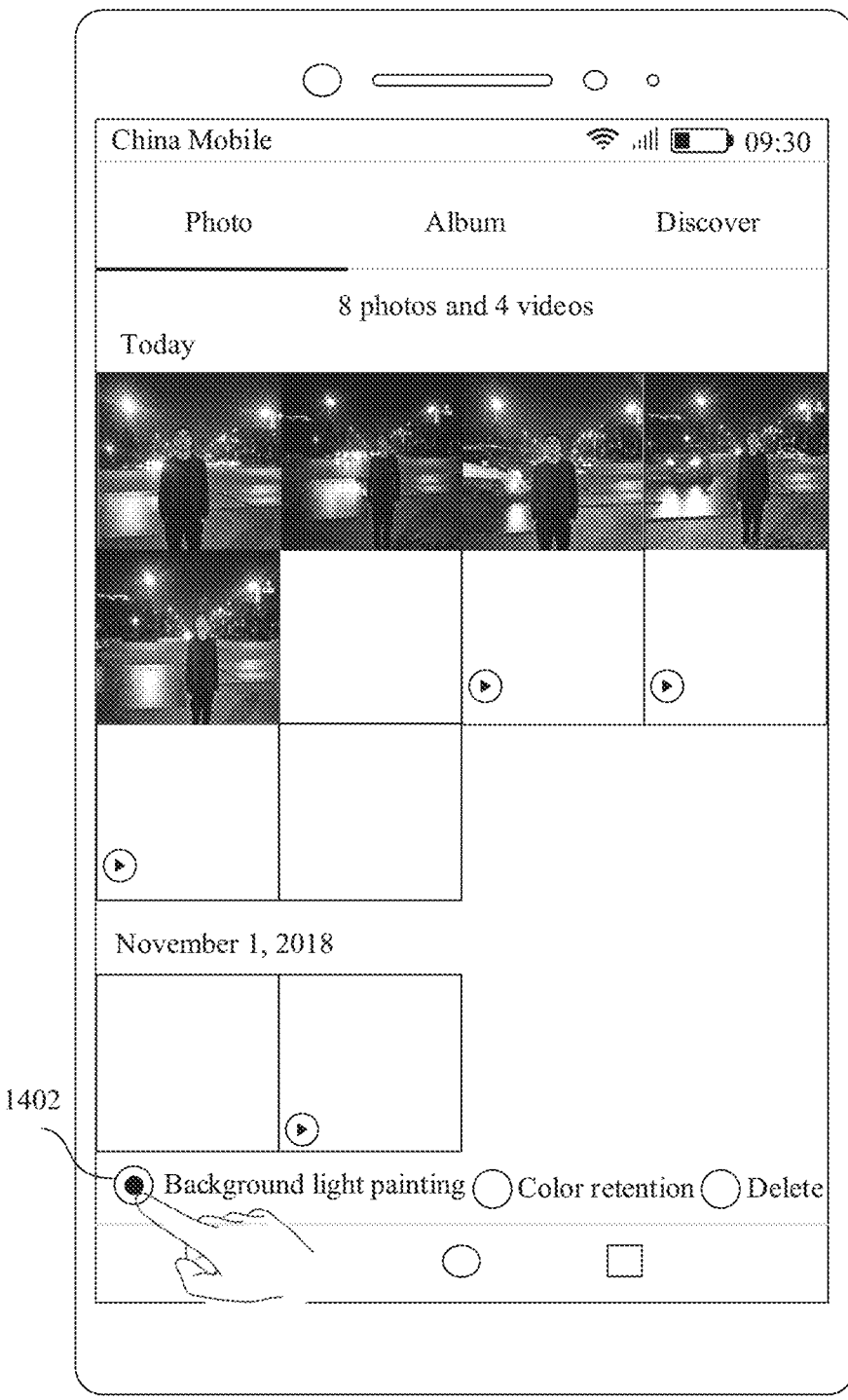

For example, after detecting a touch and hold operation performed by the user on the photo 1401 on an album interface, the mobile phone enters a GUI shown in FIG. 14(b).

For another example, after detecting a press operation (press force is greater than or equal to a preset value) performed by the user on the photo 1401 on the album interface, the mobile phone enters a GUI shown in FIG. 14(b).

Referring to the GUI shown in FIG. 14(b), the album interface includes a control 1402 used to indicate to enter a background light painting mode, a control used to enter a color retention mode, and a control used to delete. After detecting an operation that the user taps the control 1402, the mobile phone displays a GUI shown in FIG. 14(c).

Figure 14C:
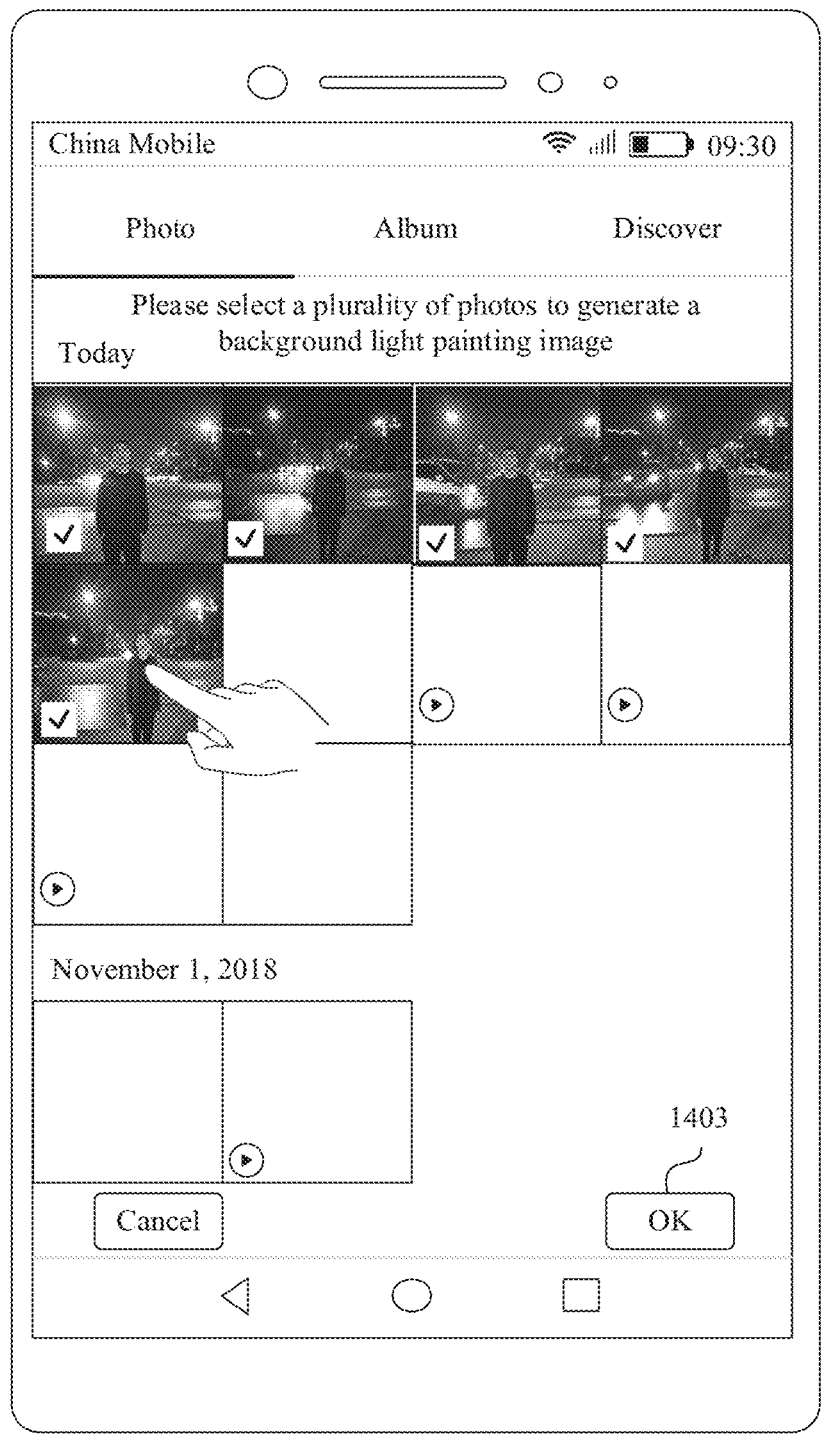

Referring to FIG. 14(c), the mobile phone enters the background light painting mode, and may prompt, in a text prompt (or a voice prompt) manner, "Please select a plurality of photos to generate a background light painting image".

Figure 14D:
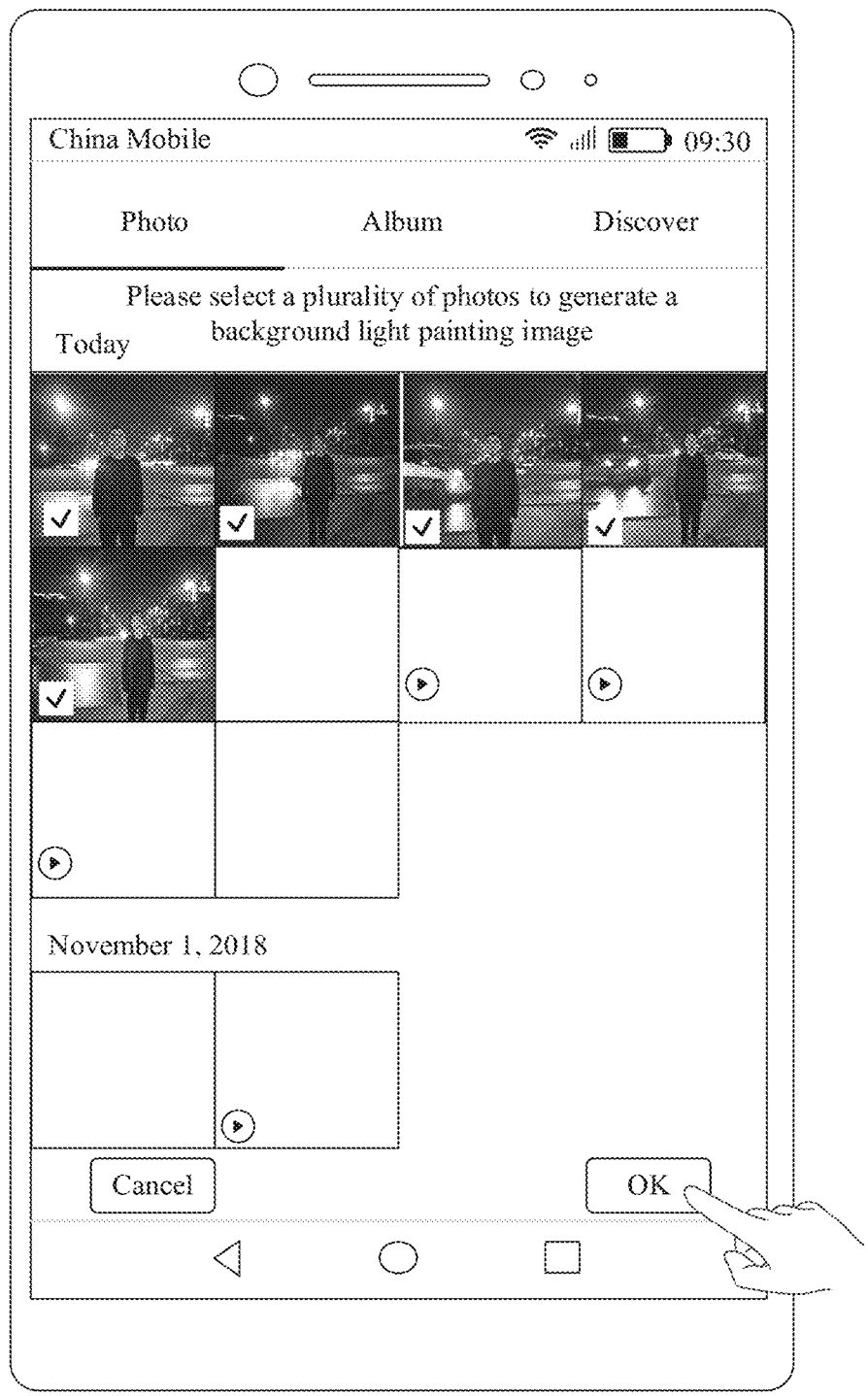

Referring to a GUI shown in FIG. 14(d), the mobile phone may detect that the user selects five photos. After detecting an operation that the user taps a control 1403, the mobile phone displays a GUI shown in FIG. 14(e).

Figure 14E:
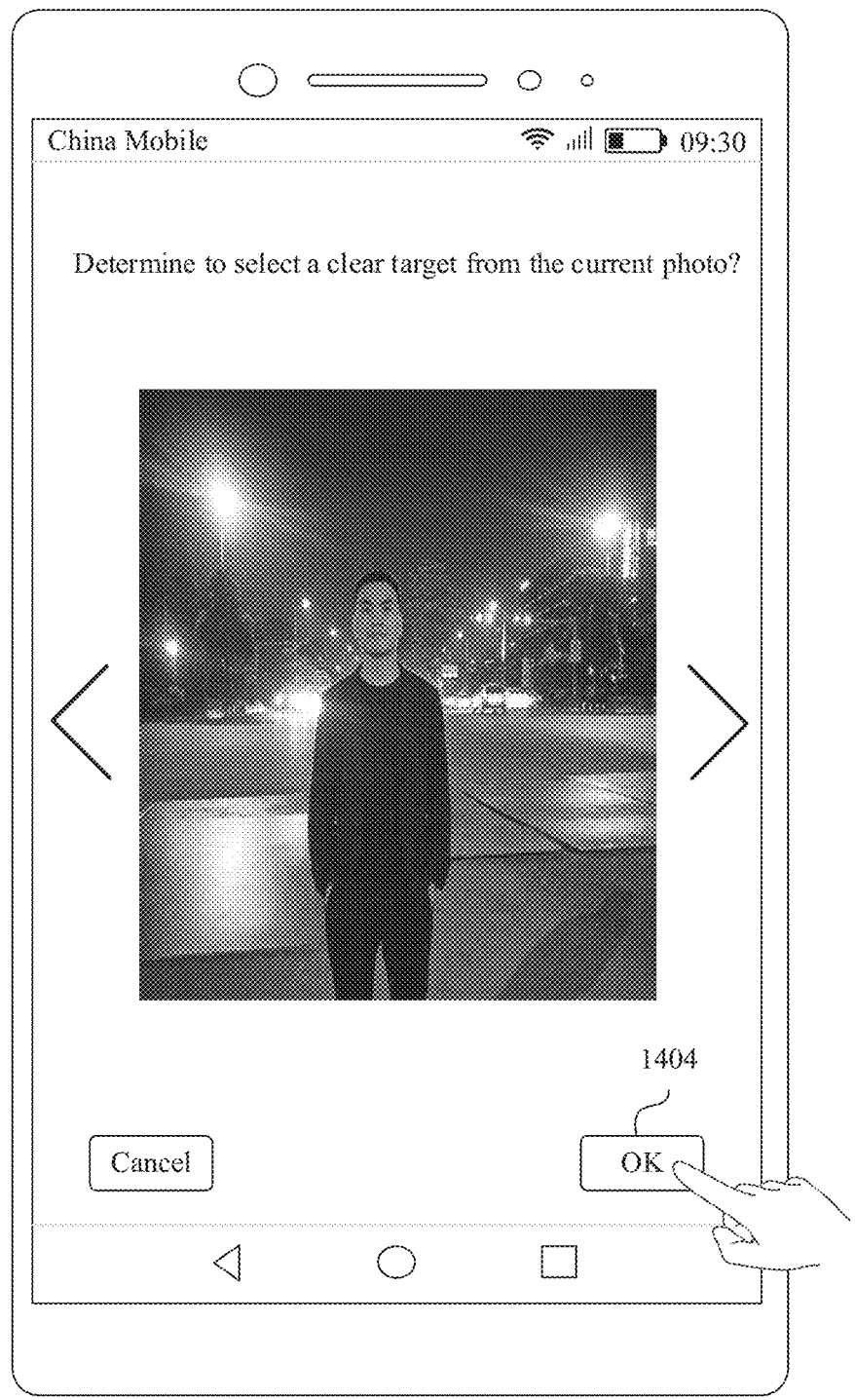

Referring to FIG. 14(e), the mobile phone may prompt, in a text prompt manner, the user "determine to select the foreground target from the current photo". After detecting an operation that the user taps a control 1404, the mobile phone determines to select the foreground target from the current photo.

It should be understood that, after selecting a photo, the mobile phone may determine the foreground target in the photo based on an operation of the user, and finally generate a background light painting image of background light. For a process, refer to the GUIs in FIG. 6(a) to FIG. 9(b). For brevity, details are not described herein again.

In another embodiment, in a lock screen state or on the home screen, after detecting another preset gesture of the user (for example, the user draws a track "R" by using a finger), the mobile phone may directly open the camera application and enter the background light painting mode.

In an embodiment, in the background light painting mode, the mobile phone may automatically exit the background light painting mode after completing a current shooting operation (for example, shooting a photo or completing video shooting).

In another embodiment, in the background light painting mode, after completing current shooting, the mobile phone is still in the background light painting mode. After exiting the camera application, the mobile phone may automatically exit the background light painting mode.

In another embodiment, in the background light painting mode, after detecting that the user indicates, by using a voice or a gesture operation, to exit the background light painting mode, the mobile phone may exit the background light painting mode. For example, in the background light painting mode, if detecting an operation that the user taps a back (back) control, the mobile phone exits the background light painting mode.

For another example, in the background light painting mode, when a control used to identify the background light painting mode is displayed on the shooting interface, if detecting an operation that the user drags the control outside the touchscreen of the mobile phone, the mobile phone exits the background light painting mode. If the mobile phone does not exit the background light painting mode when the mobile phone exits the camera last time, the mobile phone can directly enter the background light painting mode after opening the camera application this time.

Figure 15:
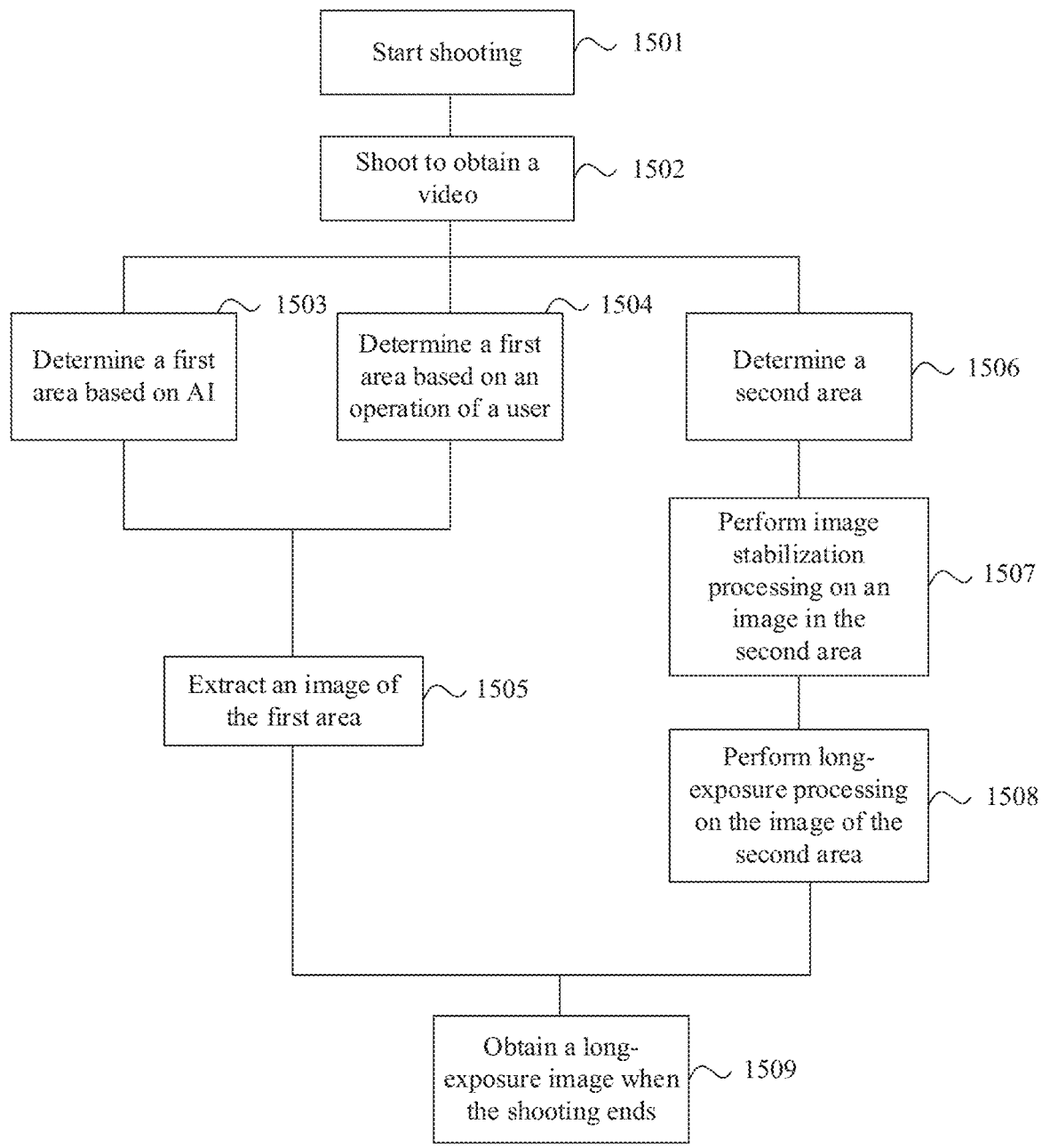
FIG. 15 is a schematic flowchart of an algorithm for shooting a long-exposure image according to an embodiment of this application.
Figure 16:
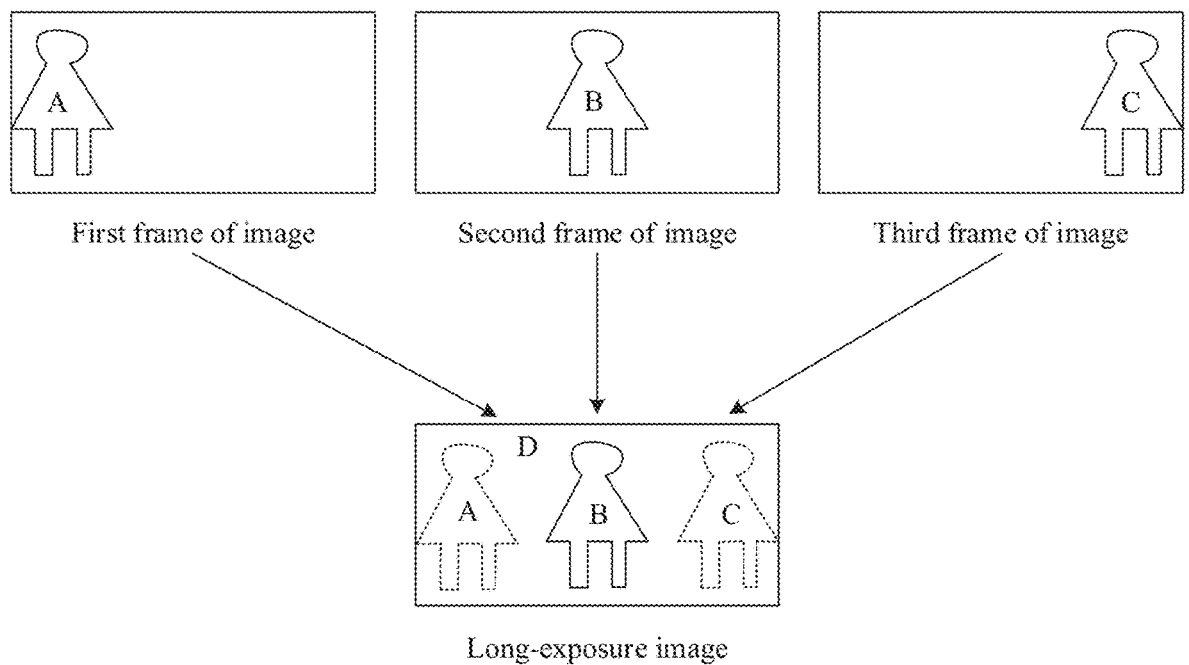
FIG. 16 is a schematic diagram of a generation process of a long-exposure image according to an embodiment of this application.

With reference to FIG. 1 to FIG. 14(e), the foregoing describes the GUIs in the method for shooting a long-exposure image in the embodiments of this application. With reference to FIG. 15 and FIG. 16, the following describes an algorithm process in the embodiments of this application.

FIG. 15 is a schematic flowchart of an algorithm 1500 for shooting a long-exposure image according to an embodiment of this application. As shown in FIG. 15, a specific procedure of the algorithm 1500 is as follows.

S1501: Start shooting.

For example, as shown in FIG. 3(e), after detecting an operation that a user taps a control 306 in a background light painting mode, a mobile phone starts to shoot.

For example, as shown in FIG. 13(c), after detecting an operation that the user taps the control 306 in the background light painting mode, the mobile phone starts to shoot.

S1502: Shoot to obtain a video (or a plurality of frames of image).

For example, as shown in FIG. 3(f), after the mobile phone detects an operation that the user taps the control 306 again, a camera of the mobile phone stops video capture, and obtains the video (or the plurality of frames of image). If each second includes 30 frames of image, a shot eight-second video includes 240 frames of image.

S1503: Determine a first area based on AI.

For example, the mobile phone may select a frame of image from the shot eight-second video (or 240 frames of image) as an image of a first object. For example, the mobile phone selects, by default, a first frame of image as an image for extracting the first object, and selects a clear first object from the first frame of image. As shown in FIG. 3(e), the mobile phone may select an image in a viewfinder frame that is present when the control 306 is tapped as the image for extracting the first object.

For example, a process in which the mobile phone selects the first object from the first frame of image may be based on image segmentation. For an image obtained through segmentation, the mobile phone may identify the first object based on a preset priority sequence of selecting the first object. For example, the priority sequence that is of the first object and that is preset by the mobile phone is a person, an animal, and another object that is not completely static. When the mobile phone determines, based on image segmentation, that the first frame of image includes a boy, an area in which the boy is located may be used as the first area.

S1504. Determine a first area based on an operation of the user.

For example, in the GUIs shown in FIG. 4(a) to FIG. 7(b), the mobile phone may first select, based on the operation of the user, a frame of image from a video as an image for extracting the first object, and then select a clear first object from the image based on the operation of the user. An area in which the first object is located is the first area.

It should be understood that, in the S1503, when the user wants to shoot a long-exposure image, the long-exposure image may be automatically generated based on an internal algorithm (for example, image segmentation or priority sorting) of the mobile phone. The S1504 may be that the user has shot a video before, and then the user expects to select the first object, and the mobile phone may finally generate the long-exposure image based on the operation of the user.

S1505: Extract an image of the first area.

For example, after determining the first object in the S1503 or the S1504, the mobile phone may extract the first object.

S1506: Determine a second area.

S1507: Perform image stabilization processing on a plurality of frames of image in the second area.

For example, two adjacent frames of image may be matched to implement motion compensation between adjacent frames.

S1508: Perform long-exposure processing on the second area in the video (or the plurality of frames of image).

For example, the mobile phone may perform long-exposure processing on an area other than the first area in the plurality of frames of image.

S1509: Generate a long-exposure image when the shooting ends.

For example, the mobile phone may combine a clear first image in the first area and a long-exposure image in the second area, to finally generate an image with a clear person and a long-exposure background.

It should be understood that, for long-exposure processing of the second area, all images included in the video may be used during long-exposure processing of a part of the second area, and some images in all the images included in the video may be used in the other part.

FIG. 16 is a schematic diagram of a process of generating a long-exposure image according to an embodiment of this application. As shown in FIG. 16, it is assumed that a shot video includes three frames of image. (It should be understood that only three frames of image are used as an example for description herein. In an actual shooting process, there may be a large quantity of frames in a video. For a process, refer to a process of generating a long-exposure image by using three frames of image.)

In a first frame of image, a person is on a left side (area A) of the image. In a second frame of image, the person is in a middle position (area B) of the image. In a third frame of image, the person is on a right side (area C) of the image. An area other than the area A, the area B, and the area C is an area D. It is assumed that the mobile phone selects to extract a clear person from the second frame of image. In other words, the area B in a finally generated long-exposure image actually uses the area B in the second frame of image. In a long-exposure processing process of a second area, an image of the area A in the second frame of image and the third frame of image is actually used in a long-exposure processing process of the area A, an image of the area C in the first frame of image and the second frame of image is actually used in a long-exposure processing process of the area C, and an image of the area D in the first frame of image, the second frame of image, and the third frame of image is actually used in a long-exposure processing process of the area D.

In other words, in the finally generated long-exposure image, the area B is obtained from one frame of image, the area A is obtained from two frames of image, the area C is obtained from two frames of image, and the area D is obtained from three frames of image.

As mentioned above, the mobile phone may perform image segmentation by using a plurality of algorithms, and an example in which image segmentation is performed by using a CNN-based deep learning algorithm is used herein for description.

Figure 17:
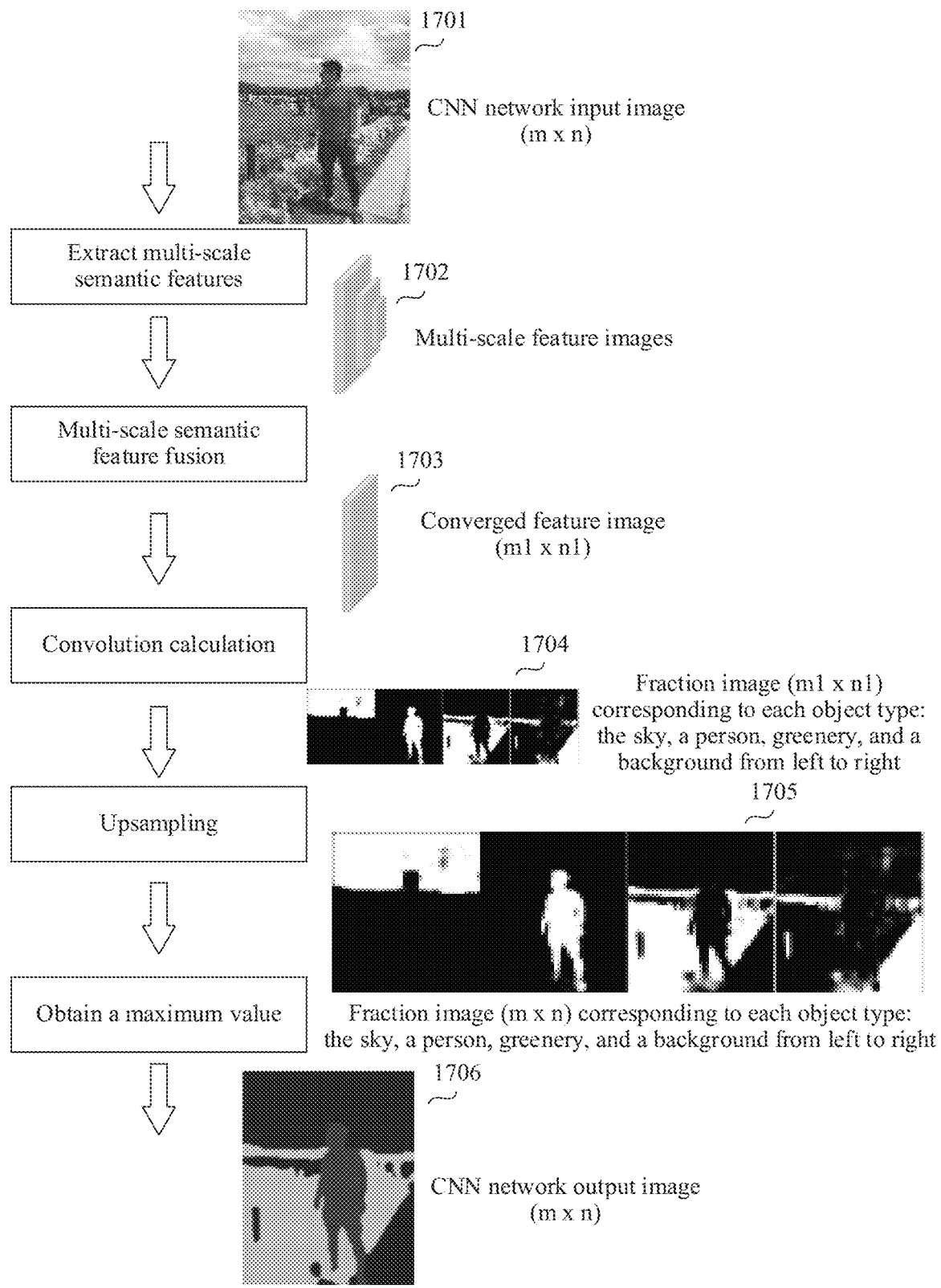
FIG. 17 is a schematic diagram of an image segmentation process according to an embodiment of this application.

Based on this algorithm, after obtaining an original image captured by a camera lens, the mobile phone may perform downsampling on the original image, and convert the original image into an image with relatively low resolution for complex CNN calculation, to reduce a calculation amount. For example, referring to FIG. 17, the original image is an image 1701, a unit for image segmentation is an object type, and the object type includes the sky, a person, greenery, and a background. The mobile phone processes a size of M×N (namely, resolution of M×N) of the original image as a size of m×n, where m is less than M, and n is less than N. The mobile phone extracts semantic features of the image layer by layer by performing convolution and downsampling operations (including but not limited to stride convolution and pooling pooling), to obtain multi-scale feature images 1702 whose sizes are m1×n1, m2×n2, and m3×n3, where m1, m2, and m3 are multiples and less than m, and n1, n2, and n3 are multiples and less than n. Then, the mobile phone converges the obtained multi-scale feature images 1702 through convolution and upsampling operations, to obtain a converged feature image 1703 with a size of m1×n1. Next, the mobile phone performs convolution calculation on the converged feature image 1703, and calculates a segmentation value of each object on each pixel, to obtain four fraction images 1704 that are corresponding to the sky, the person, the greenery, and the background. A size of the fraction image is m1×n1. An upsampling operation is performed on each of the obtained four fraction images, to obtain four fraction images 1705 with a size of m×n. Segmentation values of corresponding pixels on the four fraction images are compared with each other pixel by pixel, and an object type corresponding to a fraction image of a largest segmentation value is an object type corresponding to a current pixel, to obtain an object type corresponding to each pixel, in other words, obtain a mask image 1706 (with a size of m×n). On the mask image 1706, areas of different object types have different marks. For example, colors of areas of different object types are different.

After the mask image is obtained, upsampling is performed on the mask image to obtain a size of M×N that is the same as that of the original image. In this way, pixel areas corresponding to different object types on the original image can be obtained by making a comparison with the mask image. Whether a pixel on the original image is in an area in which a target object is located is determined one by one, and if the pixel is in the area in which the target object is located, the mobile phone retains a foreground target in the area, and if the pixel is not in the area in which the target object is located, the mobile phone performs long-exposure processing on an image that is not in the area in which the target object is located. In this way, the area in which the target object is located is a clear foreground target, and an area outside the area in which the target object is located is a long-exposure image. Subsequently, the mobile phone may perform processing such as encoding on the processed image, and display the processed image on a shooting interface.

It should be noted that the foregoing examples are described by using an example in which the unit for image segmentation is the object type, and the unit for image segmentation may be alternatively an object. In this way, an area in which each object is located on the original image may be obtained through image segmentation, so that a clear foreground target may be reserved in the area in which the target object (which may correspond to one or more objects) is located based on the area in which each object is located, and long-exposure processing is performed on the area outside the area in which the target object is located, to obtain the long-exposure image.

Figure 18:
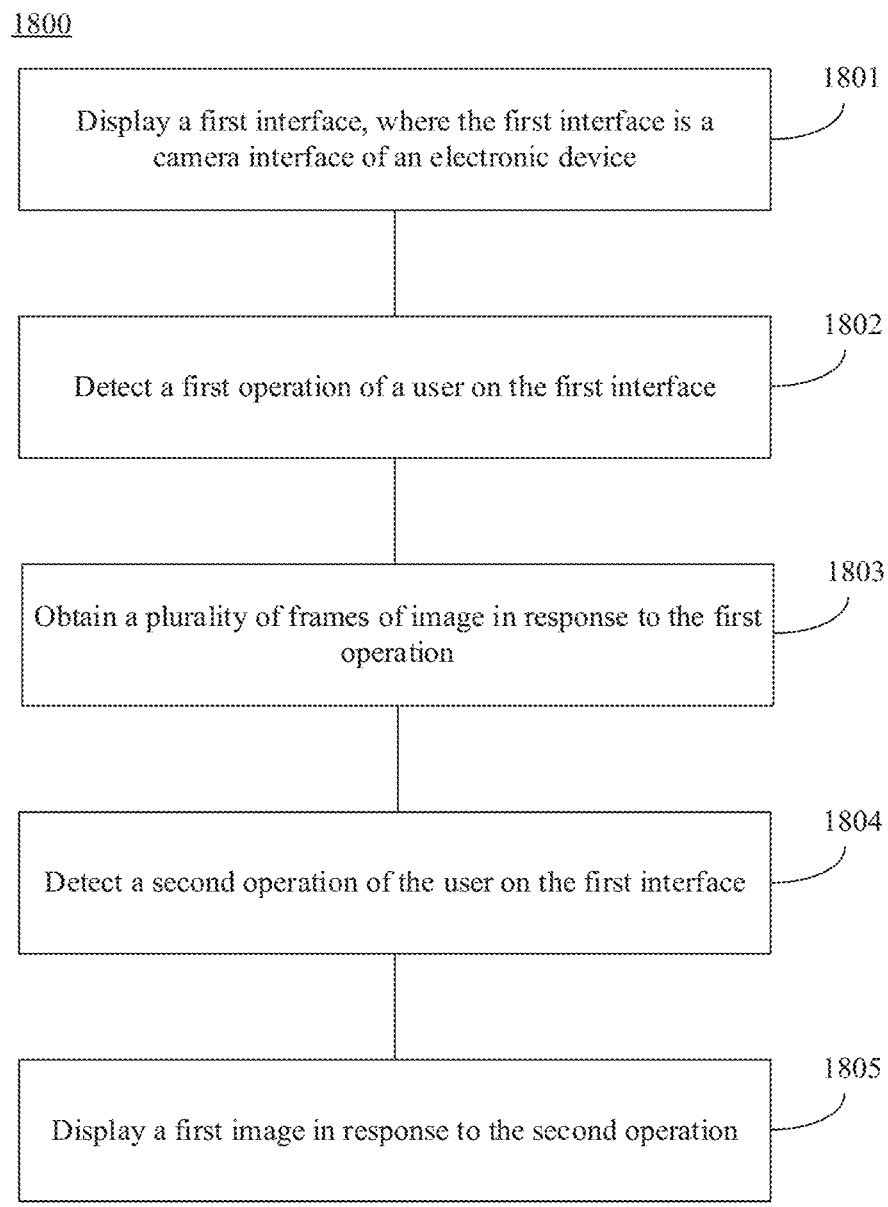
FIG. 18 is a schematic flowchart of a method for shooting a long-exposure image according to an embodiment of this application.

With reference to the foregoing embodiments and related accompanying drawings, an embodiment of this application provides a method for shooting a long-exposure image. The method may be implemented by an electronic device (for example, a mobile phone or a tablet computer) having a touchscreen and a camera lens in FIG. 1 and FIG. 2. As shown in FIG. 18, the method may include the following steps.

S1801: Display a first interface, where the first interface is a camera interface of an electronic device.

For example, the first interface is the camera interface shown in FIG. 3(b).

Optionally, before the displaying a first interface, the method further includes:

detecting a fifth operation performed by a user to indicate to start a camera application on a home screen of the electronic device.

For example, as shown in FIG. 3(a), the fifth operation may be an operation that the user taps an icon 302. After detecting the operation that the user taps the icon 302, the mobile phone enters the camera interface shown in FIG. 3(b).

S1802: Detect a first operation of the user on the first interface.

For example, as shown in FIG. 3(e), the first operation may be an operation that the user taps a shooting control 306.

For example, as shown in FIG. 13(c), the first operation may be the operation that the user taps the shooting control 306 by the user.

S1803: Obtain a plurality of frames of image in response to the first operation.

For example, as shown in FIG. 3(f), after the user shoots a video whose duration is eight seconds, the plurality of frames of image are the video, or are images included in the video.

S1804: Detect a second operation of the user on the first interface.

For example, as shown in FIG. 3(g), the second operation is an operation that the user taps an album 307.

For example, as shown in FIG. 13(c), the second operation is the operation that the user taps the album 307.

S1805: Display a first image in response to the second operation, where the first image includes a first area and a second area, the first area includes a first object identified by the electronic device, the first object is obtained from a first frame number of image in the plurality of frames of image, and the first area of the first frame number of image includes the first object, an image of the second area is obtained from a second frame number of image in the plurality of frames of image, and the first frame number is less than the second frame number.

For example, as shown in FIG. 3(h), the first image is the image 310 displayed in FIG. 3(h).

For example, as shown in FIG. 13(d), the first image is the image 1303 displayed in FIG. 13(d).

In the solution described in the step 1801 to the step 1805, when entering a processing mode for a long-exposure image, the electronic device may select one frame from the shot video (the plurality of frames of image) to extract the first object, or extract the first object from an image into which several frames of image are synthesized. Therefore, it is ensured that the first object is clear in the finally obtained long-exposure image, and it is avoided that in the prior art, when a to-be-shot object includes a person or another object that is not completely static, indiscriminate long-exposure is performed on all objects in the image, thereby causing blurring of the person or another object. This improves an image processing effect and an image display effect.

Optionally, the image of the second area is obtained by performing long-exposure processing on the second frame number of image.

For example, for the image 310 displayed in FIG. 3(h) or the image 1303 displayed in FIG. 13(d), the electronic device may perform long-exposure processing on an object in another area except the boy. It can be learned that vehicles on a left side and a right side of the boy show a long-exposure effect.

Optionally, the first frame number of image includes a second image, and the second image includes the first object.

Optionally, the first object is obtained from the first frame of image in the plurality of frames of image.

For example, as shown in FIG. 3(e), the second image may be an image of a moment at which the user taps the control 306. In other words, a first frame of image of a captured video is shot as an image for extracting the first object (namely, the boy in the figure). It can be seen that the boy in the image 310 comes from the boy in the image shown in FIG. 3(e).

Optionally, before the detecting a first operation of the user on the first interface, the method further includes:

detecting a third operation of the user on the first interface; and entering a second processing mode of the first interface in response to the third operation, where the second processing mode is one of a plurality of long-exposure processing modes.

For example, the third operation is an operation of detecting that the user prompts, by using a voice, to enter the second processing mode.

Optionally, the first interface includes a control of the second processing mode, and the third operation is an operation that the user taps the control.

For example, the first interface includes the plurality of long-exposure processing modes. As shown in FIG. 3(d), the first interface includes five long-exposure processing modes: tail light trails, light graffiti, silky water, star track, and background light painting, and the five modes are used in different shooting scenarios. For a specific scenario, refer to the foregoing descriptions. The third operation may be an operation that the user taps the icon 309. After the mobile phone detects the operation that the user taps the icon 309, the mobile phone enters a long-exposure shooting mode of the background light painting.

Figure 10B:
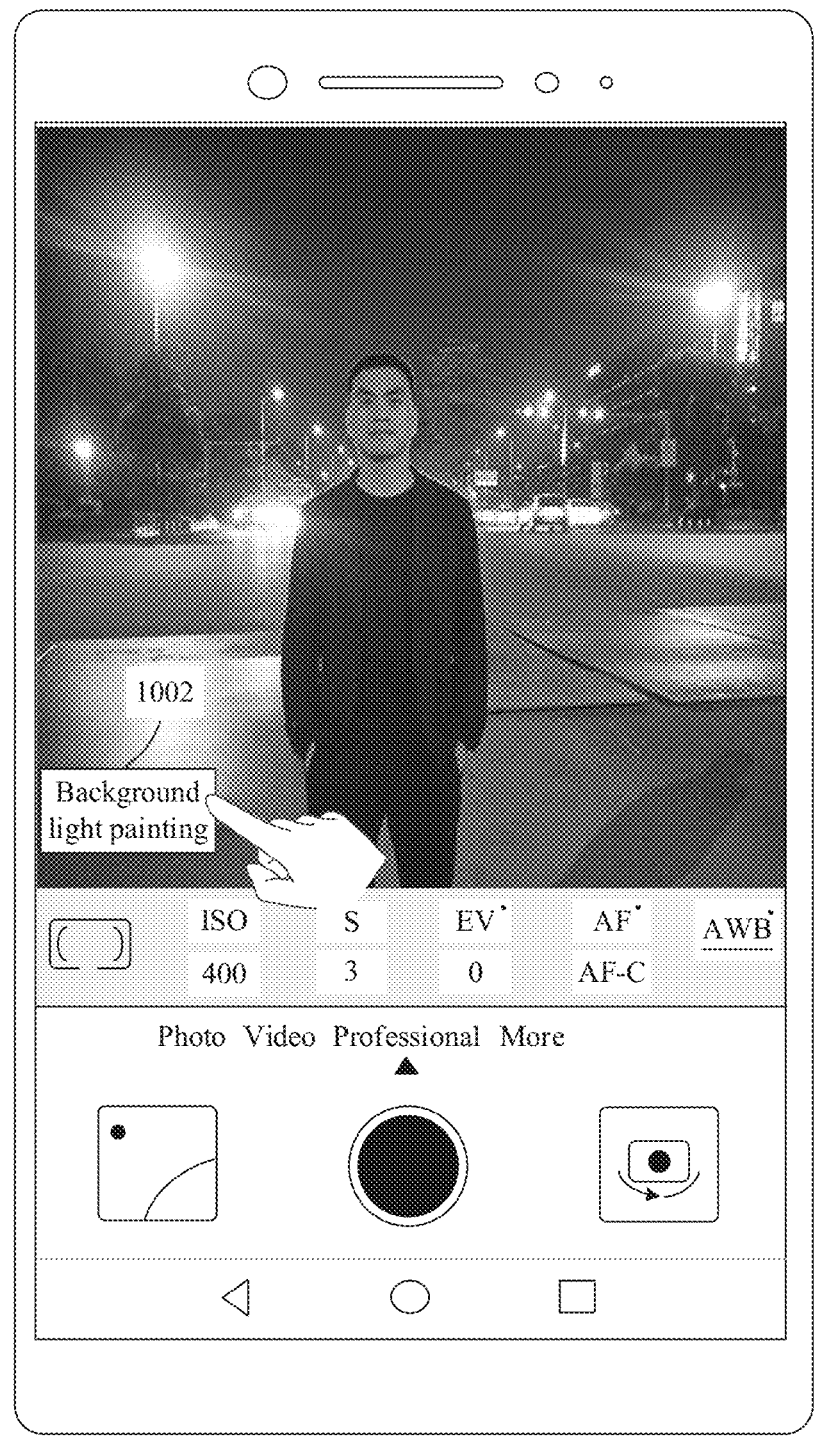

For example, as shown in FIG. 10(b), the control in the second processing mode is a control 1002, and the third operation is an operation that the user taps the control 1002.

Figure 10C:
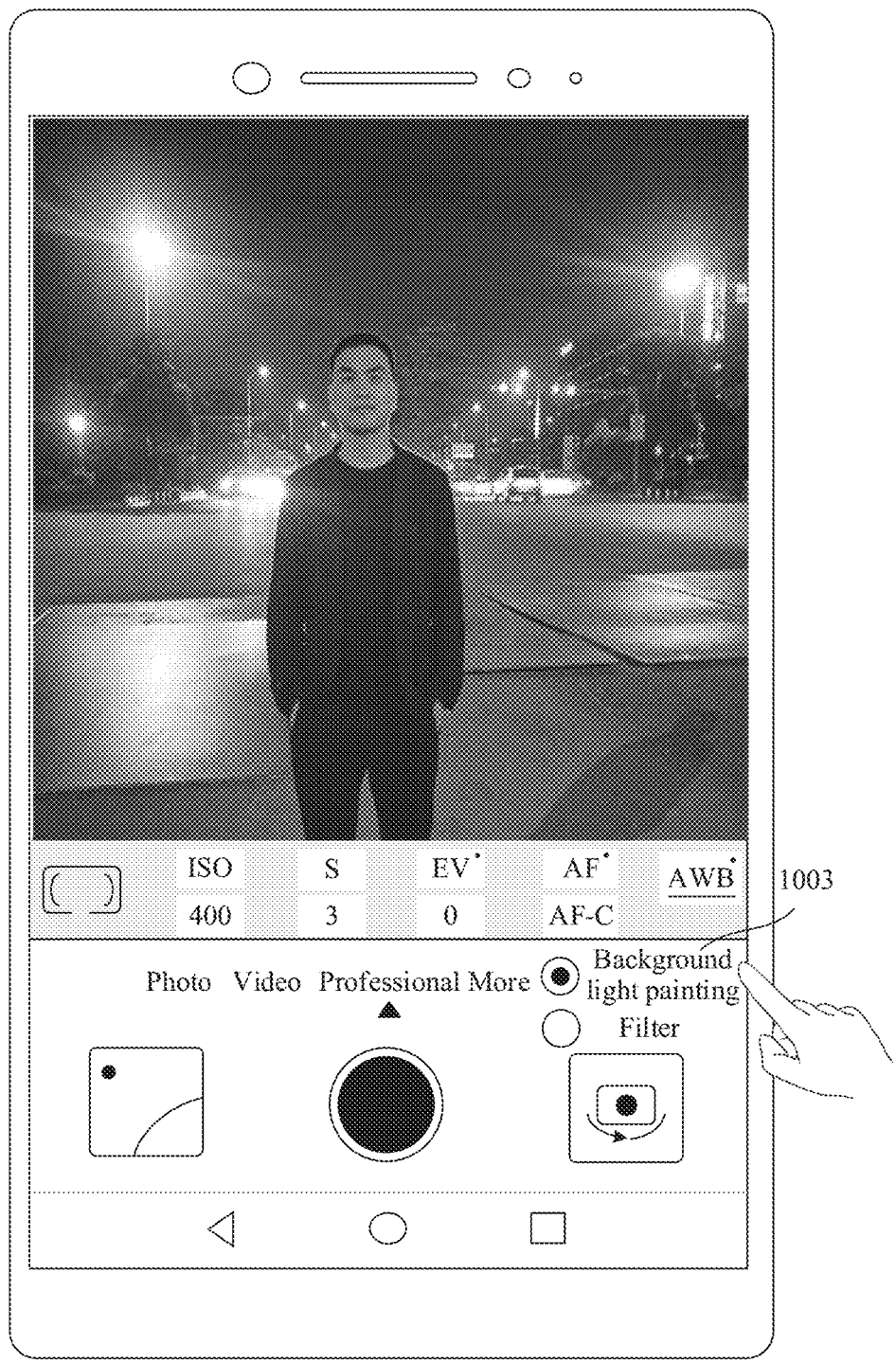

For example, as shown in FIG. 10(c), the control in the second processing mode is a control 1003, and the third operation is an operation that the user taps the control 1003.

Figure 11B:
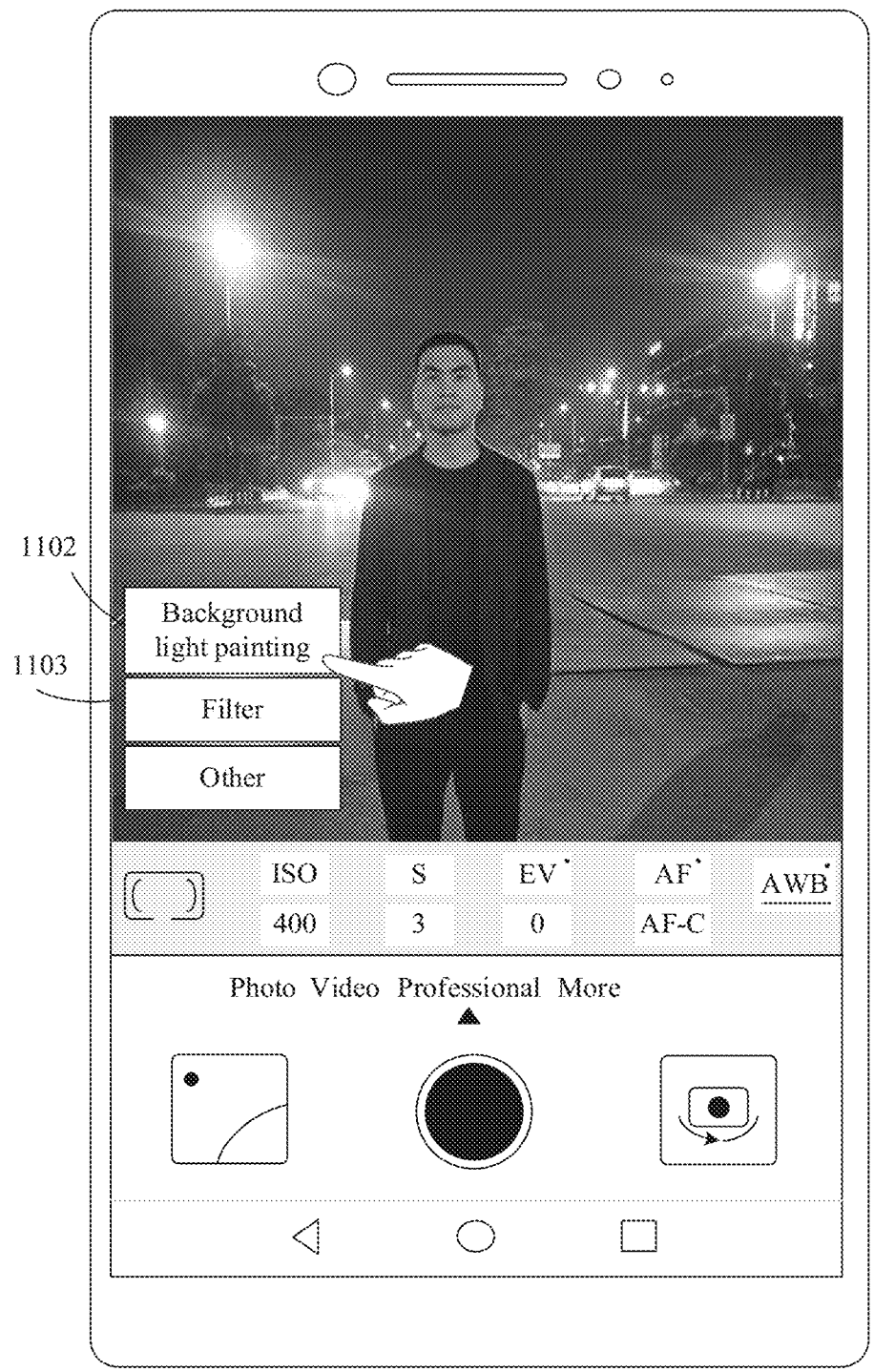

For example, as shown in FIG. 11(b), the control in the second processing mode is a control 1102, and the third operation is an operation that the user taps the control 1102.

For example, as shown in FIG. 12(a), the control in the second processing mode is a control 1202, and the third operation is an operation that the user taps the control 1202.

Optionally, the third operation is a preset gesture.

For example, as shown in FIG. 12(b), after detecting the preset gesture of the user on the touchscreen, the mobile phone enters the long-exposure shooting mode of the background light painting.

Optionally, the third operation is that the user prompts, by using a voice, to enter the background light painting mode.

For example, as shown in FIG. 12(c), after detecting that the user provides a voice prompt "Enter the background light painting mode", the mobile phone enters the background light painting mode.

Optionally, the obtaining a plurality of frames of image in response to the first operation includes:
  starting shooting in response to the first operation, where for example, as shown in FIG. 3(e), the first operation is an operation that the user taps the control 306;
  detecting, on the first interface, a fourth operation performed by the user to indicate to stop shooting, where for example, as shown in FIG. 3(f), the fourth operation is an operation that the user taps the control 306 again; and
  obtaining a plurality of frames of image in response to the fourth operation.

Optionally, before the displaying a first interface, the method further includes:
  detecting a fifth operation performed by a user to indicate to start a camera application on a home screen of the electronic device.

For example, as shown in FIG. 3(a), the fifth operation is an operation that the user taps the icon 302.

Optionally, the first object is a preset target object.

Optionally, the first object includes a person or an animal.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into functional modules based on the example in the foregoing method. For example, each functional module corresponding to each function may be obtained through division, or two or more functions may be integrated into one processing module. The integrated module may be implemented in a form of hardware. It should be noted that, in this embodiment, module division is an example, and is merely a logical function division. In an actual implementation, another division manner may be used.

Figure 19:
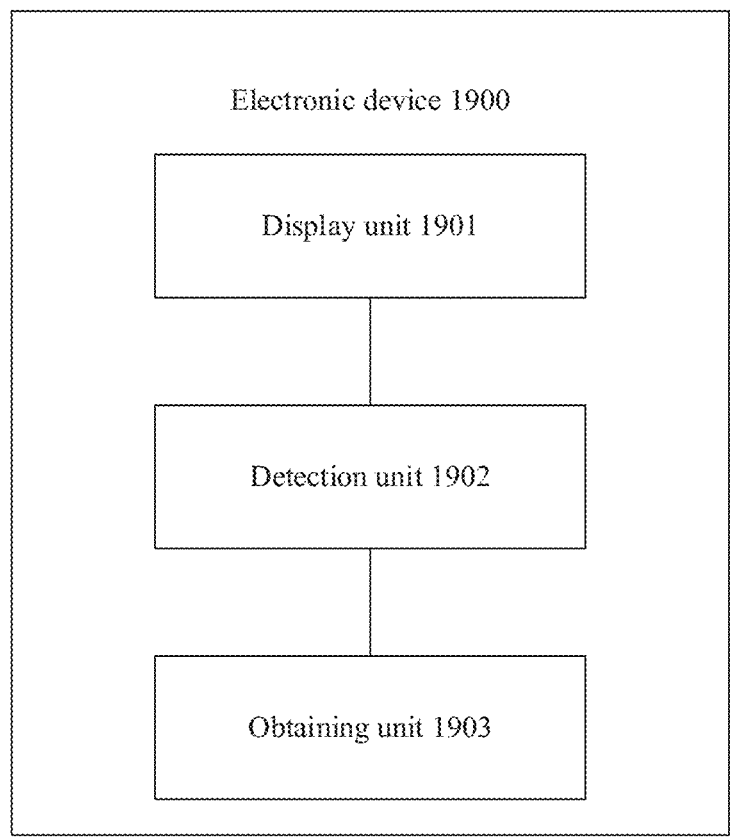
FIG. 19 is a schematic block diagram of an electronic device according to an embodiment of this application.

When each functional module is obtained through division based on each corresponding function. FIG. 19 is a possible schematic composition diagram of the electronic device 1900 in the foregoing embodiment. As shown in FIG. 19, the electronic device 1900 may include a display unit 1901, an obtaining unit 1902, and a detection unit 1903.

The display unit 1901 may be configured to support the electronic device 1900 in performing the step 1801, the step 1805, and the like, and/or another process used for the technology described in this specification.

The detection unit 1902 may be configured to support the electronic device 1900 in performing the step 1802, the step 1804, and the like, and/or another process used for the technology described in this specification.

The obtaining unit 1903 may be configured to support the electronic device 1900 in performing the step 1803 and the like, and/or another process used for the technology described in this specification.

It should be noted that all related content of the steps in the foregoing method embodiments may be cited in function descriptions of corresponding functional modules. Details are not described again herein.

The electronic device provided in this embodiment is configured to perform the foregoing method for shooting a long-exposure image, and therefore can achieve a same effect as the foregoing implementation method.

When an integrated unit is used, the electronic device may include a processing module, a storage module, and a communications module. The processing module may be configured to control and manage actions of the electronic device, for example, may be configured to support the electronic device in performing the steps performed by the display unit 1901, the detection unit 1902, and the processing unit 1903. The storage module may be configured to support the electronic device in storing program code, data, and the like. The communications module may be configured to support communication between the electronic device and another device.

The processing module may be a processor or a controller. The processor or the controller may implement or execute various example logical blocks, modules, and circuits described with reference to content disclosed in this application. Alternatively, the processor may be a combination of processors implementing a computing function, for example, a combination of one or more microprocessors, or a combination of digital signal processing (digital signal processing, DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device in the structure shown in FIG. 1.

An embodiment further provides a computer storage medium. The computer storage medium stores a computer instruction. When the computer instruction is run on an electronic device, the electronic device is enabled to perform the foregoing related method steps, to implement the method for shooting a long-exposure image in the foregoing embodiments.

This embodiment further provides a computer program product. When the computer program product runs on a computer, the computer is enabled to perform the foregoing related steps, to implement the method for shooting a long-exposure image in the foregoing embodiments.

In addition, an embodiment of this application further provides an apparatus. The apparatus may be specifically a chip, a component, or a module. The apparatus may include a processor and a memory that are connected. The memory is configured to store a computer-executable instruction. When the apparatus runs, the processor may execute the computer-executable instruction stored in the memory, to enable the chip to perform the method for shooting a long-exposure image in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read only memory (read only memory. ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   displaying a first interface, wherein the first interface comprises a camera interface of an electronic device;
   detecting a first operation of a user on the first interface;
   obtaining a plurality of image frames in response to the first operation;
   detecting a second operation of the user on the first interface;
   displaying a first image in response to the second operation;
   automatically identifying, by the electronic device and based on a preset target object, a first area and a second area of the first image, wherein the first area comprises a foreground object, wherein the foreground object corresponds to the preset target object, wherein the first area is located completely within the second area such that an outer border of the first area is surrounded by the second area, wherein the foreground object is from a first number of image frames in the plurality of image frames, wherein the second area comprises a background area from a second number of image frames in the plurality of image frames, and wherein the first number of image frames is less than the second number of image frames; and
   displaying, in response to automatically identifying the first area and the second area, a second interface comprising the foreground object, the background area, and text information, wherein the foreground object is displayed in the first area and is filled with slashes, wherein the background area is displayed with a processing effect, and wherein the text information indicates a type of the processing effect that is selected and that the foreground object is selected as a foreground target.

2. The method of claim 1, further comprising:
   obtaining the foreground object without performing long-exposure processing; and
   obtaining the background area by performing the long-exposure processing on the second number of image frames.

3. The method of claim 1, wherein before detecting the first operation of the user on the first interface, the method further comprises:
   detecting a third operation of the user on the first interface; and entering a first processing mode of the first interface in response to the third operation,
wherein the first processing mode comprises one of a plurality of long-exposure processing modes.

4. The method of claim 1, further comprising:
start shooting in response to the first operation;
detecting, on the first interface, a fourth operation performed by the user indicating to stop shooting; and
obtaining the plurality of image frames in response to the fourth operation.

5. The method of claim 1, further comprising:
performing long-exposure processing on the second number of image frames; and
not performing the long-exposure processing on the first number of image frames.

6. The method of claim 1, wherein the first number of frames comprises two or more frames, and wherein the second number of frames comprises three or more frames.

7. The method of claim 1, further comprising:
receiving an indication of the processing effect;
obtaining the foreground object without using the processing effect; and
obtaining the background area using the processing effect.

8. The method of claim 1, wherein the processing effect comprises tail light trails, light graffiti, silky water, star track, or background light paining.

9. The method of claim 1, wherein automatically identifying the first area and the second area comprises automatically identifying, using artificial intelligence (AI), the first area and the second area.

10. The method of claim 1, wherein automatically identifying the first area and the second area comprises automatically identifying, without receiving an additional operation of the user on the first interface, the first area and the second area.

11. The method of claim 1, wherein automatically identifying the first area and the second area comprises automatically identifying, using artificial intelligence (AI) and without receiving an additional operation of the user on the first interface, the first area and the second area.

12. The method of claim 1, further comprising receiving a tap operation of the user on the first interface, and wherein automatically identifying the first area and the second area comprises automatically identifying, based on the tap operation and using artificial intelligence (AI), the first area and the second area.

13. The method of claim 12, wherein automatically identifying the first area and the second area further comprises automatically identifying a type of object in the first area.

14. The method of claim 13, wherein the type of the object comprises a person, a vehicle, a tree, or a building.

15. An apparatus, comprising:
one or more processors; and
a memory coupled to the one or more processors and configured to store one or more programs, wherein when the one or more programs are executed by the one or more processors, the apparatus is configured to:
display a first interface, wherein the first interface is a camera interface of the apparatus;
detect a first operation of a user on the first interface;
obtain a plurality of image frames in response to the first operation;
detect a second operation of the user on the first interface;
display a first image in response to the second operation;
automatically identify, by the apparatus and based on a preset target object, a first area and a second area of the first image, wherein the first area comprises a foreground object, wherein the foreground object corresponds to the preset target object, wherein the first area is located completely within the second area such that an outer border of the first area is surrounded by the second area, wherein the foreground object is from a first number of image frames in the plurality of image frames, wherein the second area comprises a background area from a second number of image frames in the plurality of image frames, and wherein the first number of image frames is less than the second number of image frames; and
display, in response to automatically identifying the first area and the second area, a second interface comprising the foreground object, the background area, and text information, wherein the foreground object is displayed in the first area and is filled with slashes, wherein the background area is displayed with a processing effect, and wherein the text information indicates a type of the processing effect that is selected and that the foreground object is selected as a foreground target.

16. The apparatus of claim 15, wherein when the one or more programs are executed by the one or more processors, the apparatus is further configured to:
obtain the foreground object without performing long-exposure processing; and
obtain the background area by performing the long-exposure processing on the second number of image frames.

17. The apparatus of claim 15, wherein when the one or more programs are executed by the one or more processors, the apparatus is further configured to:
detect a third operation of the user on the first interface; and
enter a first processing mode of the first interface in response to the third operation,
wherein the first processing mode comprises one of a plurality of long-exposure processing modes.

18. The apparatus of claim 15, wherein when the one or more programs are executed by the one or more processors, the apparatus is further configured to:
start shooting in response to the first operation;
detect, on the first interface, a fourth operation performed by the user to indicate to stop shooting; and
obtain the plurality of image frames in response to the fourth operation.

19. A computer program product comprising computer-executable instructions stored on a non-transitory computer-readable medium that, when executed by one or more processors, cause an apparatus to:
display a first interface, wherein the first interface comprises a camera interface of the apparatus;
detect a first operation of a user on the first interface;
obtain a plurality of image frames in response to the first operation;
detect a second operation of the user on the first interface;
display a first image in response to the second operation;
automatically identify, by the apparatus and based on a preset target object, a first area and a second area of the first image, wherein the first area comprises a foreground object, wherein the foreground object corresponds to the preset target object, wherein the first area is located completely within the second area such that an outer border of the first area is surrounded by the second area, wherein the foreground object is obtained from a first number of image frames in the plurality of image frames, wherein the second area comprises a background area from a second number of image frames in the plurality of image frames, and wherein the first number of image frames is less than the second number of image frames; and display, in response to automatically identifying the first area and the second area, a second interface comprising the foreground object, the background area, and text information, wherein the foreground object is displayed in the first area and is filled with slashes, wherein the background area is displayed with a processing effect, and wherein the text information indicates a type of the processing effect that is selected and that the foreground object is selected as a foreground target.

20. The computer program product of claim 19, wherein the instructions further cause the apparatus to:

obtain the foreground object without performing long-exposure processing; and obtain the background area by performing the long-exposure processing on the second number of image frames.

21. The computer program product of claim 19, wherein the instructions further cause the apparatus to:

detect a third operation of the user on the first interface; and enter a first processing mode of the first interface in response to the third operation, wherein the first processing mode comprises one of a plurality of long-exposure processing modes.

\* \* \* \* \*

UNITED STATES PATENT AND TRADEMARK OFFICE
CERTIFICATE OF CORRECTION

| | | |
|---|---|---|
| PATENT NO. | : 12,212,884 B2 | Page 1 of 1 |
| APPLICATION NO. | : 17/297201 | |
| DATED | : January 28, 2025 | |
| INVENTOR(S) | : Jiyang Dong | |

It is certified that error appears in the above-identified patent and that said Letters Patent is hereby corrected as shown below:

On the Title Page

Page 2, (56) References Cited, Foreign Patent Documents: "IN 106603931 A 4/2017" should read "CN 106603931 A 4/2017"

Signed and Sealed this
Twenty-fifth Day of March, 2025

Coke Morgan Stewart
*Acting Director of the United States Patent and Trademark Office*